US012585333B2

(12) United States Patent
Selim et al.

(10) Patent No.: US 12,585,333 B2
(45) Date of Patent: Mar. 24, 2026

(54) SYSTEMS AND METHOD FOR PROVIDING VIDEO ON DEMAND IN AN INTELLIGENT TELEVISION

(71) Applicant: MULTIMEDIA TECHNOLOGIES PTE, LTD

(72) Inventors: Mohammed Selim, Oakville (CA); Saulo Correia Dourado, Oakville (CA)

(73) Assignee: MULTIMEDIA TECHNOLOGIES PTE, LTD, Singapore (SG)

( * ) Notice: Subject to any disclaimer, the term of this patent is extended or adjusted under 35 U.S.C. 154(b) by 0 days.

(21) Appl. No.: 18/473,778

(22) Filed: Sep. 25, 2023

(65) Prior Publication Data

US 2024/0012487 A1 Jan. 11, 2024

Related U.S. Application Data

(63) Continuation of application No. 17/228,199, filed on Apr. 12, 2021, now Pat. No. 11,782,512, which is a
(Continued)

(51) Int. Cl.
*H04N 21/2543* (2011.01)
*G06F 3/01* (2006.01)
(Continued)

(52) U.S. Cl.
CPC ............ *G06F 3/017* (2013.01); *G06F 3/0481* (2013.01); *G06F 3/04817* (2013.01);
(Continued)

(58) Field of Classification Search
None
See application file for complete search history.

(56) References Cited

U.S. PATENT DOCUMENTS 4,284,849 A 8/1981 Anderson et al.
5,539,479 A 7/1996 Bertram
(Continued)

FOREIGN PATENT DOCUMENTS

CN 1832534 9/2006
CN 101472102 7/2009
(Continued)

OTHER PUBLICATIONS

Tvonicsuk "Tvonics: How to use the EPG search function." 1 pages retrieved from the internet on Nov. 11, 2013 from [www.youtube. corn/watch?v=H8euZOiydo].
(Continued)

*Primary Examiner* — Brian T Pendleton
*Assistant Examiner* — Jean D Saint Cyr
(74) *Attorney, Agent, or Firm* — Patents and Licensing LLC; Daniel W Juffernbruch

(57) ABSTRACT

An intelligent television can provide interfaces for indicating automatically one or more game sources from a plurality of game application sources, each game application source providing game content for user selection. On user selection of game content, intelligent television settings are automatically accessed to enable a game mode comprised of increasing a rate speed associated with a response to an input and discovering and initializing at least one game controller for the selected game.

10 Claims, 47 Drawing Sheets

Related U.S. Application Data continuation of application No. 16/591,393, filed on Oct. 2, 2019, now Pat. No. 10,990,188, which is a continuation of application No. 15/436,455, filed on Feb. 17, 2017, now abandoned, which is a continuation of application No. 14/847,537, filed on Sep. 8, 2015, now Pat. No. 9,578,384, which is a continuation of application No. 13/970,409, filed on Aug. 19, 2013, now abandoned, and a continuation of application No. 13/970,427, filed on Aug. 19, 2013, now abandoned, and a continuation of application No. 13/970,420, filed on Aug. 19, 2013, now Pat. No. 9,426,527, and a continuation of application No. 13/970,450, filed on Aug. 19, 2013, now Pat. No. 9,167,187, and a continuation of application No. 13/970,442, filed on Aug. 19, 2013, now Pat. No. 9,185,325, and a continuation of application No. 13/970,388, filed on Aug. 19, 2013, now abandoned.

(60) Provisional application No. 61/804,998, filed on Mar. 25, 2013, provisional application No. 61/805,053, filed on Mar. 25, 2013, provisional application No. 61/805,003, filed on Mar. 25, 2013, provisional application No. 61/804,990, filed on Mar. 25, 2013, provisional application No. 61/805,027, filed on Mar. 25, 2013, provisional application No. 61/805,038, filed on Mar. 25, 2013, provisional application No. 61/804,942, filed on Mar. 25, 2013, provisional application No. 61/804,971, filed on Mar. 25, 2013, provisional application No. 61/805,030, filed on Mar. 25, 2013, provisional application No. 61/805,042, filed on Mar. 25, 2013.

(51) Int. Cl.

| | |
|---|---|
| G06F 3/0481 | (2022.01) |
| G06F 3/04817 | (2022.01) |
| G06F 3/04842 | (2022.01) |
| G06F 3/04883 | (2022.01) |
| H04L 51/52 | (2022.01) |
| H04N 1/00 | (2006.01) |
| H04N 5/44 | (2011.01) |
| H04N 5/445 | (2011.01) |
| H04N 5/45 | (2011.01) |
| H04N 5/50 | (2006.01) |
| H04N 17/04 | (2006.01) |
| H04N 21/2187 | (2011.01) |
| H04N 21/231 | (2011.01) |
| H04N 21/235 | (2011.01) |
| H04N 21/24 | (2011.01) |
| H04N 21/25 | (2011.01) |
| H04N 21/258 | (2011.01) |
| H04N 21/262 | (2011.01) |
| H04N 21/2662 | (2011.01) |
| H04N 21/40 | (2011.01) |
| H04N 21/41 | (2011.01) |
| H04N 21/414 | (2011.01) |
| H04N 21/422 | (2011.01) |
| H04N 21/426 | (2011.01) |
| H04N 21/43 | (2011.01) |
| H04N 21/431 | (2011.01) |
| H04N 21/432 | (2011.01) |
| H04N 21/433 | (2011.01) |
| H04N 21/435 | (2011.01) |
| H04N 21/4363 | (2011.01) |
| H04N 21/437 | (2011.01) |
| H04N 21/439 | (2011.01) |
| H04N 21/441 | (2011.01) |
| H04N 21/4415 | (2011.01) |
| H04N 21/442 | (2011.01) |
| H04N 21/45 | (2011.01) |
| H04N 21/462 | (2011.01) |
| H04N 21/47 | (2011.01) |
| H04N 21/472 | (2011.01) |
| H04N 21/4725 | (2011.01) |
| H04N 21/475 | (2011.01) |
| H04N 21/478 | (2011.01) |
| H04N 21/4782 | (2011.01) |
| H04N 21/4788 | (2011.01) |
| H04N 21/482 | (2011.01) |
| H04N 21/485 | (2011.01) |
| H04N 21/488 | (2011.01) |
| H04N 21/61 | (2011.01) |
| H04N 21/658 | (2011.01) |
| H04N 21/81 | (2011.01) |
| H04N 21/8358 | (2011.01) |
| H04N 21/84 | (2011.01) |
| H04N 21/85 | (2011.01) |
| H04N 21/8545 | (2011.01) |

(52) U.S. Cl.
CPC ...... *G06F 3/04842* (2013.01); *G06F 3/04883* (2013.01); *H04L 51/52* (2022.05); *H04N 1/00448* (2013.01); *H04N 5/44* (2013.01); *H04N 5/445* (2013.01); *H04N 5/45* (2013.01); *H04N 5/50* (2013.01); *H04N 17/04* (2013.01); *H04N 21/2187* (2013.01); *H04N 21/23109* (2013.01); *H04N 21/235* (2013.01); *H04N 21/24* (2013.01); *H04N 21/25* (2013.01); *H04N 21/251* (2013.01); *H04N 21/2543* (2013.01); *H04N 21/258* (2013.01); *H04N 21/25808* (2013.01); *H04N 21/25883* (2013.01); *H04N 21/25891* (2013.01); *H04N 21/26291* (2013.01); *H04N 21/40* (2013.01); *H04N 21/41265* (2020.08); *H04N 21/414* (2013.01); *H04N 21/422* (2013.01); *H04N 21/42203* (2013.01); *H04N 21/42204* (2013.01); *H04N 21/4221* (2013.01); *H04N 21/42222* (2013.01); *H04N 21/42225* (2013.01); *H04N 21/426* (2013.01); *H04N 21/42684* (2013.01); *H04N 21/43* (2013.01); *H04N 21/4302* (2013.01); *H04N 21/4307* (2013.01); *H04N 21/43072* (2020.08); *H04N 21/43079* (2020.08); *H04N 21/431* (2013.01); *H04N 21/4312* (2013.01); *H04N 21/4314* (2013.01); *H04N 21/4316* (2013.01); *H04N 21/432* (2013.01); *H04N 21/433* (2013.01); *H04N 21/4332* (2013.01); *H04N 21/435* (2013.01); *H04N 21/437* (2013.01); *H04N 21/4396* (2013.01); *H04N 21/441* (2013.01); *H04N 21/4415* (2013.01); *H04N 21/442* (2013.01); *H04N 21/44204* (2013.01); *H04N 21/44213* (2013.01); *H04N 21/44222* (2013.01); *H04N 21/4532* (2013.01); *H04N 21/462* (2013.01); *H04N 21/4622* (2013.01); *H04N 21/47* (2013.01); *H04N 21/472* (2013.01); *H04N 21/47202* (2013.01); *H04N 21/47205* (2013.01); *H04N 21/4725* (2013.01); *H04N 21/475* (2013.01); *H04N 21/4753* (2013.01); *H04N 21/4755* (2013.01); *H04N 21/4756* (2013.01); *H04N 21/478* (2013.01); *H04N 21/4782* (2013.01); *H04N 21/4788*

(2013.01); *H04N 21/482* (2013.01); *H04N 21/4821* (2013.01); *H04N 21/4823* (2013.01); *H04N 21/4826* (2013.01); *H04N 21/4828* (2013.01); *H04N 21/485* (2013.01); *H04N 21/4858* (2013.01); *H04N 21/488* (2013.01); *H04N 21/4882* (2013.01); *H04N 21/6125* (2013.01); *H04N 21/6175* (2013.01); *H04N 21/6582* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *H04N 21/85* (2013.01); *H04N 21/8545* (2013.01); *G06F 2203/04804* (2013.01); *H04N 21/42206* (2013.01)

(56) References Cited

U.S. PATENT DOCUMENTS

| | | | |
|---|---|---|---|
| 5,701,183 A | 12/1997 | Bellemare et al. |
| 5,727,196 A | 3/1998 | Strauss, Jr. et al. |
| 5,734,444 A | 3/1998 | Yoshinobu |
| 5,801,747 A | 9/1998 | Bedard |
| 5,867,227 A | 2/1999 | Yamaguchi |
| 5,933,141 A | 8/1999 | Smith |
| 5,964,839 A | 10/1999 | Johnson et al. |
| 6,008,803 A | 12/1999 | Rowe et al. |
| 6,047,319 A | 4/2000 | Olson |
| 6,104,062 A | 8/2000 | Zeng |
| 6,111,614 A | 8/2000 | Mugura et al. |
| 6,177,931 B1 | 1/2001 | Alexander et al. |
| 6,239,794 B1 | 5/2001 | Yuen et al. |
| 6,285,804 B1 | 9/2001 | Crinon et al. |
| 6,493,038 B1 | 12/2002 | Singh et al. |
| 6,493,876 B1 | 12/2002 | DeFreese et al. |
| 6,515,968 B1 | 2/2003 | Gombar et al. |
| 6,563,515 B1 | 5/2003 | Reynolds et al. |
| 6,564,378 B1 | 5/2003 | Satterfield et al. |
| 6,629,077 B1 | 9/2003 | Arling et al. |
| 6,661,468 B2 | 12/2003 | Alten et al. |
| 6,766,526 B1 | 7/2004 | Ellis |
| 6,971,118 B1 | 11/2005 | Akhavan et al. |
| 7,058,600 B1 | 6/2006 | Cornbar et al. |
| 7,174,126 B2 | 2/2007 | McEihatten et al. |
| 7,228,556 B2 | 6/2007 | Beach et al. |
| 7,232,073 B1 | 6/2007 | de Jong |
| 7,233,316 B2 | 6/2007 | Smith et al. |
| 7,266,726 B1 | 9/2007 | Ladd et al. |
| 7,363,591 B2 | 4/2008 | Goldthwaite et al. |
| 7,487,529 B1 | 2/2009 | Orlick |
| 7,493,641 B2 | 2/2009 | Klosterman et al. |
| 7,506,350 B2 | 3/2009 | Johnson |
| 7,543,320 B2 | 6/2009 | Schein et al. |
| 7,577,923 B2 | 8/2009 | Beam et al. |
| 7,623,933 B2 | 11/2009 | Sarosi et al. |
| 7,685,520 B2 | 3/2010 | Rashkovskiy et al. |
| 7,698,606 B2 | 4/2010 | Ladd et al. |
| 7,805,634 B2 | 9/2010 | Balazich et al. |
| 7,822,716 B2 | 10/2010 | Lee et al. |
| 7,880,077 B2 | 2/2011 | Pauws et al. |
| 7,900,228 B2 | 3/2011 | Stark et al. |
| 7,904,924 B1 | 3/2011 | De Heer et al. |
| 7,908,635 B2 | 3/2011 | Batton et al. |
| 8,006,201 B2 | 8/2011 | Bhattacharya |
| 8,065,390 B2 | 11/2011 | Cheng |
| 8,089,455 B1 | 1/2012 | Wieder |
| 8,127,329 B1 | 2/2012 | Kunkel et al. |
| 8,151,215 B2 | 4/2012 | Baunnann et al. |
| 8,166,511 B2 | 4/2012 | Griggs |
| 8,201,104 B2 | 6/2012 | Yamamoto et al. |
| 8,220,021 B1 | 7/2012 | Look et al. |
| 8,281,339 B1 | 10/2012 | Walker et al. |
| 8,352,983 B1 | 1/2013 | Chane et al. |
| 8,473,976 B2 | 6/2013 | Udani |
| 8,510,780 B2 | 8/2013 | Stallings et al. |
| 8,516,519 B2 | 8/2013 | Lee |
| 8,549,561 B2 | 10/2013 | Yeh et al. |
| 8,566,874 B2 | 10/2013 | Roberts et al. |
| 8,589,981 B2 | 11/2013 | Lee et al. |
| 8,640,166 B1 | 1/2014 | Craner |
| 8,683,519 B2 | 3/2014 | McCarthy et al. |
| 8,756,620 B2 | 6/2014 | Papish et al. |
| 8,832,742 B2 | 9/2014 | Rasanen et al. |
| 8,863,198 B2 | 10/2014 | Sirpal et al. |
| 8,875,056 B2 | 10/2014 | Onogi et al. |
| 9,021,517 B2 | 4/2015 | Selim |
| 9,066,040 B2 | 6/2015 | Selim et al. |
| 9,167,187 B2 | 10/2015 | Dourado et al. |
| 9,185,325 B2 | 11/2015 | Selim et al. |
| 9,426,527 B2 | 8/2016 | Selim et al. |
| 9,578,384 B2 | 2/2017 | Selim et al. |
| 10,990,188 B2 | 4/2021 | Selim et al. |
| 2001/0001160 A1 | 5/2001 | Shoff et al. |
| 2001/0010097 A1 | 7/2001 | Lee |
| 2001/0056577 A1 | 12/2001 | Gordon et al. |
| 2002/0007485 A1 | 1/2002 | Rodriguez et al. |
| 2002/0026637 A1 | 2/2002 | Markel et al. |
| 2002/0042914 A1 | 4/2002 | Walker et al. |
| 2002/0049970 A1 | 4/2002 | Park |
| 2002/0052746 A1 | 5/2002 | Handelman |
| 2002/0056098 A1 | 5/2002 | White |
| 2002/0067376 A1 | 6/2002 | Martin et al. |
| 2002/0152267 A1 | 10/2002 | Lennon |
| 2002/0188944 A1 | 12/2002 | Noble |
| 2002/0188958 A1 | 12/2002 | Miller |
| 2003/0003876 A1 | 1/2003 | Rumsey |
| 2003/0014752 A1 | 1/2003 | Zaslavsky et al. |
| 2003/0070171 A1 | 4/2003 | Jeon et al. |
| 2003/0084449 A1 | 5/2003 | Chane et al. |
| 2003/0110234 A1 | 6/2003 | Egli et al. |
| 2003/0118323 A1 | 6/2003 | Ismail et al. |
| 2003/0149988 A1 | 8/2003 | Ellis et al. |
| 2003/0151621 A1 | 8/2003 | McEvilly et al. |
| 2003/0177498 A1 | 9/2003 | Ellis et al. |
| 2003/0182658 A1 | 9/2003 | Alexander |
| 2003/0182659 A1 | 9/2003 | Ellis et al. |
| 2003/0208763 A1 | 11/2003 | McEihatten et al. |
| 2003/0221192 A1 | 11/2003 | Rappaport et al. |
| 2003/0225777 A1 | 12/2003 | Marsh |
| 2003/0226146 A1 | 12/2003 | Thurston et al. |
| 2004/0078807 A1 | 4/2004 | Fries et al. |
| 2004/0093616 A1 | 5/2004 | Johnson |
| 2004/0103120 A1 | 5/2004 | Fickle et al. |
| 2004/0117831 A1 | 6/2004 | Ellis et al. |
| 2004/0119815 A1 | 6/2004 | Soloff |
| 2004/0148362 A1 | 7/2004 | Friedman |
| 2004/0154040 A1 | 8/2004 | Ellis |
| 2004/0158193 A1 | 8/2004 | Bui |
| 2004/0211282 A1 | 10/2004 | Kim |
| 2004/0216156 A1 | 10/2004 | Wagner |
| 2004/0237108 A1 | 11/2004 | Drazin et al. |
| 2005/0015804 A1 | 1/2005 | LaJoie et al. |
| 2005/0022237 A1 | 1/2005 | Nomura |
| 2005/0091596 A1 | 4/2005 | Anthony et al. |
| 2005/0097606 A1 | 5/2005 | Scott, III et al. |
| 2005/0097622 A1 | 5/2005 | Zigmond et al. |
| 2005/0120306 A1 | 6/2005 | Klassen et al. |
| 2005/0149964 A1 | 7/2005 | Thomas et al. |
| 2005/0160452 A1 | 7/2005 | Lawler et al. |
| 2005/0165918 A1 | 7/2005 | Wantanabe et al. |
| 2005/0188318 A1 | 8/2005 | Tamir et al. |
| 2005/0188402 A1 | 8/2005 | de Andrade et al. |
| 2005/0204382 A1 | 9/2005 | Ellis et al. |
| 2005/0204387 A1 | 9/2005 | Knudson et al. |
| 2005/0229210 A1 | 10/2005 | Akhavan |
| 2005/0232210 A1 | 10/2005 | Karaoguz et al. |
| 2005/0273819 A1 | 12/2005 | Knudson et al. |
| 2005/0289603 A1 | 12/2005 | Cezeaux et al. |
| 2006/0026647 A1 | 2/2006 | Potrebic et al. |
| 2006/0031875 A1 | 2/2006 | Yu |
| 2006/0064716 A1 | 3/2006 | Sull et al. |
| 2006/0090183 A1 | 4/2006 | Zito et al. |
| 2006/0101504 A1 | 5/2006 | Aravamudan et al. |
| 2006/0117337 A1 | 6/2006 | Sllivaji Rao et al. |
| 2006/0117343 A1 | 6/2006 | Novak et al. |

(56) References Cited

U.S. PATENT DOCUMENTS

| | | |
|---|---|---|
| 2006/0117365 A1 | 6/2006 | Ueda et al. |
| 2006/0123445 A1 | 6/2006 | Sullivan et al. |
| 2006/0143674 A1 | 6/2006 | Jones et al. |
| 2006/0158838 A1 | 7/2006 | Kinoshita et al. |
| 2006/0184972 A1 | 8/2006 | Rafey et al. |
| 2006/0248557 A1 | 11/2006 | Stark et al. |
| 2006/0262116 A1 | 11/2006 | Moshiri et al. |
| 2006/0280449 A1 | 12/2006 | Ogawa et al. |
| 2006/0290814 A1* | 12/2006 | Walter .............. H04N 21/4341 |
| | | 348/E5.122 |
| 2007/0011702 A1 | 1/2007 | Vaysman |
| 2007/0028282 A1 | 2/2007 | Kooijrnans et al. |
| 2007/0050733 A1 | 3/2007 | Lee et al. |
| 2007/0061724 A1 | 3/2007 | Slotllouber et al. |
| 2007/0066283 A1 | 3/2007 | Haar et al. |
| 2007/0096939 A1 | 5/2007 | Walrath |
| 2007/0143809 A1 | 6/2007 | Chen et al. |
| 2007/0154163 A1 | 7/2007 | Cordray |
| 2007/0162936 A1 | 7/2007 | Stallings et al. |
| 2007/0192715 A1 | 8/2007 | Kataria et al. |
| 2007/0199022 A1 | 8/2007 | Moshiri et al. |
| 2007/0250762 A1 | 10/2007 | Mansfield |
| 2007/0250864 A1 | 10/2007 | Diaz Perez |
| 2007/0261090 A1 | 11/2007 | Miller et al. |
| 2008/0022309 A1 | 1/2008 | Begeja et al. |
| 2008/0086745 A1 | 4/2008 | Knudson et al. |
| 2008/0092198 A1 | 4/2008 | Hutten |
| 2008/0098433 A1 | 4/2008 | Hardacker et al. |
| 2008/0114794 A1 | 5/2008 | Craner |
| 2008/0114861 A1 | 5/2008 | Gildred |
| 2008/0120635 A1 | 5/2008 | Trirnper et al. |
| 2008/0133525 A1 | 6/2008 | Ott |
| 2008/0141307 A1 | 6/2008 | Whitehead |
| 2008/0155613 A1 | 6/2008 | Benya et al. |
| 2008/0163307 A1 | 7/2008 | Coburn et al. |
| 2008/0177828 A1 | 7/2008 | Accarie et al. |
| 2008/0235595 A1 | 9/2008 | Krantz et al. |
| 2008/0244637 A1 | 10/2008 | Candelore |
| 2008/0250455 A1 | 10/2008 | Fukuda et al. |
| 2008/0271080 A1 | 10/2008 | Gossweiler et al. |
| 2008/0276279 A1 | 11/2008 | Gossweiler et al. |
| 2008/0282294 A1 | 11/2008 | Carpenter et al. |
| 2008/0288461 A1 | 11/2008 | Glennon et al. |
| 2008/0307457 A1 | 12/2008 | Yang et al. |
| 2008/0313677 A1 | 12/2008 | Lee |
| 2009/0013350 A1 | 1/2009 | Ohlfs et al. |
| 2009/0019485 A1 | 1/2009 | Ellis et al. |
| 2009/0064222 A1 | 3/2009 | Dawson et al. |
| 2009/0102966 A1 | 4/2009 | Jiang et al. |
| 2009/0106793 A1 | 4/2009 | Tecot et al. |
| 2009/0125940 A1 | 5/2009 | Kim et al. |
| 2009/0129340 A1 | 5/2009 | Handa |
| 2009/0150379 A1 | 6/2009 | Park et al. |
| 2009/0158326 A1 | 6/2009 | Hunt et al. |
| 2009/0158375 A1 | 6/2009 | Rodriguez et al. |
| 2009/0160764 A1 | 6/2009 | Myllyrnaki |
| 2009/0165045 A1 | 6/2009 | Stallings et al. |
| 2009/0177981 A1 | 7/2009 | Christie et al. |
| 2009/0179989 A1 | 7/2009 | Bessone et al. |
| 2009/0199237 A1 | 8/2009 | White et al. |
| 2009/0199241 A1 | 8/2009 | Unger et al. |
| 2009/0199242 A1 | 8/2009 | Johnson et al. |
| 2009/0204929 A1 | 8/2009 | Baurmann et al. |
| 2009/0210910 A1 | 8/2009 | Smith et al. |
| 2009/0213079 A1 | 8/2009 | Segal et al. |
| 2009/0228919 A1 | 9/2009 | Zott et al. |
| 2009/0235311 A1 | 9/2009 | Michel et al. |
| 2009/0241048 A1 | 9/2009 | Augustine et al. |
| 2009/0249394 A1 | 10/2009 | Schwesinger et al. |
| 2009/0271823 A1 | 10/2009 | Jung et al. |
| 2009/0293078 A1 | 11/2009 | Pirani et al. |
| 2009/0293079 A1 | 11/2009 | McKee et al. |
| 2009/0300674 A1 | 12/2009 | Ratsch et al. |
| 2009/0313232 A1 | 12/2009 | Tinsley et al. |
| 2010/0013991 A1 | 1/2010 | Whang |
| 2010/0031193 A1 | 2/2010 | Stark et al. |
| 2010/0050219 A1 | 2/2010 | Angiolillo et al. |
| 2010/0058231 A1 | 3/2010 | Duarte et al. |
| 2010/0060799 A1 | 3/2010 | Ishii |
| 2010/0071019 A1 | 3/2010 | Blanchard et al. |
| 2010/0086277 A1 | 4/2010 | Craner |
| 2010/0088724 A1 | 4/2010 | Yarnagistli |
| 2010/0095317 A1 | 4/2010 | Toebes et al. |
| 2010/0100512 A1 | 4/2010 | Brodin et al. |
| 2010/0107112 A1 | 4/2010 | Jennings et al. |
| 2010/0114857 A1 | 5/2010 | Edwards et al. |
| 2010/0122284 A1 | 5/2010 | Yoon et al. |
| 2010/0128183 A1 | 5/2010 | Ishii |
| 2010/0161506 A1 | 6/2010 | Bosenick et al. |
| 2010/0172407 A1 | 7/2010 | Ramaswamy |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0191727 A1 | 7/2010 | Malik |
| 2010/0201890 A1 | 8/2010 | Degonde et al. |
| 2010/0225830 A1 | 9/2010 | Blanchard et al. |
| 2010/0235740 A1 | 9/2010 | Friedlander et al. |
| 2010/0241962 A1 | 9/2010 | Peterson et al. |
| 2010/0293497 A1 | 11/2010 | Peterson |
| 2010/0302444 A1 | 12/2010 | Ahn et al. |
| 2010/0306402 A1 | 12/2010 | Russell et al. |
| 2010/0306800 A1 | 12/2010 | Jung et al. |
| 2010/0317332 A1* | 12/2010 | Bathiche .......... H04N 21/43637 |
| | | 455/418 |
| 2010/0319036 A1 | 12/2010 | Lirn et al. |
| 2010/0321405 A1 | 12/2010 | Macinnes et al. |
| 2011/0016492 A1 | 1/2011 | Morita |
| 2011/0022450 A1 | 1/2011 | Meredith |
| 2011/0023608 A1 | 2/2011 | Rueger |
| 2011/0035774 A1 | 2/2011 | Parker |
| 2011/0041150 A1 | 2/2011 | Schein et al. |
| 2011/0043696 A1 | 2/2011 | Onogi et al. |
| 2011/0047572 A1 | 2/2011 | Hill et al. |
| 2011/0055022 A1 | 3/2011 | Mehta et al. |
| 2011/0055873 A1 | 3/2011 | Heo et al. |
| 2011/0060661 A1 | 3/2011 | Chai et al. |
| 2011/0067066 A1 | 3/2011 | Batton et al. |
| 2011/0072480 A1 | 3/2011 | Stone |
| 2011/0074591 A1 | 3/2011 | Arling et al. |
| 2011/0078745 A1 | 3/2011 | Macrae et al. |
| 2011/0093888 A1 | 4/2011 | Araki et al. |
| 2011/0106744 A1 | 5/2011 | Becker |
| 2011/0107220 A1 | 5/2011 | Perlman |
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0119707 A1 | 5/2011 | Bae et al. |
| 2011/0122063 A1* | 5/2011 | Perlman ............. H04N 21/6125 |
| | | 345/161 |
| 2011/0125755 A1 | 5/2011 | Kaila et al. |
| 2011/0126251 A1 | 5/2011 | LaFreniere et al. |
| 2011/0131506 A1 | 6/2011 | Callisendorff |
| 2011/0145860 A1 | 6/2011 | Wei |
| 2011/0145881 A1 | 6/2011 | Hartman et al. |
| 2011/0154198 A1 | 6/2011 | Bachman et al. |
| 2011/0154405 A1 | 6/2011 | Isaias |
| 2011/0161996 A1 | 6/2011 | Harnano et al. |
| 2011/0167452 A1 | 7/2011 | Baumgartner et al. |
| 2011/0173657 A1 | 7/2011 | Thomas et al. |
| 2011/0179453 A1 | 7/2011 | Poniatowski |
| 2011/0179454 A1 | 7/2011 | Yates |
| 2011/0187929 A1 | 8/2011 | Suzuki et al. |
| 2011/0213670 A1 | 9/2011 | Strutton et al. |
| 2011/0213700 A1 | 9/2011 | Sant'Anselmo |
| 2011/0219395 A1 | 9/2011 | Moshiri et al. |
| 2011/0246495 A1 | 10/2011 | Mallinson |
| 2011/0252446 A1 | 10/2011 | Jeong et al. |
| 2011/0273552 A1 | 11/2011 | Wang et al. |
| 2011/0273625 A1 | 11/2011 | McMahon et al. |
| 2011/0276995 A1 | 11/2011 | Alten et al. |
| 2011/0283304 A1 | 11/2011 | Robetts et al. |
| 2011/0283311 A1 | 11/2011 | Luong |
| 2011/0283318 A1 | 11/2011 | Seidel et al. |
| 2011/0289067 A1 | 11/2011 | Jordan et al. |

(56) References Cited

U.S. PATENT DOCUMENTS

| | | |
|---|---|---|
| 2011/0289419 A1 | 11/2011 | Yu et al. |
| 2011/0289452 A1 | 11/2011 | Jordan et al. |
| 2011/0321095 A1 | 12/2011 | Yao et al. |
| 2011/0321098 A1 | 12/2011 | Bangalore et al. |
| 2012/0002951 A1 | 1/2012 | Reisman |
| 2012/0011545 A1 | 1/2012 | Doets et al. |
| 2012/0026400 A1 | 2/2012 | Kang et al. |
| 2012/0030317 A1 | 2/2012 | Srnyih et al. |
| 2012/0033950 A1 | 2/2012 | Cordray et al. |
| 2012/0042334 A1 | 2/2012 | Choi et al. |
| 2012/0054803 A1 | 3/2012 | Lee et al. |
| 2012/0060094 A1 | 3/2012 | Irwin et al. |
| 2012/0060187 A1 | 3/2012 | Moon et al. |
| 2012/0069131 A1 | 3/2012 | Abelow |
| 2012/0072952 A1 | 3/2012 | Vaysman et al. |
| 2012/0076473 A1 | 3/2012 | Kunkel et al. |
| 2012/0079096 A1 | 3/2012 | Cowan et al. |
| 2012/0079427 A1 | 3/2012 | Carrnicllael et al. |
| 2012/0086851 A1 | 4/2012 | Kirn et al. |
| 2012/0090004 A1 | 4/2012 | Jeong |
| 2012/0096264 A1 | 4/2012 | Traversal et al. |
| 2012/0099024 A1 | 4/2012 | Ryu et al. |
| 2012/0110623 A1 | 5/2012 | Hill et al. |
| 2012/0120316 A1 | 5/2012 | Lee |
| 2012/0133840 A1 | 5/2012 | Shirasuka et al. |
| 2012/0143972 A1 | 6/2012 | Malik et al. |
| 2012/0144416 A1 | 6/2012 | Wetzer et al. |
| 2012/0144422 A1 | 6/2012 | Han et al. |
| 2012/0144423 A1 | 6/2012 | Kirn et al. |
| 2012/0147049 A1 | 6/2012 | Lee |
| 2012/0147270 A1 | 6/2012 | Kim et al. |
| 2012/0147825 A1 | 6/2012 | Hassan et al. |
| 2012/0151006 A1 | 6/2012 | Mcinerney et al. |
| 2012/0154449 A1 | 6/2012 | Ramagem et al. |
| 2012/0167154 A1 | 6/2012 | Kirn et al. |
| 2012/0173979 A1 | 7/2012 | Lee |
| 2012/0174039 A1 | 7/2012 | Rhoads et al. |
| 2012/0174157 A1 | 7/2012 | Stinson, III et al. |
| 2012/0176546 A1 | 7/2012 | Yoon |
| 2012/0194742 A1 | 8/2012 | Barnes et al. |
| 2012/0198490 A1 | 8/2012 | Mertens |
| 2012/0200574 A1 | 8/2012 | Hill et al. |
| 2012/0206652 A1 | 8/2012 | Yi |
| 2012/0210275 A1 | 8/2012 | Park et al. |
| 2012/0210355 A1 | 8/2012 | Kim et al. |
| 2012/0210367 A1 | 8/2012 | Lee et al. |
| 2012/0210370 A1 | 8/2012 | Kim et al. |
| 2012/0210375 A1 | 8/2012 | Wong et al. |
| 2012/0210386 A1 | 8/2012 | Kirn et al. |
| 2012/0218203 A1 | 8/2012 | Kanki |
| 2012/0221972 A1 | 8/2012 | Dougall et al. |
| 2012/0229320 A1 | 9/2012 | Yu |
| 2012/0229473 A1 | 9/2012 | Tam |
| 2012/0257108 A1 | 10/2012 | Friedlander et al. |
| 2012/0260284 A1 | 10/2012 | Friedlander et al. |
| 2012/0262484 A1 | 10/2012 | Gottfeld |
| 2012/0272271 A1 | 10/2012 | Nishizawa et al. |
| 2012/0278725 A1 | 11/2012 | Gordon et al. |
| 2012/0281149 A1* | 11/2012 | Mori ................ H04N 21/8173 |
| | | 348/734 |
| 2012/0284751 A1 | 11/2012 | Kim et al. |
| 2012/0284752 A1 | 11/2012 | Christie |
| 2012/0291068 A1 | 11/2012 | Khushoo et al. |
| 2012/0297422 A1 | 11/2012 | Mountain |
| 2012/0297429 A1 | 11/2012 | Reed et al. |
| 2012/0331505 A1 | 12/2012 | Chun et al. |
| 2013/0014006 A1 | 1/2013 | Abellera et al. |
| 2013/0027613 A1 | 1/2013 | Kirn et al. |
| 2013/0034023 A1 | 2/2013 | Jun |
| 2013/0047174 A1 | 2/2013 | Lee et al. |
| 2013/0051615 A1 | 2/2013 | Lirn et al. |
| 2013/0081083 A1 | 3/2013 | Yu et al. |
| 2013/0091053 A1 | 4/2013 | Park et al. |
| 2013/0097640 A1 | 4/2013 | Lemmons et al. |
| 2013/0148023 A1 | 6/2013 | Sullivan et al. |
| 2013/0152135 A1 | 6/2013 | Hong et al. |
| 2013/0160065 A1 | 6/2013 | Aso et al. |
| 2013/0191869 A1 | 7/2013 | Sugiyama et al. |
| 2013/0238777 A1 | 9/2013 | Raleigh |
| 2013/0238796 A1 | 9/2013 | Lentziizky |
| 2013/0263021 A1 | 10/2013 | Dunn et al. |
| 2013/0263053 A1 | 10/2013 | Tritschler et al. |
| 2013/0275519 A1 | 10/2013 | Nichols |
| 2013/0276031 A1 | 10/2013 | Oh et al. |
| 2013/0282839 A1 | 10/2013 | Alcala |
| 2013/0291015 A1 | 10/2013 | Pan |
| 2013/0297697 A1 | 11/2013 | Haimovitch et al. |
| 2013/0298164 A1 | 11/2013 | Moreau et al. |
| 2013/0318553 A1 | 11/2013 | Yegorov et al. |
| 2013/0326557 A1 | 12/2013 | Kang et al. |
| 2013/0332838 A1 | 12/2013 | Naggar |
| 2013/0332856 A1 | 12/2013 | Sanders et al. |
| 2014/0007211 A1* | 1/2014 | Yang ..................... H04L 63/18 |
| | | 726/7 |
| 2014/0040344 A1 | 2/2014 | Gehring et al. |
| 2014/0040819 A1 | 2/2014 | Duffy |
| 2014/0049651 A1 | 2/2014 | Voth |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0052785 A1 | 2/2014 | Sirpal |
| 2014/0052786 A1 | 2/2014 | de Paz |
| 2014/0053176 A1 | 2/2014 | Milano et al. |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Slloykller et al. |
| 2014/0053195 A1 | 2/2014 | Sirpal et al. |
| 2014/0053196 A1 | 2/2014 | Selim |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher et al. |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |
| 2014/0059578 A1 | 2/2014 | Voth et al. |
| 2014/0059589 A1 | 2/2014 | Sirpal |
| 2014/0059596 A1 | 2/2014 | Dourado |
| 2014/0059598 A1 | 2/2014 | Milano |
| 2014/0059599 A1 | 2/2014 | Sirpal et al. |
| 2014/0059600 A1 | 2/2014 | Duarado |
| 2014/0059601 A1 | 2/2014 | Sirpal |
| 2014/0059602 A1 | 2/2014 | Sirpal |
| 2014/0059603 A1 | 2/2014 | Lee et al. |
| 2014/0059605 A1 | 2/2014 | Sirpal et al. |
| 2014/0059606 A1 | 2/2014 | Selim et al. |
| 2014/0059609 A1 | 2/2014 | Duarado |
| 2014/0059610 A1 | 2/2014 | Sirpal et al. |
| 2014/0059612 A1 | 2/2014 | Selirn |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059635 A1 | 2/2014 | Sirpal et al. |
| 2014/0059637 A1 | 2/2014 | Chen et al. |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068679 A1 | 3/2014 | Kaneko et al. |
| 2014/0068683 A1 | 3/2014 | Selim et al. |

(56) References Cited

U.S. PATENT DOCUMENTS

| | | | |
|---|---|---|---|
| 2014/0068685 | A1 | 3/2014 | Selim et al. |
| 2014/0068689 | A1 | 3/2014 | Sirpal et al. |
| 2014/0075475 | A1 | 3/2014 | Sirpal et al. |
| 2014/0075476 | A1 | 3/2014 | de Paz et al. |
| 2014/0075477 | A1 | 3/2014 | de Paz et al. |
| 2014/0075479 | A1 | 3/2014 | Soto et al. |
| 2014/0075483 | A1 | 3/2014 | de Paz et al. |
| 2014/0075484 | A1 | 3/2014 | Selim et al. |
| 2014/0082659 | A1 | 3/2014 | Fife et al. |
| 2014/0109143 | A1 | 4/2014 | Craner |
| 2014/0173660 | A1 | 6/2014 | Correa et al. |
| 2014/0181851 | A1 | 6/2014 | Givon et al. |
| 2014/0181853 | A1 | 6/2014 | Dureau et al. |
| 2014/0188970 | A1 | 7/2014 | Madhok et al. |
| 2014/0223464 | A1 | 8/2014 | Moran et al. |
| 2014/0259074 | A1 | 9/2014 | Ansari et al. |
| 2014/0380414 | A1 | 12/2014 | Saidi et al. |
| 2015/0156548 | A1 | 6/2015 | Sirpal et al. |
| 2015/0156554 | A1 | 6/2015 | Sirpal et al. |
| 2015/0163537 | A1 | 6/2015 | Sirpal et al. |
| 2015/0172765 | A1 | 6/2015 | Shoykher et al. |

FOREIGN PATENT DOCUMENTS

| | | |
|---|---|---|
| CN | 101540850 | 9/2009 |
| CN | 101567992 | 10/2009 |
| CN | 201937743 | 8/2011 |
| EP | 1031929 | 8/2000 |
| EP | 1067458 | 1/2001 |
| EP | 1770956 | 4/2007 |
| EP | 1865723 | 12/2007 |
| EP | 2328346 | 6/2011 |
| EP | 2348124 | 7/2011 |
| EP | 2439935 | 4/2012 |
| EP | 2487922 | 8/2012 |
| WO | WO 99/21308 | 4/1999 |
| WO | WO 99/35849 | 7/1999 |
| WO | WO 00/05884 | 2/2000 |
| WO | WO 01/06784 | 1/2001 |
| WO | WO 01/06788 | 1/2001 |
| WO | WO 02/080552 | 10/2002 |
| WO | WO 03/044755 | 5/2003 |
| WO | WO 2007/137611 | 12/2007 |
| WO | WO 2011/148054 | 12/2011 |
| WO | WO 2011/163481 | 12/2011 |
| WO | WO 2012/030024 | 3/2012 |
| WO | WO 2012/068438 | 5/2012 |
| WO | WO 2012/073027 | 6/2012 |
| WO | WO 2012/094247 | 7/2012 |
| WO | WO 2012/103121 | 8/2012 |
| WO | WO 2014/026636 | 2/2014 |
| WO | WO 2014/026640 | 2/2014 |
| WO | WO 2014/028061 | 2/2014 |
| WO | WO 2014/028068 | 2/2014 |
| WO | WO 2014/028069 | 2/2014 |
| WO | WO 2014/028071 | 2/2014 |
| WO | WO 2014/028074 | 2/2014 |

OTHER PUBLICATIONS

Official Action for U.S. Appl. No. 13/970,388, mailed Sep. 4, 2014 14 pages.

Official Action for U.S. Appl. No. 13/970,388, mailed Jan. 22, 2015 12 pages.

Official Action for U.S. Appl. No. 13/970,398, mailed Sep. 2, 2014 14 pages.

Notice of Allowance for U.S. Appl. No. 13/970,398, mailed Feb. 2, 2015 14 pages.

Official Action for U.S. Appl. No. 13/970,409, mailed Jul. 21, 2014 21 pages.

Official Action for U.S. Appl. No. 13/970,409, mailed Feb. 11, 2015 25 pages.

Official Action for U.S. Appl. No. 13/970,409, mailed Jun. 17, 2015 26 pages.

Official Action for U.S. Appl. No. 13/970,409, mailed Apr. 8, 2016 27 pages.

Official Action for U.S. Appl. No. 13/970,420, mailed Oct. 9, 2014 15 pages.

Official Action for U.S. Appl. No. 13/970,420, mailed Feb. 10, 2015 13 pages.

Official Action for U.S. Appl. No. 13/970,427, mailed Sep. 30, 2014 24 pages.

Official Action for U.S. Appl. No. 13/970,442, mailed Jun. 4, 2014 10 pages.

Official Action for U.S. Appl. No. 13/970,442, mailed Oct. 7, 2014 10 pages.

Official Action for U.S. Appl. No. 13/970,450 mailed Jul. 9, 2014 17 pages.

Official Action for U.S. Appl. No. 13/970,450, mailed Nov. 19, 2014 12 pages.

Official Action for U.S. Appl. No. 13/970,388, mailed Jul. 8, 2015 12 pages.

Official Action for U.S. Appl. No. 13/970,388, mailed Mar. 3, 2016 13 pages.

Official Action for U.S. Appl. No. 15/436,455, mailed Aug. 14, 2017 14 pages.

Final Action for U.S. Appl. No. 15/436,455, mailed Jan. 12, 2018 16 pages.

Official Action for U.S. Appl. No. 15/436,455, mailed Sep. 10, 2018 26 pages.

Final Action for U.S. Appl. No. 15/436,455, mailed Mar. 7, 2019 14 pages.

Official Action for U.S. Appl. No. 15/436,455, mailed Jul. 2, 2019 14 pages.

Official Action for U.S. Appl. No. 16/591,393, mailed Jun. 22, 2020 14 pages.

Notice of Allowance for U.S. Appl. No. 16/591,393, mailed Dec. 14, 2020 9 pages.

Corrected Notice of Allowance for U.S. Appl. No. 16/591,393, mailed Feb. 3, 2021 2 pages.

Official Action for U.S. Appl. No. 13/970,420, mailed Aug. 6, 2015 13 pages.

Notice of Allowance for U.S. Appl. No. 13/970,420, mailed Mar. 17, 2016 8 pages.

Official Action for U.S. Appl. No. 14/847,537, mailed Mar. 25, 2016 19 pages.

Notice of Allowance for U.S. Appl. No. 14/847,537, mailed Sep. 28, 2016 15 pages.

Notice of Allowance for U.S. Appl. No. 13/970,442, mailed Jul. 2, 2015 8 pages.

Notice of Allowance for U.S. Appl. No. 13/970,450, mailed May 19, 2015 14 pages.

* cited by examiner

SYSTEMS AND METHOD FOR PROVIDING VIDEO ON DEMAND IN AN INTELLIGENT TELEVISION

CROSS REFERENCE TO RELATED APPLICATION

The present application is a continuation of U.S. patent application Ser. No. 17/228,199, filed on Apr. 12, 2021, entitled "SYSTEMS AND METHODS FOR PROVIDING VIDEO ON DEMAND IN AN INTELLIGENT TELEVISION" which is a continuation of U.S. patent application Ser. No. 16/591,393, filed on Oct. 2, 2019, entitled "SYSTEMS AND METHODS FOR PROVIDING VIDEO ON DEMAND IN AN INTELLIGENT TELEVISION" which is a continuation of U.S. patent application Ser. No. 15/436,455, filed on Feb. 17, 2017, entitled "SYSTEMS AND METHODS FOR PROVIDING VIDEO ON DEMAND IN AN INTELLIGENT TELEVISION" which is a continuation of and claims priority to U.S. patent application Ser. No. 14/847,537 filed on Sep. 8, 2015, entitled "SYSTEMS AND METHODS FOR PROVIDING VIDEO ON DEMAND IN AN INTELLIGENT TELEVISION," now U.S. Pat. No. 9,578,384, which is a continuation of and claims priority to: (1) U.S. patent application Ser. No. 13/970,427; (2) U.S. patent application Ser. No. 13/970,388; (3) U.S. patent application Ser. No. 13/970,409; (4) U.S. patent application Ser. No. 13/970,420, now U.S. Pat. No. 9,426,527; (5) U.S. patent application Ser. No. 13/970,442, now U.S. Pat. No. 9,185,325; and (6) U.S. patent application Ser. No. 13/970,450, now U.S. Pat. No. 9,167,187, all filed on Aug. 19, 2013, each of which claims the benefits of and priority, under 35 U.S.C. § 119(e), to U.S. Provisional Application Ser. No. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet; digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method for providing video-on-demand (VOD) in an intelligent television, the method comprising: receiving, by a processor of the intelligent television, content for VOD; determining metadata characteristics for the content; storing the metadata characteristics with the content in a database for VOD content; and providing a first view of the VOD content based on the metadata characteristics.

An aspect of the above method includes wherein the metadata characteristics include a location at which the content was created.

An aspect of the above method includes wherein the metadata characteristics include a time at which the content was created.

An aspect of the above method includes wherein the metadata characteristics include a genre associated with the content.

An aspect of the above method includes wherein the first view is sorted based on at least one of the metadata characteristics.

An aspect of the above method further comprises determining if a user-defined criteria exists for organizing the content.

An aspect of the above method further comprises: receiving a user-defined criteria; and storing the received user-defined criteria.

An aspect of the above method further comprises sorting the content based on the received user-defined criteria.

An aspect of the above method further comprises providing a second view of the content based on the sort of the content with the received user-defined criteria.

An aspect of the above method includes wherein the user-defined criteria include one or more of a favorite or adult-only designation.

An intelligent television system comprising: a memory operable to store video-on-demand (VOD) content; a processor in communication with the memory, the processor operable to: execute a VOD data service operable to: receive content for VOD; determine metadata characteristics for the content; store the metadata characteristics with the content in a database for VOD content; and execute a user interface application in communication with the VOD data service, the user interface application operable to provide a first view of the VOD content based on the metadata characteristics.

An aspect of the above intelligent television system includes wherein the metadata characteristics include one or more of a location at which the content was created, a time at which the content was created, or a genre associated with the content.

An aspect of the above intelligent television system includes wherein the first view is sorted based on at least one of the metadata characteristics.

An aspect of the above intelligent television system includes wherein the VOD data service is further operable to: determine if a user-defined criteria exists for organizing the content; and sort the content based on the received user-defined criteria.

An aspect of the above intelligent television system includes wherein the user-defined criteria include one or more of a favorite or adult-only designation.

A computer readable medium having stored thereon processor executable instructions that cause a computing system to execute a method, the instructions comprising: instructions to receive content for VOD; instructions to determine metadata characteristics for the content; instructions to store the metadata characteristics with the content in a database for VOD content; and instructions to provide a first view of the VOD content based on the metadata characteristics.

An aspect of the above computer readable medium includes wherein the metadata characteristics include one or more of a location at which the content was created, a time at which the content was created, or a genre associated with the content.

An aspect of the above computer readable medium includes wherein the first view is sorted based on at least one of the metadata characteristics.

An aspect of the above computer readable medium further comprises instructions to: determine if a user-defined criteria exists for organizing the content; and sort the content based on the received user-defined criteria.

An aspect of the above computer readable medium includes wherein the user-defined criteria include one or more of a favorite or adult-only designation.

A method for providing video-on-demand (VOD) in an intelligent television, the method comprising: receiving, by a processor of the intelligent television, a first selection for VOD content; in response to the first selection, providing a master view of VOD content; receiving a second selection for VOD content; in response to the second selection, providing a collection view of the VOD content; receiving a third selection for VOD content; and in response to the third selection, providing either a detail view or a digest view of the VOD content.

An aspect of the above method further comprises: determining if the selection in the collection view is for a series or one of a movie or single show; if the selection in the collection view is for a series, providing the digest view; and if the selection in the collection view is for one of a movie or single show, providing a detail view.

An aspect of the above method includes wherein the digest view provides a listing of two or more episodes associated with the series.

An aspect of the above method further comprises: receiving a fourth selection of an episode in the digest view; and in response to the fourth selection, providing a player to present the episode to the user.

An aspect of the above method further comprises: receiving a fifth selection of a user interface device to play the movie or single show; and in response to the fifth selection, providing a player to present the movie or single show to the user.

An aspect of the above method includes wherein a navigation to view VOD content is an ordered set of user interfaces, and wherein the order includes a master view at a top level, a collection view at a second level, either a digest view or detail view at a third level, and a player view at a fourth and bottom level.

An aspect of the above method includes wherein a master view includes at least two user-selectable devices to view a collection view based on one of two or more criteria.

An aspect of the above method includes wherein the master view includes a navigation bar to select between types of content.

An aspect of the above method includes wherein the types of content include showcase content, movies content, television series content, or variety content.

An aspect of the above method includes wherein the master layout includes user-selectable devices for viewing a collection of content based on special topics, newest content, top watched content, recommended content, or favorites content.

An intelligent television system comprising: a memory operable to store video-on-demand (VOD) content; a processor in communication with the memory, the processor operable to: execute a user interface application operable to: receive a first selection for VOD content; in response to the first selection, provide a master view of VOD content; receive a second selection for VOD content; in response to the second selection, provide a collection view of the VOD content; receive a third selection for VOD content; and in response to the third selection, provide either a detail view or a digest view of the VOD content.

An aspect of the above intelligent television system includes wherein the user interface application is further operable to: determine if the selection in the collection view is for a series or one of a movie or single show; if the selection in the collection view is for a series, provide the digest view, wherein the digest view provides a listing of two or more episodes associated with the series; if the selection in the collection view is for one of a movie or single show, provide a detail view; receive a fourth selection of an episode in the digest view; and in response to the fourth selection, provide a player to present the episode to the user.

An aspect of the above intelligent television system includes wherein the user interface application is further operable to: receive a fifth selection of a user interface device to play the movie or single show; and in response to the fifth selection, provide a player to present the movie or single show to the user.

An aspect of the above intelligent television system includes wherein a navigation to view VOD content is an ordered set of user interfaces, and wherein the order includes a master view at a top level, a collection view at a second level, either a digest view or detail view at a third level, and a player view at a fourth and bottom level.

An aspect of the above intelligent television system includes wherein a master view includes at least two user-selectable devices to view a collection view based on one of two or more criteria, wherein the master view includes a navigation bar to select between types of content, wherein the types of content include showcase content, movies content, television series content, or variety content, and wherein the master layout includes user-selectable devices for viewing a collection of content based on special topics, newest content, top watched content, recommended content, or favorites content.

A computer readable medium having stored thereon processor executable instructions that cause a computing system to execute a method, the instructions comprising: instructions to receive a first selection for VOD content; in response to the first selection, instructions to provide a master view of VOD content; instructions to receive a second selection for VOD content; in response to the second selection, instructions to provide a collection view of the VOD content; instructions to receive a third selection for VOD content; and in response to the third selection, instructions to provide either a detail view or a digest view of the VOD content.

An aspect of the above computer readable medium further comprises instructions to: determine if the selection in the collection view is for a series or one of a movie or single show; if the selection in the collection view is for a series, provide the digest view, wherein the digest view provides a listing of two or more episodes associated with the series; if the selection in the collection view is for one of a movie or single show, provide a detail view; receive a fourth selection of an episode in the digest view; and in response to the fourth selection, provide a player to present the episode to the user.

An aspect of the above computer readable medium further comprises instructions to: receive a fifth selection of a user interface device to play the movie or single show; and in response to the fifth selection, provide a player to present the movie or single show to the user.

An aspect of the above computer readable medium includes wherein a navigation to view VOD content is an ordered set of user interfaces, and wherein the order includes a master view at a top level, a collection view at a second level, either a digest view or detail view at a third level, and a player view at a fourth and bottom level.

An aspect of the above computer readable medium includes wherein a master view includes at least two user-selectable devices to view a collection view based on one of two or more criteria, wherein the master view includes a navigation bar to select between types of content, wherein the types of content include showcase content, movies content, television series content, or variety content, and wherein the master layout includes user-selectable devices for viewing a collection of content based on special topics, newest content, top watched content, recommended content, or favorites content.

A method for providing video-on-demand (VOD) in an intelligent television, the method comprising: receiving, by a processor of the intelligent television, a selection for VOD content; providing a first user interface having a selection for one or more of showcase content, movie content, television content, or variety content; receiving a second selection; determining whether the second selection is for showcase content, movie content, television content, or variety content; and based on the determination, provide a second user interface having content associated showcase content, movie content, television content, or variety content.

An aspect of the above method includes wherein the selections for showcase content, movie content, television content, or variety content are provided in a navigation bar.

An aspect of the above method includes wherein the second selection is in the navigation bar.

An aspect of the above method includes wherein a third user interface is associated with showcase content, wherein the third user interface includes first set of user-selectable devices for one or more of last viewed content, top watched content, high definition content, or special topics content.

An aspect of the above method includes wherein a fourth user interface is associated with television content, wherein the fourth user interface includes second set of user-selectable devices for one or more of new content, top watched content, recommended content, or special topics content.

An aspect of the above method includes wherein a fifth user interface is associated with variety content, wherein the fifth user interface includes third set of user-selectable devices for one or more of new content, top watched content, recommended content, or special topics content.

An aspect of the above method includes wherein a sixth user interface is associated with movie content, wherein the sixth user interface includes fourth set of user-selectable devices for one or more of new content, top watched content, recommended content, or special topics content.

An aspect of the above method includes wherein a first user interface is a master view of all content.

An aspect of the above method includes wherein the first user interface includes fifth set of user-selectable devices for one or more of last watched content, top watched content, high definition content, or special topics content.

An aspect of the above method includes wherein at least one user-selectable device in the first, second, third, fourth, or fifth set of user-selectable devices includes revolving thumbnails associated with at least two different items of content.

An intelligent television system comprising: a memory operable to store video-on-demand (VOD) content; a processor in communication with the memory, the processor operable to: execute a user interface application operable to: receive a selection for VOD content; provide a first user interface have a selection for one or more of showcase content, movie content, television content, or variety content; receive a second selection; determine whether the second selection is for showcase content, movie content, television content, or variety content; and based on the determination, provide a second user interface have content associated showcase content, movie content, television content, or variety content.

An aspect of the above intelligent television system includes wherein the selections for showcase content, movie content, television content, or variety content are provided in a navigation bar, and wherein the second selection is in the navigation bar.

An aspect of the above intelligent television system includes wherein a third user interface is associated with showcase content, wherein the third user interface includes first set of user-selectable devices for one or more of last viewed content, top watched content, high definition content, or special topics content, wherein a fourth user interface is associated with television content, wherein the fourth user interface includes second set of user-selectable devices for one or more of new content, top watched content, recommended content, or special topics content, wherein a fifth user interface is associated with variety content, wherein the fifth user interface includes third set of user-selectable devices for one or more of new content, top watched content, recommended content, or special topics content, and wherein a sixth user interface is associated with movie content, wherein the sixth user interface includes fourth set of user-selectable devices for one or more of new content, top watched content, recommended content, or special topics content.

An aspect of the above intelligent television system includes wherein a first user interface is a master view of all content, and wherein the first user interface includes fifth set of user-selectable devices for one or more of last watched content, top watched content, high definition content, or special topics content.

An aspect of the above intelligent television system includes wherein at least one user-selectable device in the first, second, third, fourth, or fifth set of user-selectable devices includes revolving thumbnails associated with at least two different items of content.

A computer readable medium having stored thereon processor executable instructions that cause a computing system to execute a method, the instructions comprising: instructions to receive a selection for VOD content; instructions to provide a first user interface have a selection for one or more of showcase content, movie content, television content, or variety content; instructions to receive a second selection; instructions to determine whether the second selection is for showcase content, movie content, television content, or variety content; and based on the determination, instructions to provide a second user interface have content associated showcase content, movie content, television content, or variety content.

An aspect of the above computer readable medium includes wherein the selections for showcase content, movie content, television content, or variety content are provided in a navigation bar, and wherein the second selection is in the navigation bar.

An aspect of the above computer readable medium includes wherein a third user interface is associated with showcase content, wherein the third user interface includes first set of user-selectable devices for one or more of last viewed content, top watched content, high definition content, or special topics content, wherein a fourth user interface is associated with television content, wherein the fourth user interface includes second set of user-selectable devices for one or more of new content, top watched content, recommended content, or special topics content, wherein a fifth user interface is associated with variety content, wherein the fifth user interface includes third set of user-selectable devices for one or more of new content, top watched content, recommended content, or special topics content, and wherein a sixth user interface is associated with movie content, wherein the sixth user interface includes fourth set of user-selectable devices for one or more of new content, top watched content, recommended content, or special topics content.

An aspect of the above computer readable medium includes wherein a first user interface is a master view of all content, and wherein the first user interface includes fifth set of user-selectable devices for one or more of last watched content, top watched content, high definition content, or special topics content.

An aspect of the above computer readable medium includes wherein at least one user-selectable device in the first, second, third, fourth, or fifth set of user-selectable devices includes revolving thumbnails associated with at least two different items of content.

A method for providing video-on-demand (VOD) in an intelligent television, the method comprising: providing a first collection view of VOD content; receiving, by a processor of the intelligent television, a first selection to filter the VOD content; determining content applicable to the received selection; and providing a second collection view of the filtered content.

An aspect of the above method further comprises determining if the first selection is a last filter selection.

An aspect of the above method includes wherein if the first selection is not the last filter selection, further comprising: receiving, by a processor of the intelligent television, a second selection to filter the VOD content; determining content applicable to the second received selection; and providing a third collection view of the filtered content.

An aspect of the above method includes wherein if the first selection is not the last filter selection, further comprising: receiving a third selection of an item of content in the second collection view; and providing a detail view of the selected content.

An aspect of the above method includes wherein the first selection to filter includes a filter criteria.

An aspect of the above method includes wherein the filter criteria is a location where the content was made.

An aspect of the above method includes wherein the filter criteria is a year at which the content was made.

An aspect of the above method includes wherein the filter criteria is a genre associated with the content.

An aspect of the above method includes wherein the first criteria include two or more of the location, the year, and the genre.

An aspect of the above method includes wherein the detail view includes a description portion and a user-selectable device to play the content.

An intelligent television system comprising: a memory operable to store video-on-demand (VOD) content; a processor in communication with the memory, the processor operable to: execute a user interface application operable to: provide a first collection view of VOD content; receive a first selection to filter the VOD content; determine content applicable to the received selection; and provide a second collection view of the filtered content.

An aspect of the above intelligent television system includes wherein the user interface application is further operable to: wherein if the first selection is not the last filter selection, receive, by a processor of the intelligent television, a second selection to filter the VOD content; determine content applicable to the second received selection; provide a third collection view of the filtered content; wherein if the first selection is not the last filter selection, receive a third selection of an item of content in the second collection view; and provide a detail view of the selected content.

An aspect of the above intelligent television system includes wherein the first selection to filter includes a filter criteria.

An aspect of the above intelligent television system includes wherein the filter criteria is one of a location where the content was made, a year at which the content was made, or a genre associated with the content.

An aspect of the above intelligent television system includes wherein the first criteria include two or more of the location, the year, and the genre.

A computer readable medium having stored thereon processor executable instructions that cause a computing system to execute a method, the instructions comprising: instructions to provide a first collection view of VOD content; instructions to receive a first selection to filter the VOD content; instructions to determine content applicable to the received selection; and instructions to provide a second collection view of the filtered content.

An aspect of the above computer readable medium further comprises instructions to: wherein if the first selection is not the last filter selection, receive, by a processor of the intelligent television, a second selection to filter the VOD content; determine content applicable to the second received selection; provide a third collection view of the filtered content; wherein if the first selection is not the last filter selection, receive a third selection of an item of content in the second collection view; and provide a detail view of the selected content.

An aspect of the above computer readable medium includes wherein the first selection to filter includes a filter criteria.

An aspect of the above computer readable medium includes wherein the filter criteria is one of a location where the content was made, a year at which the content was made, or a genre associated with the content.

An aspect of the above computer readable medium includes wherein the first criteria include two or more of the location, the year, and the genre.

A method for providing video-on-demand (VOD) in an intelligent television, the method comprising: receiving, by a processor of the intelligent television, a filter criteria; providing a catalog view of one or more television series associated with the filter criteria; receiving a selection of a television series from the catalog view; determining if the television series includes one season; and if there is only one season, providing a first digest view of the season.

An aspect of the above method further comprises, if there is more than one season, providing a second digest view having two or more seasons in date order.

An aspect of the above method includes wherein the two or more seasons are ordered from most recent season to least recent season.

An aspect of the above method further comprises determining if the season is fully archived.

An aspect of the above method further comprises if the season is fully archived, providing the series view with two or more episodes with a first date order.

An aspect of the above method includes wherein the first date order is from first episode to last episode.

An aspect of the above method further comprises if the season is fully archived, providing the series view with two or more episodes with a second date order.

An aspect of the above method includes wherein the second date order is from most recent episode to oldest episode.

An aspect of the above method further comprises receiving a second selection of an episode.

An aspect of the above method further comprises playing the episode.

An intelligent television system comprising: a memory operable to store video-on-demand (VOD) content; a processor in communication with the memory, the processor operable to: execute a user interface application operable to: receive a filter criteria; provide a catalog view of one or more television series associated with the filter criteria; receive a selection of a television series from the catalog view; determine if the television series includes one season; and if there is only one season, provide a first digest view of the season.

An aspect of the above intelligent television system includes wherein the user interface application is further operable to, if there is more than one season, provide a second digest view having two or more seasons in date order, wherein the two or more seasons are ordered from most recent season to least recent season.

An aspect of the above intelligent television system includes wherein the user interface application is further operable to: determine if the season is fully archived; and if the season is fully archived provide the series view with two or more episodes with a first date order, wherein the first date order is from first episode to last episode.

An aspect of the above intelligent television system includes wherein the user interface application is further operable to, if the season is fully archived, provide the series view with two or more episodes with a second date order, wherein the second date order is from most recent episode to oldest episode.

An aspect of the above intelligent television system includes wherein the user interface application is further operable to: receive a second selection of an episode; and play the episode.

A computer readable medium having stored thereon processor executable instructions that cause a computing system to execute a method, the instructions comprising: instructions to receive a filter criteria; instructions to provide a catalog view of one or more television series associated with the filter criteria; instructions to receive a selection of a television series from the catalog view; instructions to determine if the television series includes one season; and if there is only one season, instructions to provide a first digest view of the season.

An aspect of the above computer readable medium further comprises instructions to if there is more than one season, provide a second digest view having two or more seasons in date order, wherein the two or more seasons are ordered from most recent season to least recent season.

An aspect of the above computer readable medium further comprises instructions to: determine if the season is fully archived; and if the season is fully archived provide the series view with two or more episodes with a first date order, wherein the first date order is from first episode to last episode.

An aspect of the above computer readable medium further comprises instructions to, if the season is fully archived, provide the series view with two or more episodes with a second date order, wherein the second date order is from most recent episode to oldest episode.

An aspect of the above computer readable medium further comprises instructions to: receive a second selection of an episode; and play the episode.

A method for providing one of two types of user interfaces in an intelligent television, the method comprising: receiving, by a processor of the intelligent television, a filter criteria; providing a catalog view of one or more television series associated with the filter criteria; receiving a selection of a television series from the catalog view; determining if the television series includes one season; if there is only one season, providing a first digest view of the season; receiving a second selection of an episode; and playing the episode in a series player including a user-selectable device to navigate to at least one of a next episode or a previous episode.

An aspect of the above method includes wherein the series player includes a playback control.

An aspect of the above method includes wherein the user-selectable device is associated with the playback control.

An aspect of the above method includes wherein the playback control is in a footer.

An aspect of the above method includes wherein a first user-selectable device for the previous episode is provided to a left of the playback control in the footer.

An aspect of the above method includes wherein a second user-selectable device for the next episode is provided to a right of the playback control in the footer.

An aspect of the above method includes wherein the playback control includes selections to rewind the episode, forward the episode, play the episode, and pause the episode.

An aspect of the above method includes wherein the first and second user-selectable devices include thumbnails representing the previous and next episode.

An aspect of the above method includes wherein the first and second user-selectable devices include names for the previous and next episode.

An aspect of the above method includes wherein selecting the first or second user-selectable devices begins a playback of the previous or next episode.

An intelligent television system comprising: a memory operable to store video-on-demand (VOD) content; a processor in communication with the memory, the processor operable to: execute a user interface application operable to: receive, by a processor of the intelligent television, a filter criteria; provide a catalog view of one or more television series associated with the filter criteria; receive a selection of a television series from the catalog view; determine if the television series includes one season; if there is only one season, provide a first digest view of the season; receive a second selection of an episode; and play the episode in a series player including a user-selectable device to navigate to at least one of a next episode or a previous episode.

An aspect of the above intelligent television system includes wherein the series player includes a playback control, wherein the user-selectable device is associated with the playback control, and wherein the playback control is in a footer.

An aspect of the above intelligent television system includes wherein a first user-selectable device for the previous episode is provided to a left of the playback control in the footer, wherein a second user-selectable device for the next episode is provided to a right of the playback control in the footer, and wherein the playback control includes selections to rewind the episode, forward the episode, play the episode, and pause the episode.

An aspect of the above intelligent television system includes wherein the first and second user-selectable devices include thumbnails representing the previous and next episode, and wherein the first and second user-selectable devices include names for the previous and next episode.

An aspect of the above intelligent television system includes wherein selecting the first or second user-selectable devices begins a playback of the previous or next episode.

A computer readable medium having stored thereon processor executable instructions that cause a computing system to execute a method, the instructions comprising: instructions to receive, by a processor of the intelligent television, a filter criteria; instructions to provide a catalog view of one or more television series associated with the filter criteria; instructions to receive a selection of a television series from the catalog view; instructions to determine if the television series includes one season; if there is only one season, instructions to provide a first digest view of the season; instructions to receive a second selection of an episode; and instructions to play the episode in a series player including a user-selectable device to navigate to at least one of a next episode or a previous episode.

An aspect of the above computer readable medium includes wherein the series player includes a playback control, wherein the user-selectable device is associated with the playback control, and wherein the playback control is in a footer.

An aspect of the above computer readable medium includes wherein a first user-selectable device for the previous episode is provided to a left of the playback control in the footer, wherein a second user-selectable device for the next episode is provided to a right of the playback control in the footer, and wherein the playback control includes selections to rewind the episode, forward the episode, play the episode, and pause the episode.

An aspect of the above computer readable medium includes wherein the first and second user-selectable devices include thumbnails representing the previous and next episode, and wherein the first and second user-selectable devices include names for the previous and next episode.

An aspect of the above computer readable medium includes wherein selecting the first or second user-selectable devices begins a playback of the previous or next episode.

A method for providing video-on-demand (VOD) in an intelligent television, the method comprising: providing, by a processor of the intelligent television, a catalog view of two or more items of content; receiving a selection to sort the items of content based on a watched status; and providing a second catalog view where two or more items of content are presented, wherein the presented items of content have the selected watch status.

An aspect of the above method includes wherein the selection is made with a watched toggle.

An aspect of the above method includes wherein the watched status is a not watched status.

An aspect of the above method includes wherein the presented items of content have not been viewed.

An aspect of the above method includes wherein the watched status is a partially watched status.

An aspect of the above method includes wherein the presented items of content have been partially viewed.

An aspect of the above method includes wherein the watched status is a fully watched status.

An aspect of the above method includes wherein the presented items of content have been fully viewed.

An aspect of the above method includes wherein the watched toggle is associated with a hot button key in the catalog view and the second catalog view.

An aspect of the above method includes wherein the watched toggle is associated with a remote hot button key on a remote control.

An intelligent television system comprising: a memory operable to store video-on-demand (VOD) content; a processor in communication with the memory, the processor operable to: execute a user interface application operable to: provide a catalog view of two or more items of content; receive a selection to sort the items of content based on a watched status; and provide a second catalog view where two or more items of content are presented, wherein the presented items of content have the selected watch status.

An aspect of the above intelligent television system includes wherein the selection is made with a watched toggle, wherein the watched toggle is associated with a hot button key in the catalog view and the second catalog view, and wherein the watched toggle is associated with a remote hot button key on a remote control.

An aspect of the above intelligent television system includes wherein the watched status is a not watched status, and wherein the presented items of content have not been viewed.

An aspect of the above intelligent television system includes wherein the watched status is a partially watched status, and wherein the presented items of content have been partially viewed.

An aspect of the above intelligent television system includes wherein the watched status is a fully watched status, and wherein the presented items of content have been fully viewed.

A computer readable medium having stored thereon processor executable instructions that cause a computing system to execute a method, the instructions comprising: instructions to provide a catalog view of two or more items of content; instructions to receive a selection to sort the items of content based on a watched status; and instructions to provide a second catalog view where two or more items of content are presented, wherein the presented items of content have the selected watch status.

An aspect of the above computer readable medium includes wherein the selection is made with a watched toggle, wherein the watched toggle is associated with a hot button key in the catalog view and the second catalog view, and wherein the watched toggle is associated with a remote hot button key on a remote control.

An aspect of the above computer readable medium includes wherein the watched status is a not watched status, and wherein the presented items of content have not been viewed.

An aspect of the above computer readable medium includes wherein the watched status is a partially watched status, and wherein the presented items of content have been partially viewed.

An aspect of the above computer readable medium includes wherein the watched status is a fully watched status, and wherein the presented items of content have been fully viewed.

A method for providing video-on-demand (VOD) in an intelligent television, the method comprising: providing, by a processor of the intelligent television, a catalog view for an item of content; receiving a selection to play content; determining if a user has previously watched the content; and if the user has previously watched the content, prompting the user if the user desires to resume watching the content.

An aspect of the above method further comprises if the user has not previously watched the content, playing the content from a beginning of the content.

An aspect of the above method includes wherein a watch status for the content is stored in a database.

An aspect of the above method includes wherein the intelligent television retrieves the watch status to determine if the user previously watched the content.

An aspect of the above method includes wherein the watch status is associated with the content in the database.

An aspect of the above method further comprises receiving a playback controls selection.

An aspect of the above method further comprises, in response to receiving the playback controls selection, providing the playback controls for a predetermined amount of time.

An aspect of the above method includes wherein the playback controls are in a footer.

An aspect of the above method includes wherein a first user-selectable device for the previous episode is provided to a left of the playback controls in the footer, wherein a second user-selectable device for the next episode is provided to a right of the playback controls in the footer.

An aspect of the above method includes wherein the playback controls includes selections to rewind the episode, forward the episode, play the episode, and pause the episode.

An intelligent television system comprising: a memory operable to store video-on-demand (VOD) content; a processor in communication with the memory, the processor operable to: execute a user interface application operable to: provide, by a processor of the intelligent television, a catalog view for an item of content; receive a selection to play content; determine if a user has previously watched the content; and if the user has previously watched the content, prompt the user if the user desires to resume watching the content.

An aspect of the above intelligent television system includes wherein the user interface application is further operable to, if the user has not previously watched the content, play the content from a beginning of the content.

An aspect of the above intelligent television system includes wherein a watch status for the content is stored in a database, wherein the intelligent television retrieves the watch status to determine if the user previously watched the content, and wherein the watch status is associated with the content in the database.

An aspect of the above intelligent television system includes wherein the user interface application is further operable to: receive a playback controls selection; and in response to receiving the playback controls selection, provide the playback controls for a predetermined amount of time.

An aspect of the above intelligent television system includes wherein the playback controls are in a footer, wherein a first user-selectable device for the previous content is provided to a left of the playback controls in the footer, wherein a second user-selectable device for the next content is provided to a right of the playback controls in the footer, and wherein the playback controls include selections to rewind the content, forward the content, play the content, and pause the content.

A computer readable medium having stored thereon processor executable instructions that cause a computing system to execute a method, the instructions comprising: instructions to provide, by a processor of the intelligent television, a catalog view for an item of content; receive a selection to play content; determine if a user has previously watched the content; and if the user has previously watched the content, prompt the user if the user desires to resume watching the content.

An aspect of the above computer readable medium includes wherein the user interface application is further operable to, if the user has not previously watched the content, play the content from a beginning of the content.

An aspect of the above computer readable medium includes wherein a watch status for the content is stored in a database, wherein the intelligent television retrieves the watch status to determine if the user previously watched the content, and wherein the watch status is associated with the content in the database.

An aspect of the above computer readable medium further comprises instructions to: receive a playback controls selection; and in response to receiving the playback controls selection, provide the playback controls for a predetermined amount of time.

An aspect of the above computer readable medium includes wherein the playback controls are in a footer, wherein a first user-selectable device for the previous content is provided to a left of the playback controls in the footer, wherein a second user-selectable device for the next content is provided to a right of the playback controls in the footer, and wherein the playback controls include selections to rewind the content, forward the content, play the content, and pause the content.

The systems and methods herein provide new user interfaces for providing VOD with the Intelligent TV. The user interfaces have an intuitive layout, structure, organization, and methodology. Thus, the user can more easily learn and navigate the options associated with VOD with the Intelligent TV.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p–1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777, 600 pixels (approximately 0.8 megapixels) per field or 1,555,200 pixels (approximately 1.6 megapixels) per frame), or 720p–1280×720p: 921,600 pixels (approximately 0.9 megapixels) per frame. As will be appreciated, "frame size" in pixels is defined as number of horizontal pixels× number of vertical pixels, for example 1280×720 or 1920× 1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTE Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video-on-demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, VOD, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. The Intelligent TV can be a soft television. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 inter-laced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," or "video-on-demand," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider) an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "social media" can refer to the means of interactions among people in which they create, share, and exchange information and ideas in virtual communities and networks. Embodiments of social media can include a group of Internet-based applications that allow the creation and exchange of content. Furthermore, social media may depend on mobile and web-based technologies to create highly interactive platforms through which individuals and communities share, co-create, discuss, and modify user-generated content. Social media differentiates from traditional/industrial media in many aspects such as quality, reach, frequency, usability, immediacy, and permanence.

The term "social media site" can refer to a social network or social network service.

The term "social media posting" can refer to an item of content or a provider of content on a social media site.

The term "social media poster" can refer to an author of an item of content or a provider of content on a social media site.

The term "social media pile" can refer to a user interface where each social media posters is represented by a thumbnail or other visual indicia. The social media pile can include two or more thumbnails or visual indicia formed into an arrangement that resembles a pile.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
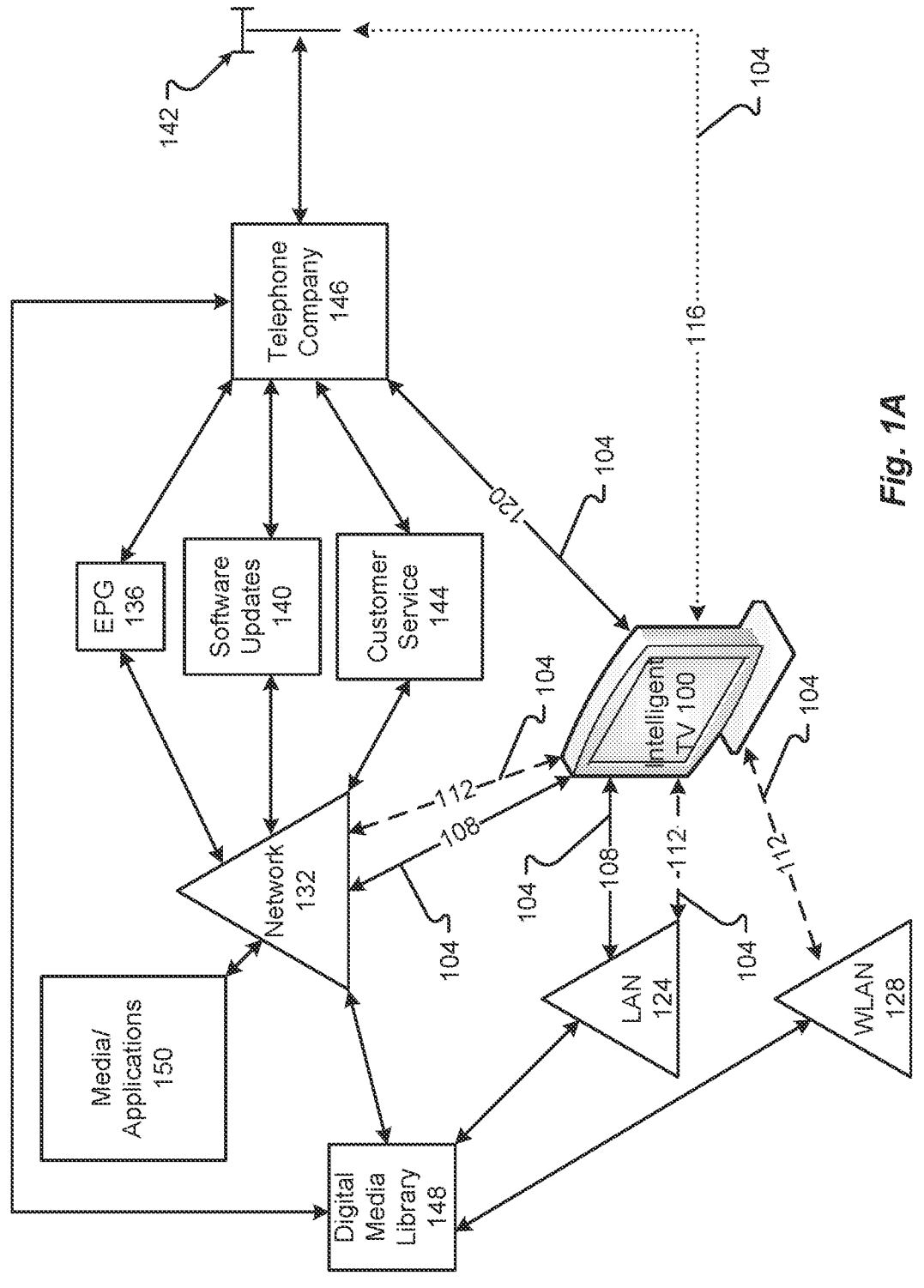
FIG. 1A includes a first view of an embodiment of an environment of an intelligent television.
Figure 1B:
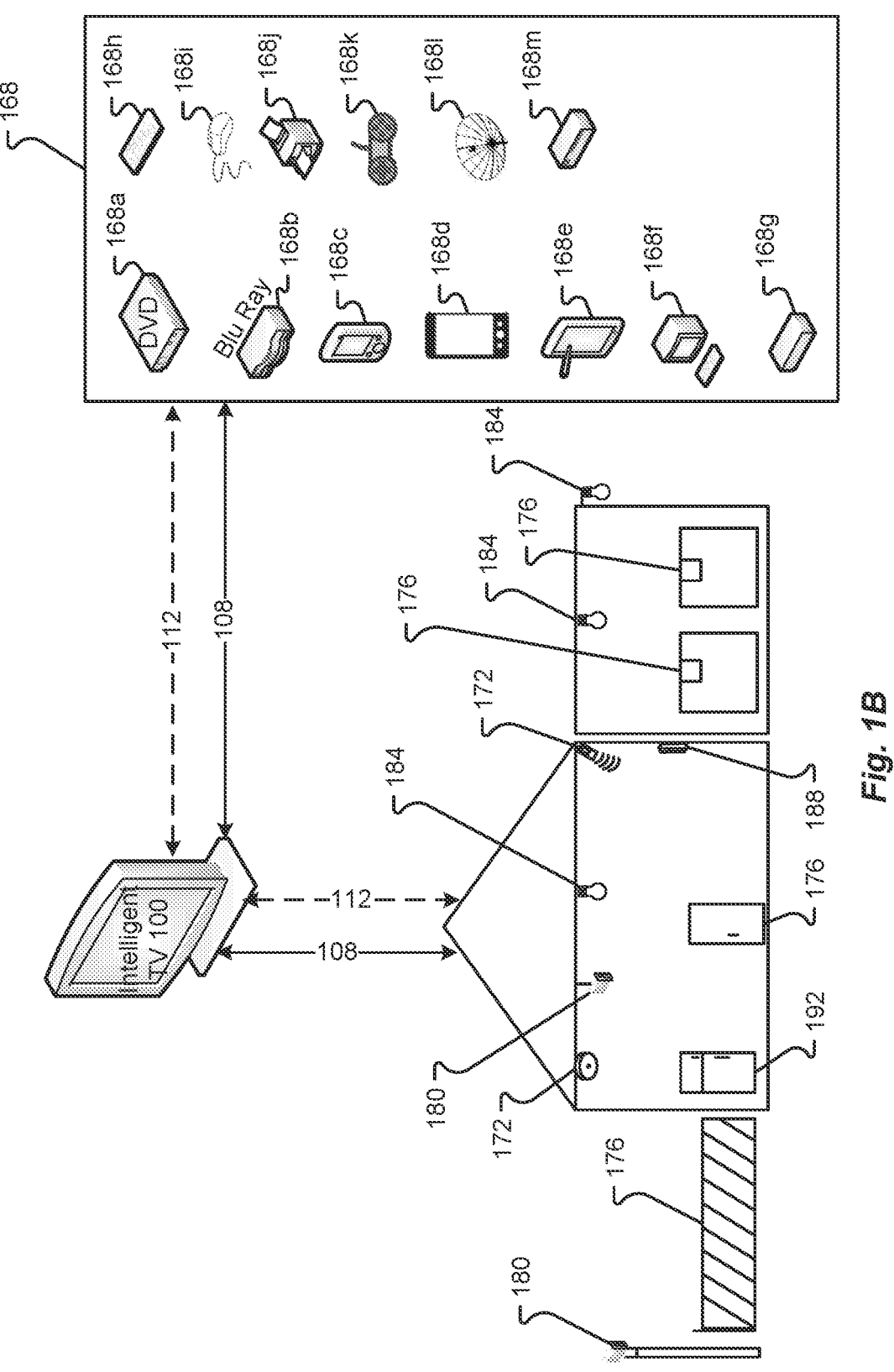
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter™, LinkedIn™ Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent IV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
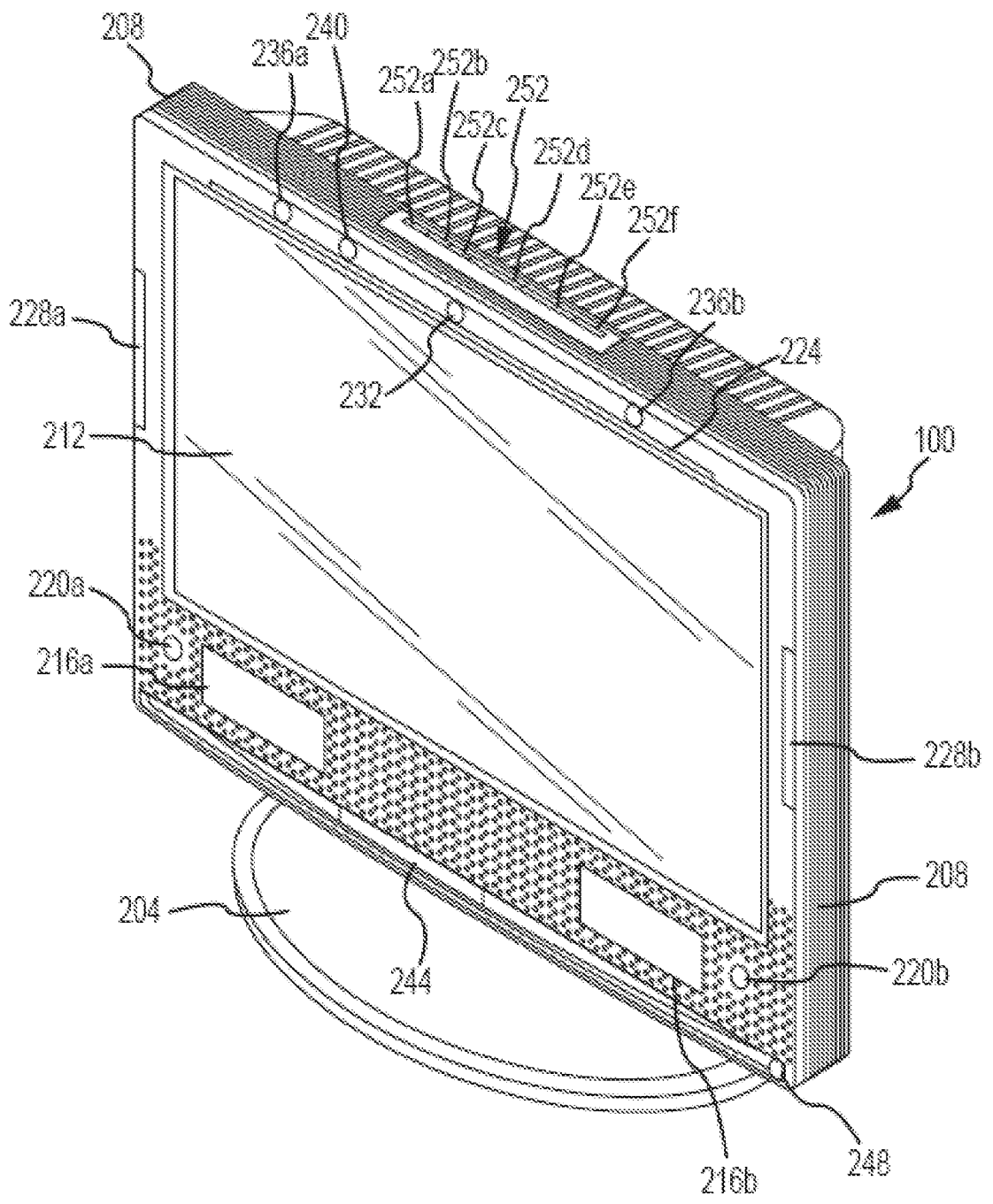
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252*a-f*, which can be configured for specific inputs. For example, the first button 252*a* may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
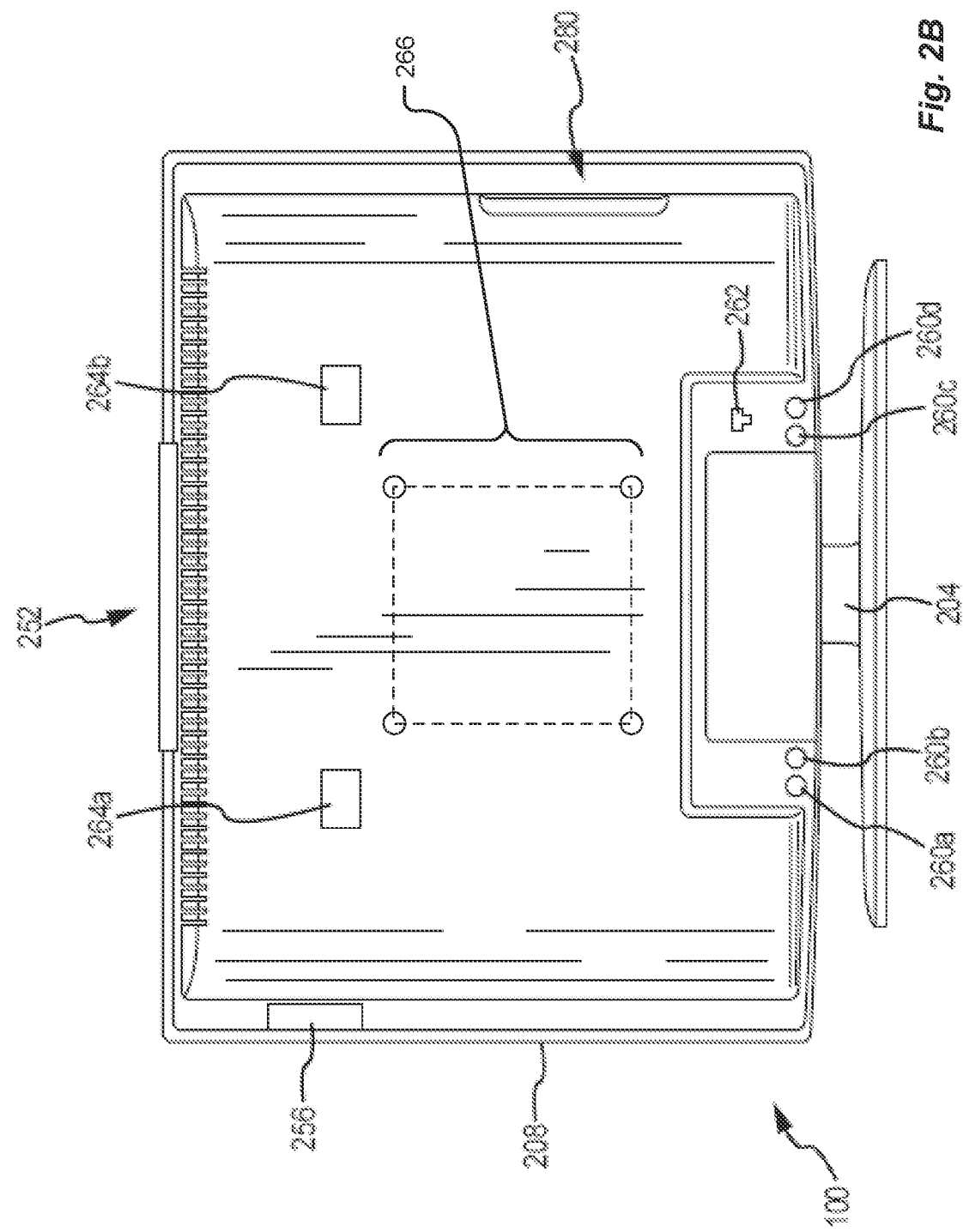
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one non-limiting example, the Intelligent TV 100 may incorporate at least one Video Equipment Standards Association (VESA) mounting interface for attaching the device 100 to the surface.

Figure 2C:
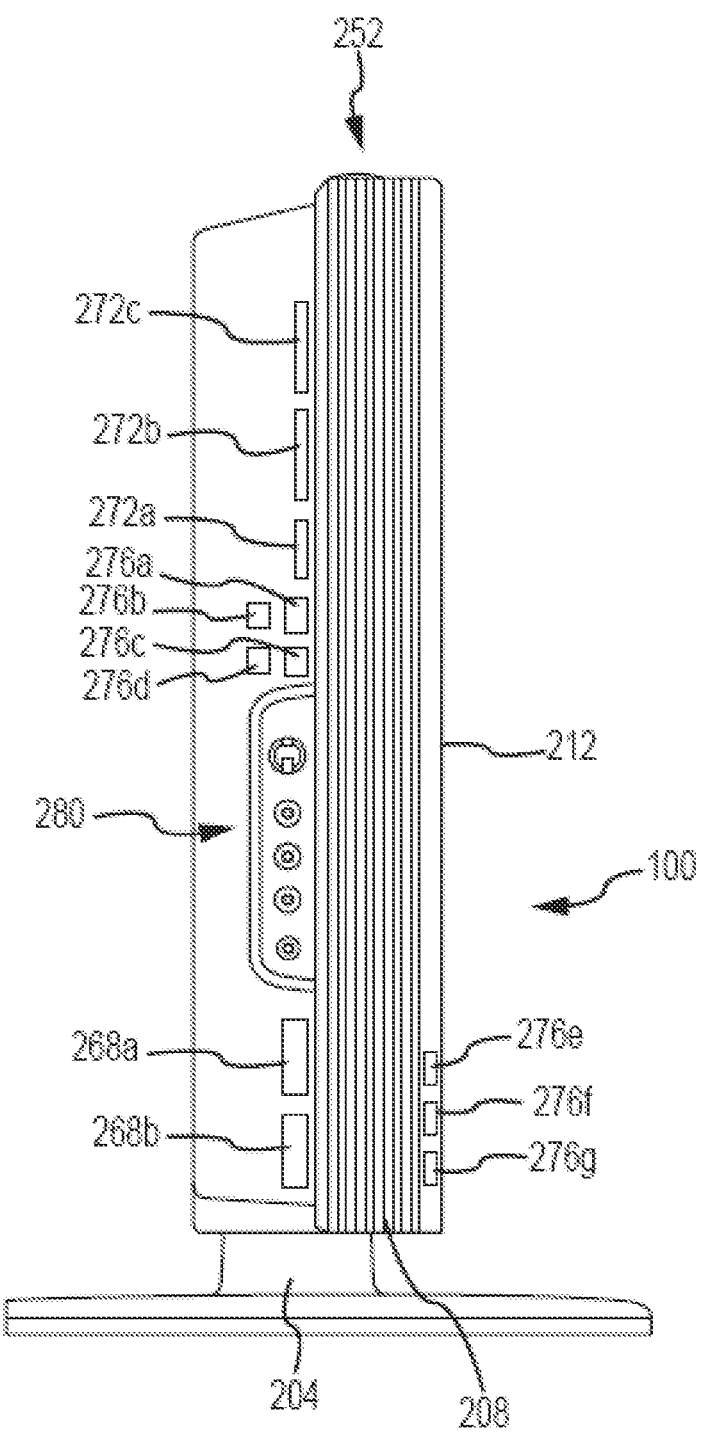
FIG. 2C includes a third view of an embodiment of an intelligent television.
Figure 2D:
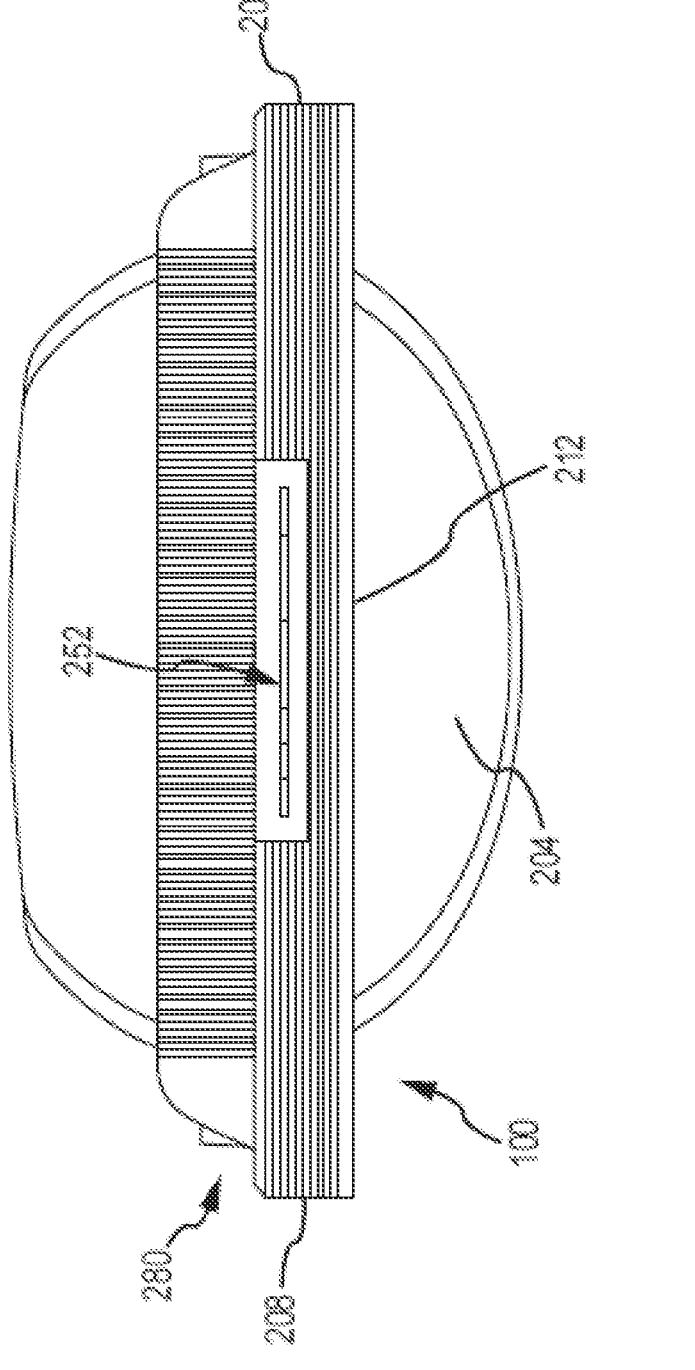
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
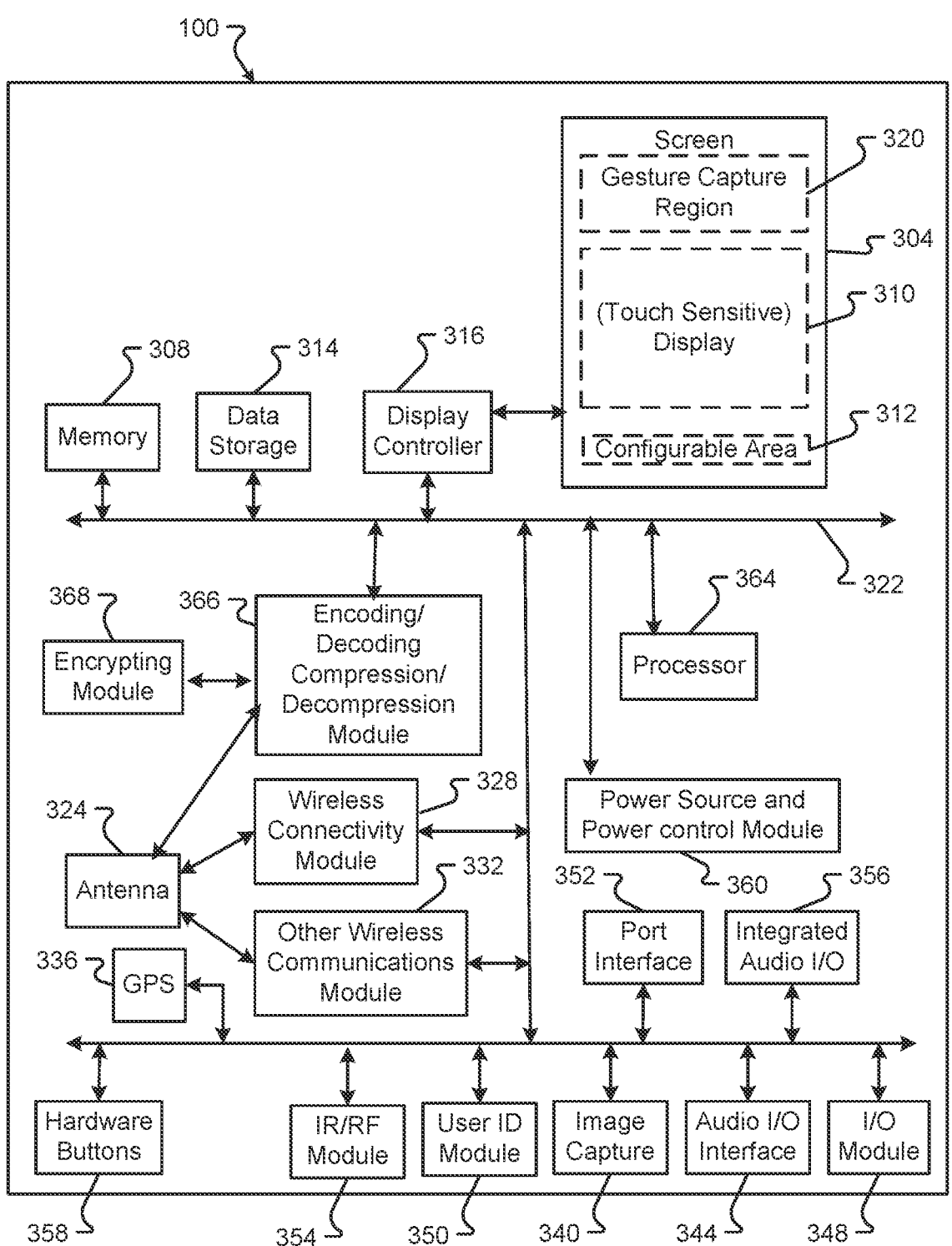
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
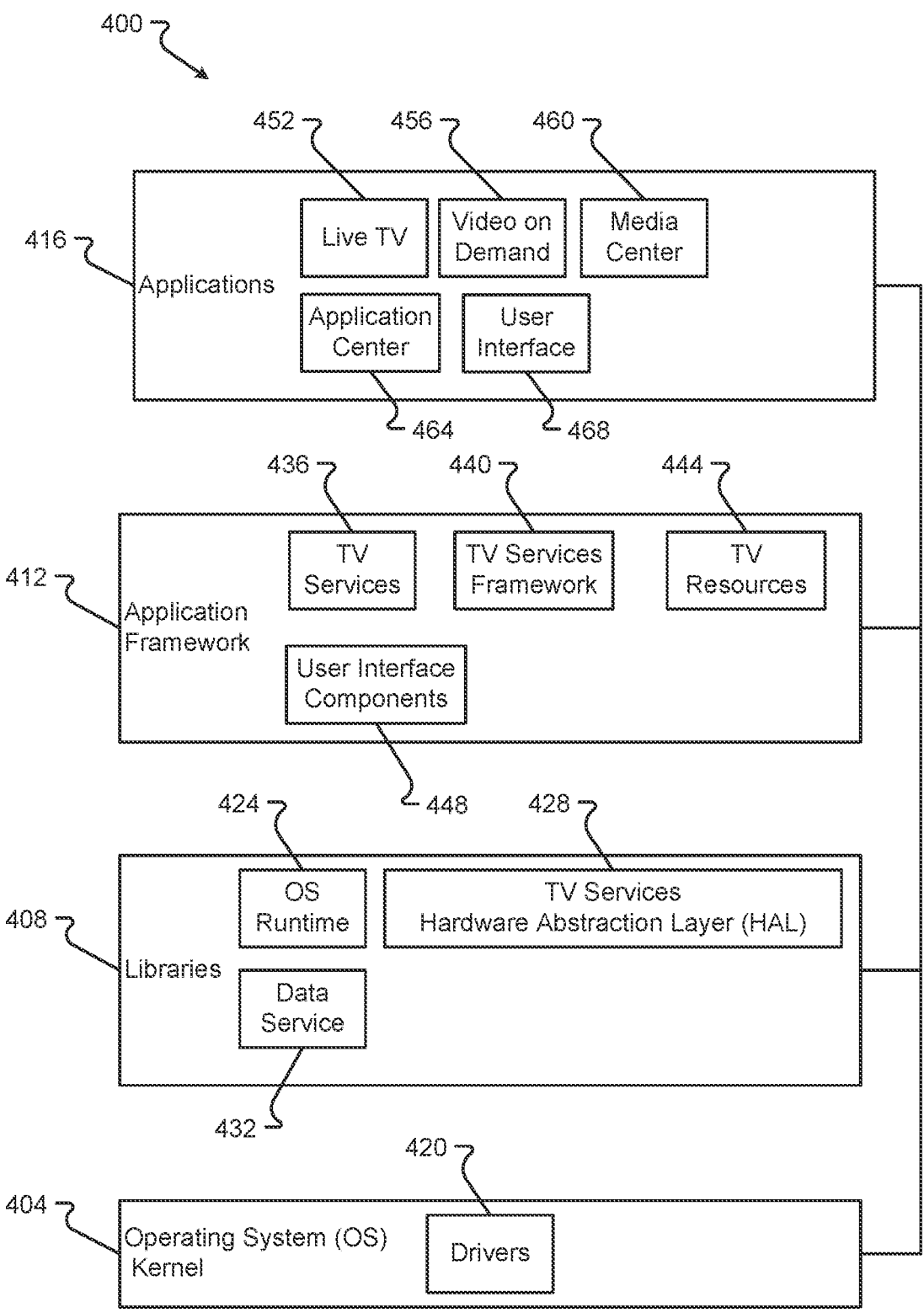
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
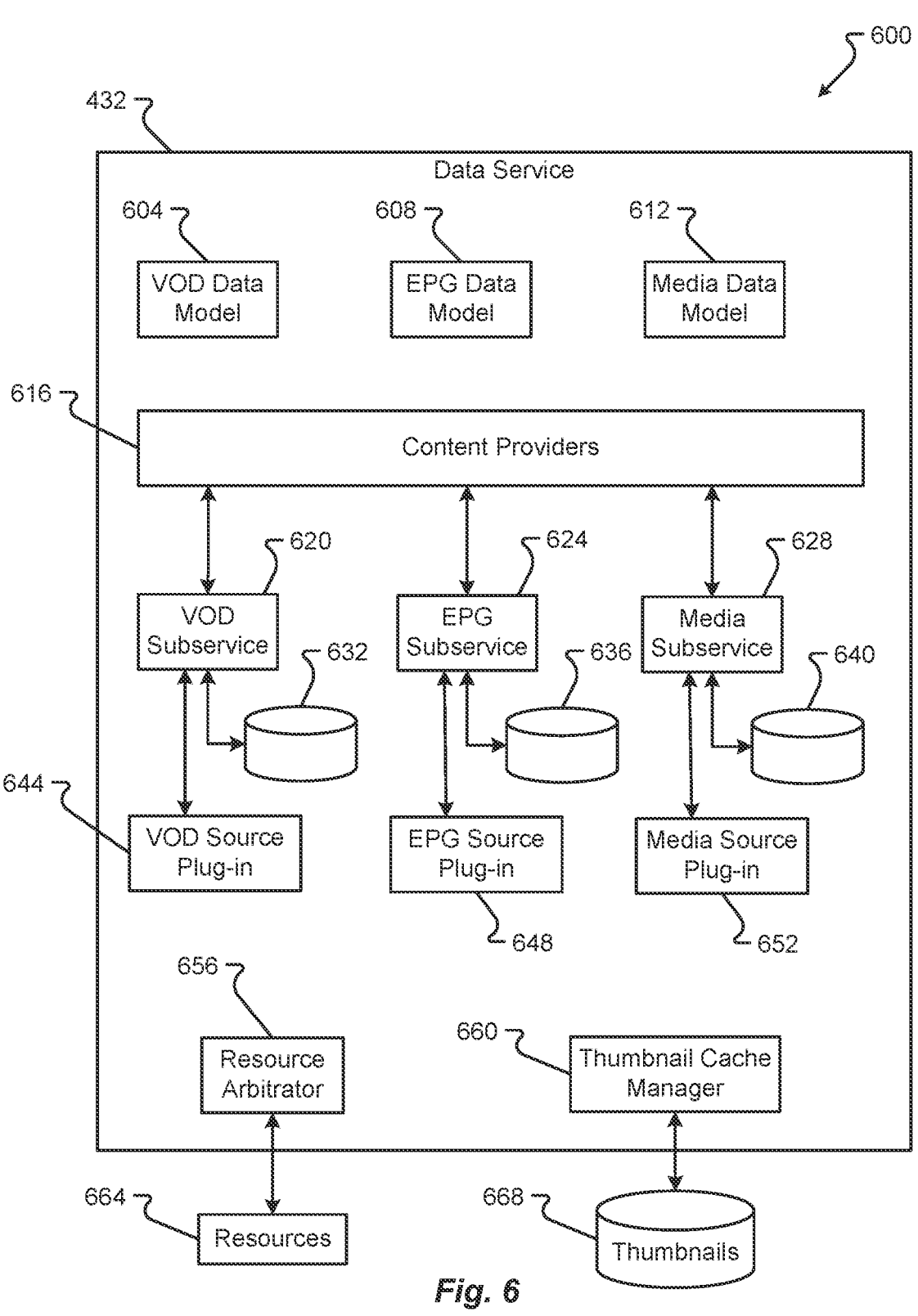
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a VOD application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The VOD application 456 can provide for video from different storage sources. Unlike Live TV application 452, VOD 456 provides for display of videos that are accessed from some memory source. The sources of the VOD can be associated with users or with the Intelligent TV or some other type of service. For example, the VOD 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or VOD. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
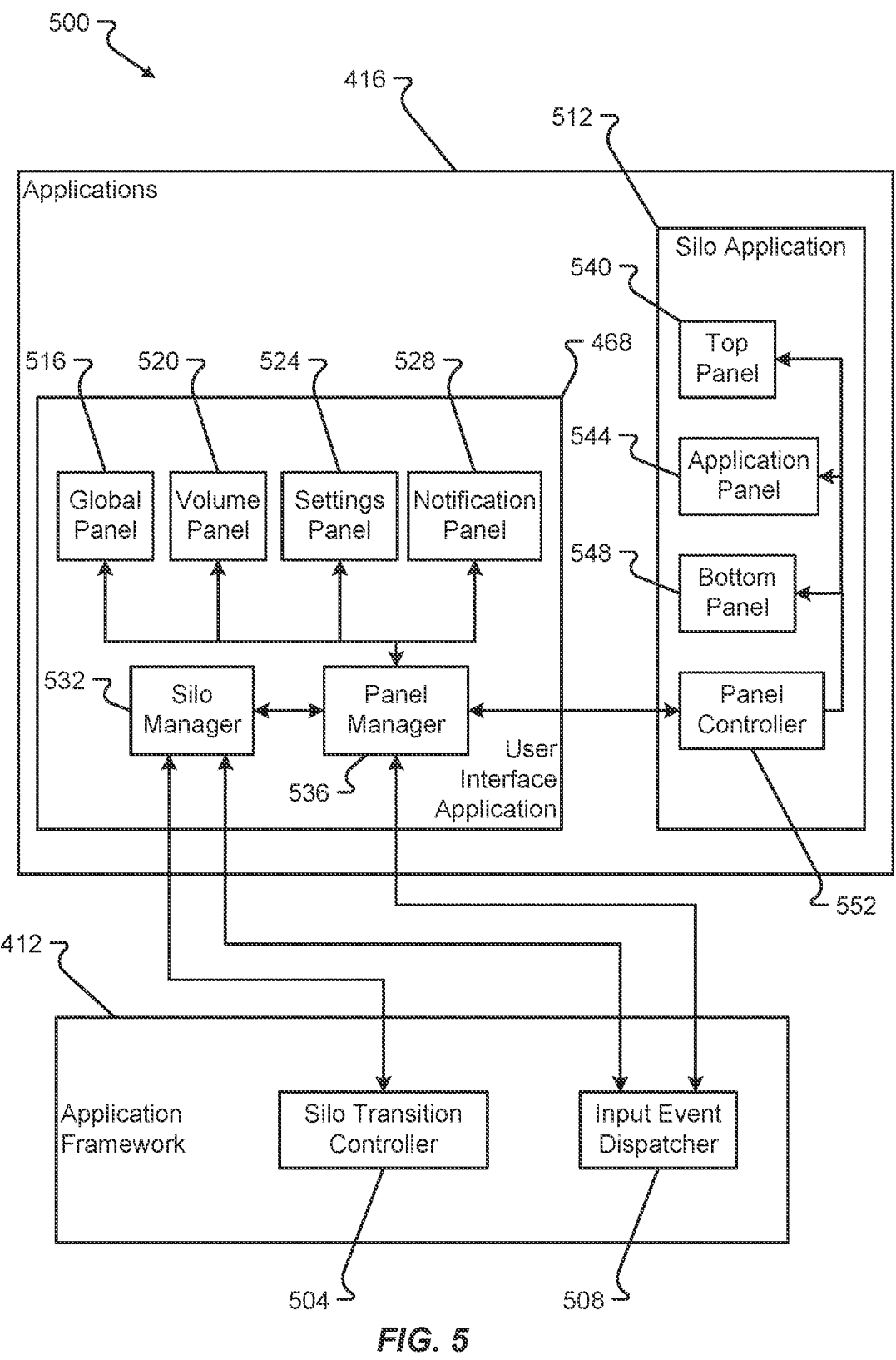
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. In one non-limiting example the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, VOD displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with VOD, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (VOD, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
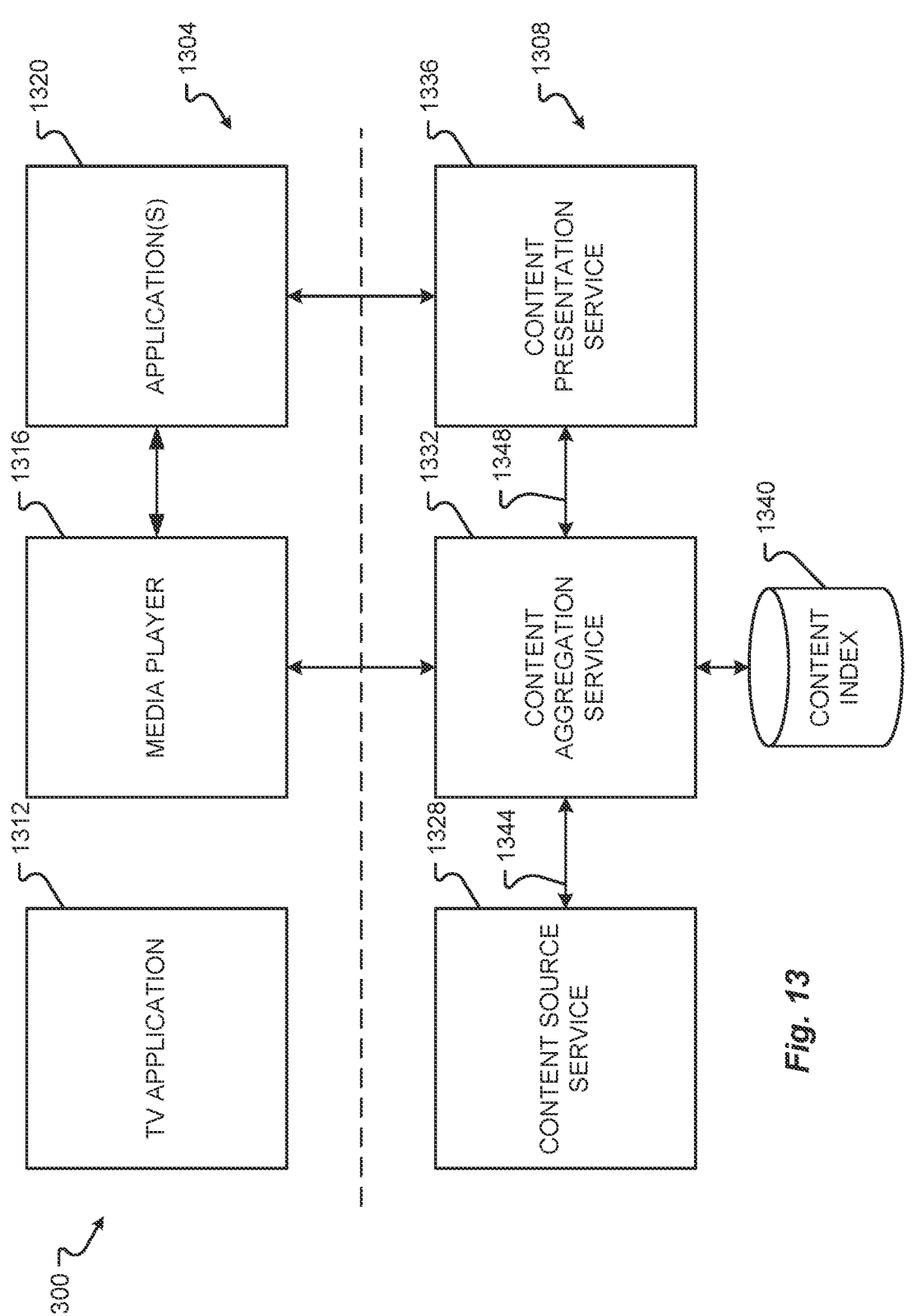
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application (s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
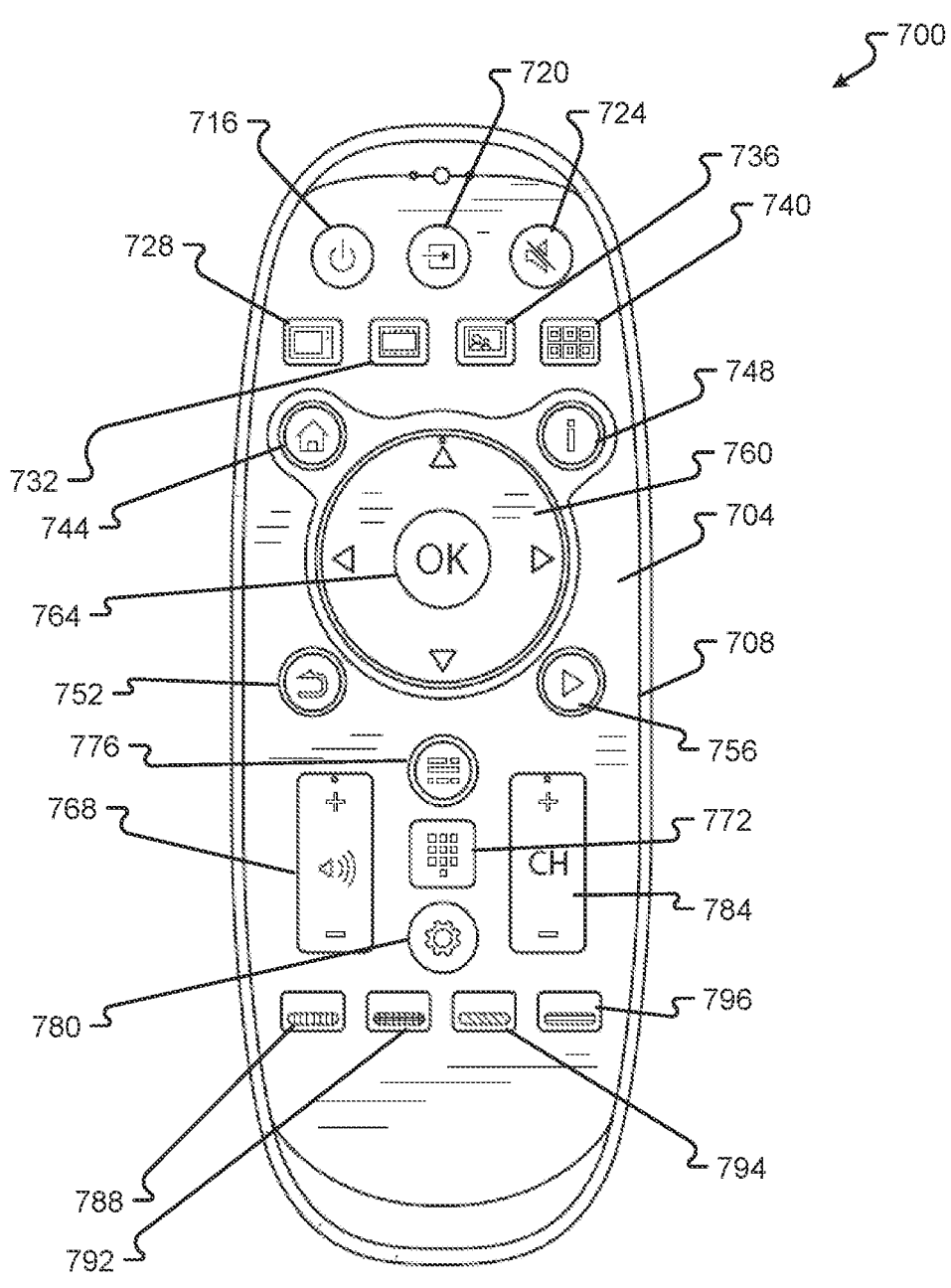
FIG. 7 is a plan view of an embodiment of a handheld remote control.
Figures 8, 9A:
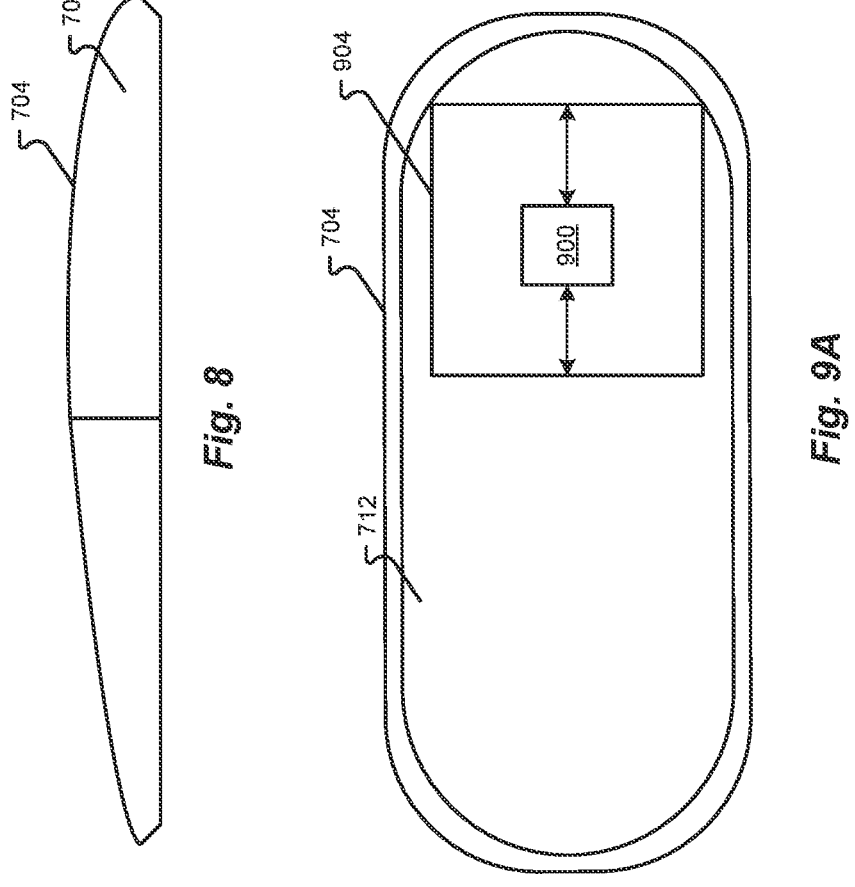
FIG. 8 is a side view of an embodiment of a remote control.
FIG. 9A is a bottom view of an embodiment of a remote control with a joystick in a neutral position.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, VOD, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a VOD (VOD) button 732 (to activate or select the VOD silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, VOD, media center, and application center are always connected/detected.

Figures 9B, 9C:
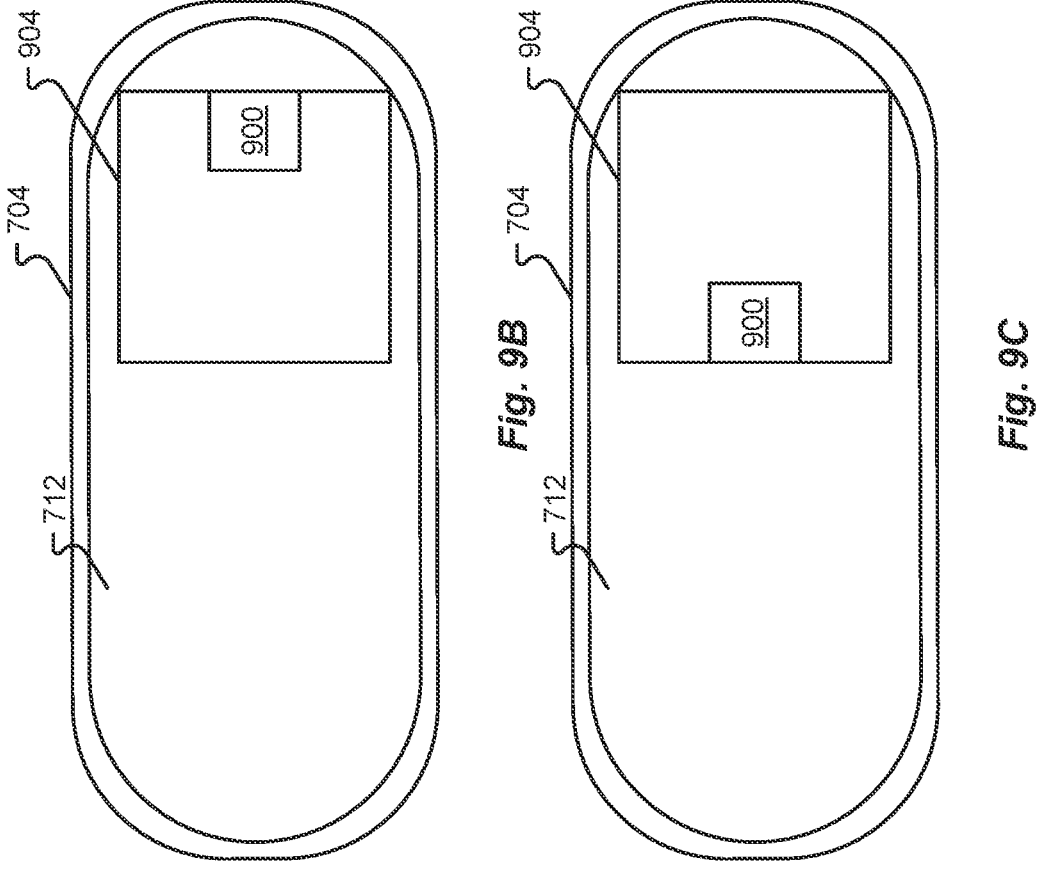
FIG. 9B is a bottom view of an embodiment of a remote control with the joystick in a lower position.
FIG. 9C is a bottom view of an embodiment of a remote control with the joystick in an upper position.
Figure 11A:
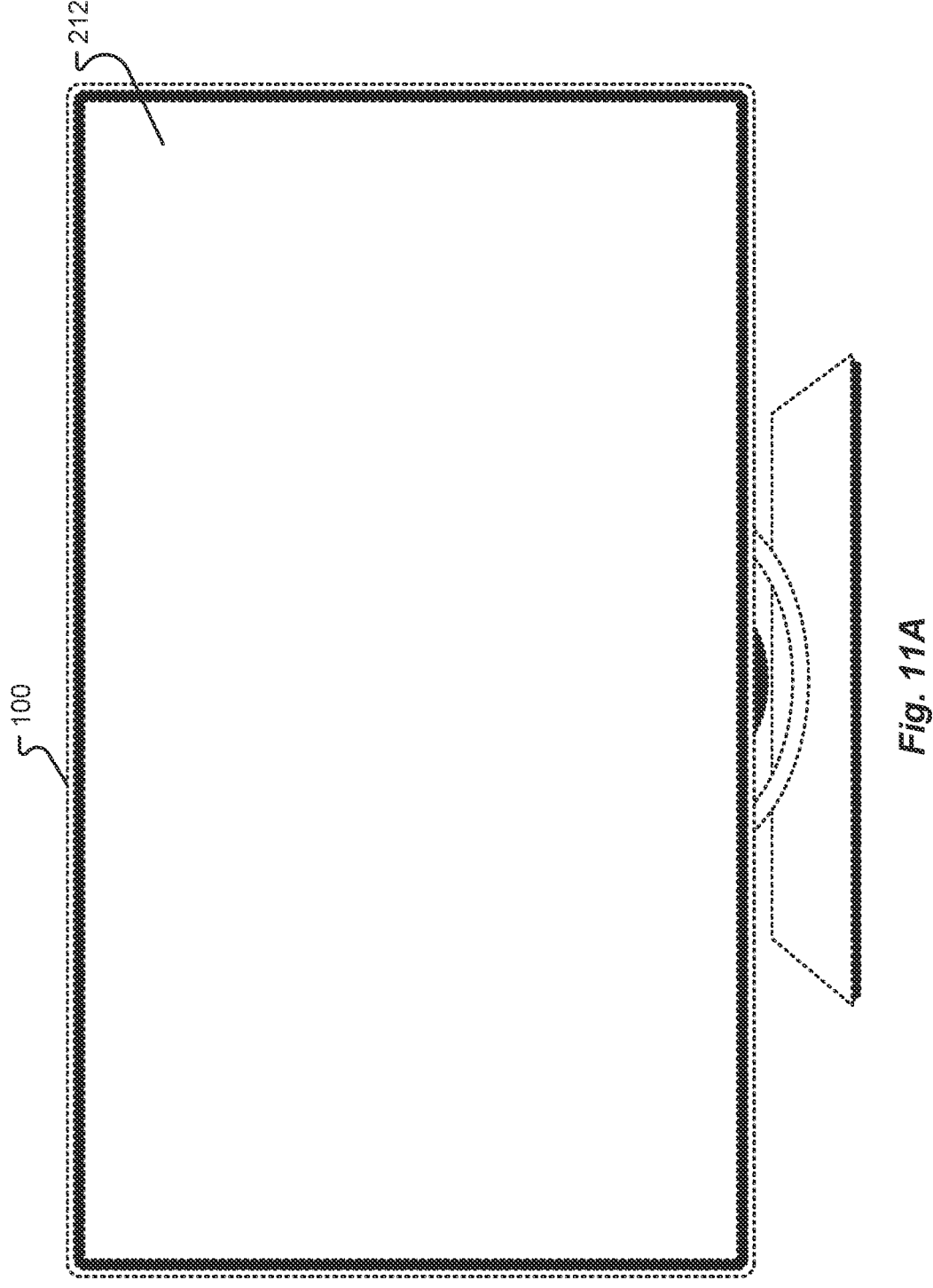
FIG. 11A is a front view of an embodiment of an Intelligent TV screen.
Figure 11B:
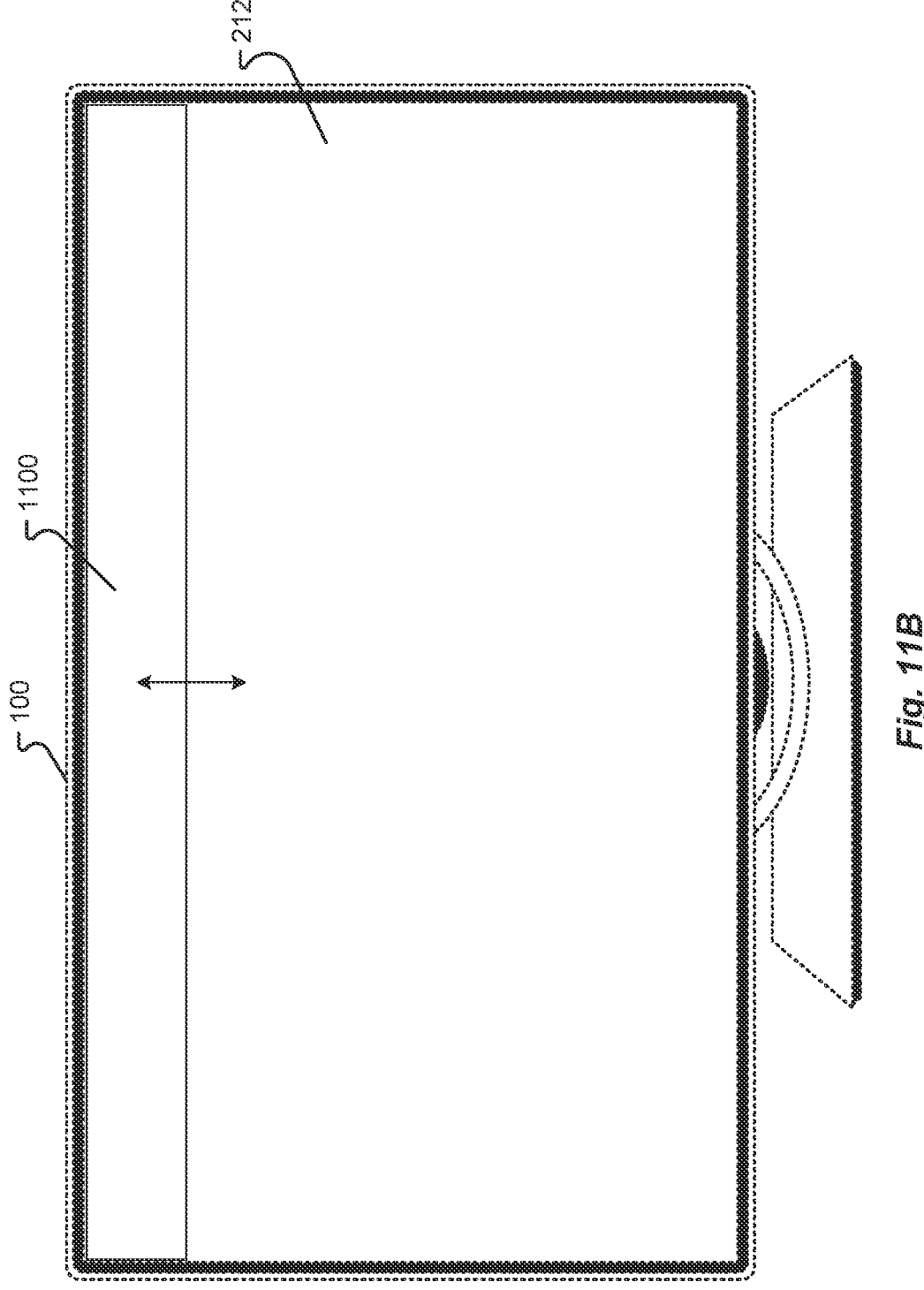
FIG. 11B is a front view of an embodiment of an Intelligent TV screen.
Figure 11C:
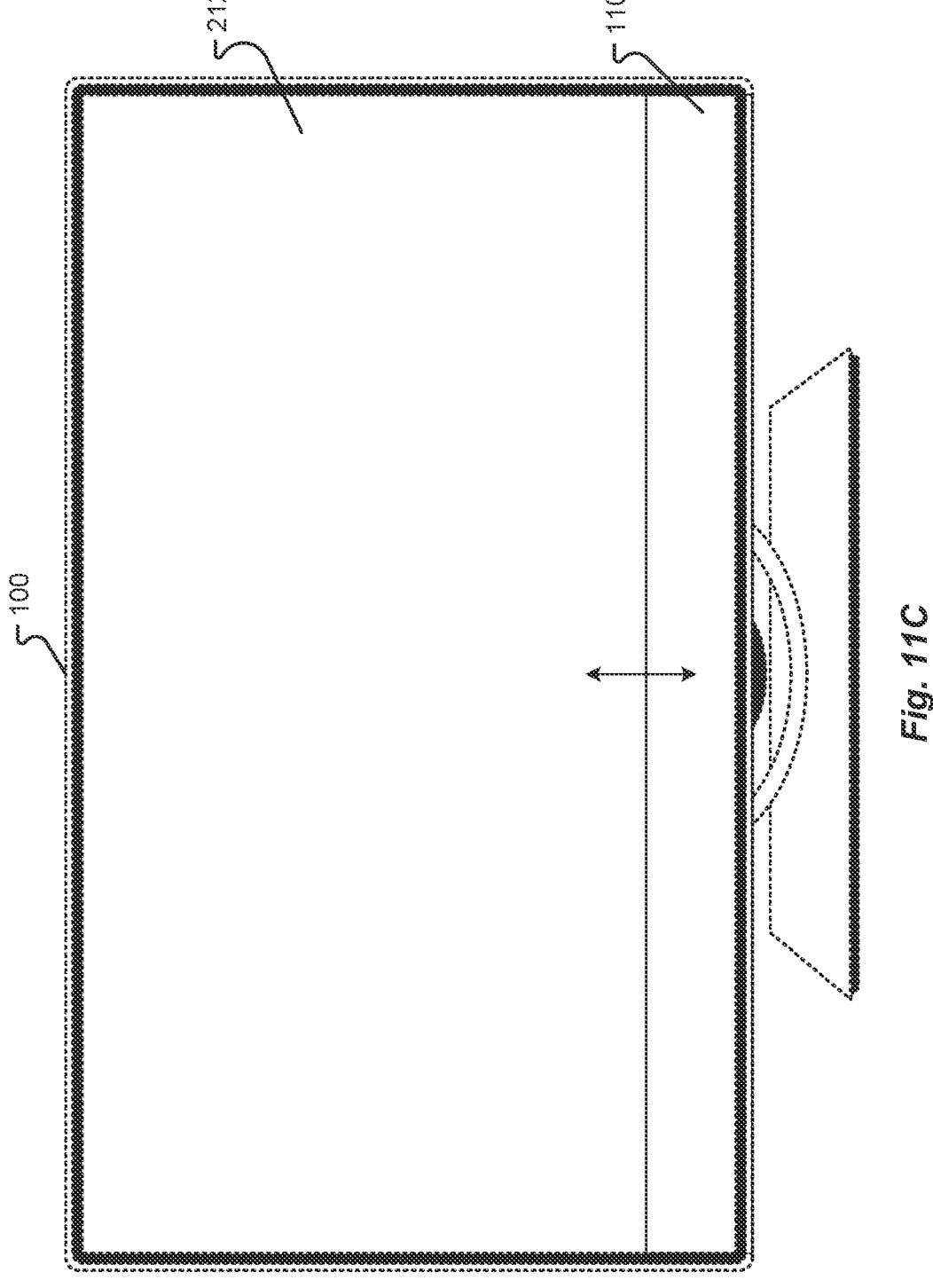
FIG. 11C is a front view of an embodiment of an Intelligent TV screen.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
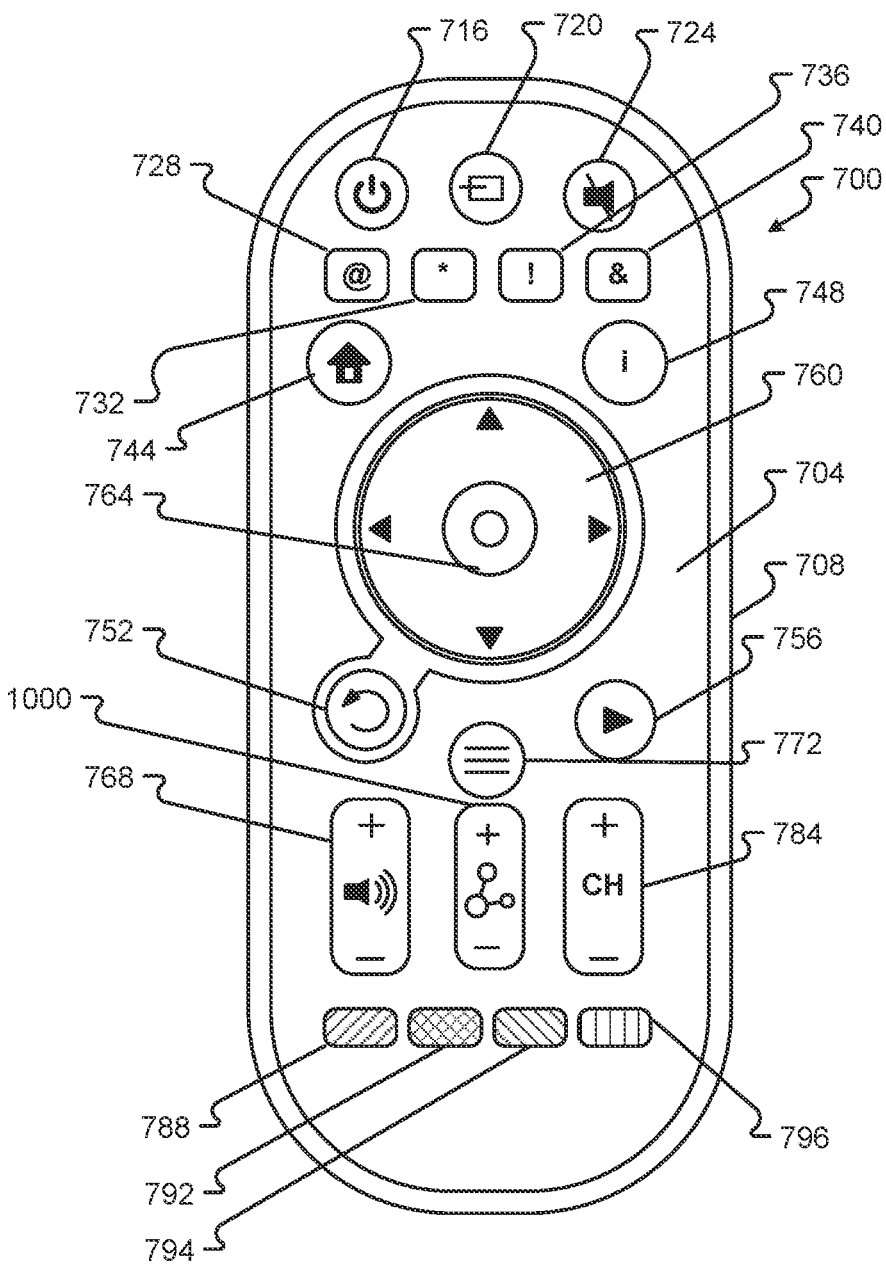
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, Google+™) or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
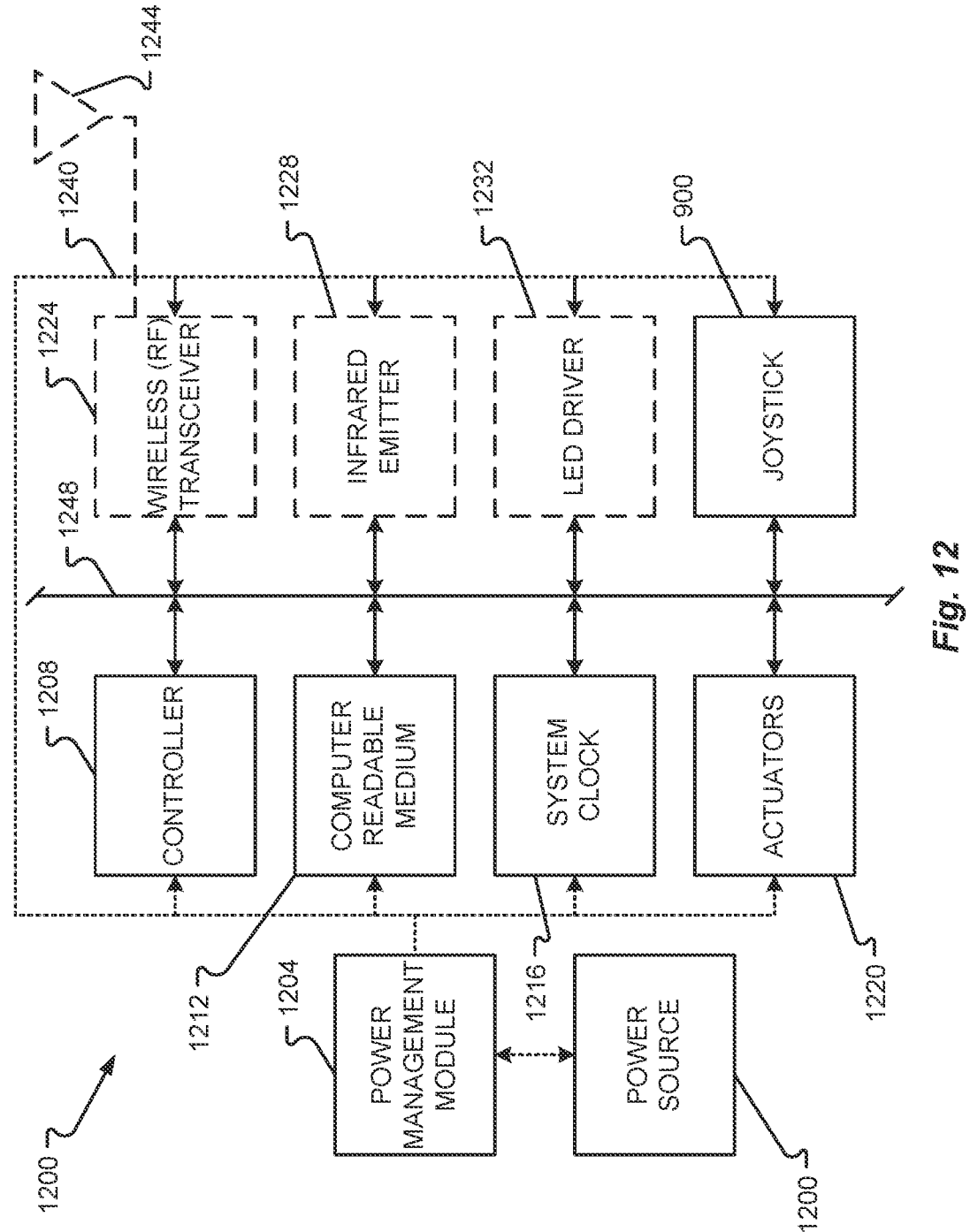
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
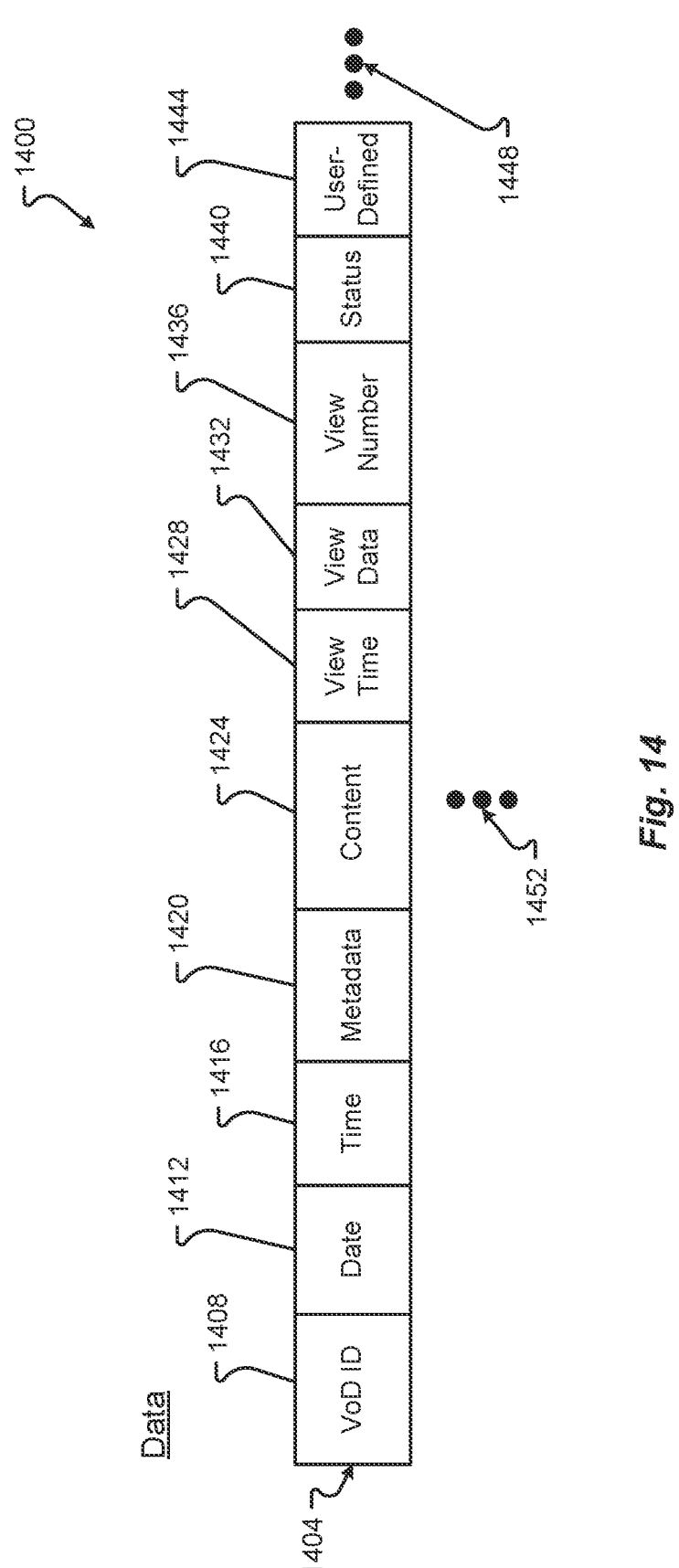
FIG. 14 is a block diagram of an embodiment of a VOD content database for an Intelligent TV.

An embodiment of a database 1400 for storing VOD content is shown on FIG. 14. In one non-limiting example, the database 1400 can include one or more data structures 1404 for storing individual items of content. The database 1400 can include more or fewer data structures 1404 than those shown in FIG. 14, as represented by ellipses 1452. Each data structure may contain one or more fields as shown in FIG. 14. However, each data structure may have more or fewer fields than those shown in FIG. 14, as represented by ellipses 1448.

The data structure 1404 can include one or more of, but is not limited to, a VOD identifier field 1408, a data field 1412, a time field 1416, a metadata field 1420, a content field 1424, a view time field 1428, a view date field 1432, a view number field 1436, a status field 1440, and/or a user-defined attribute field 1444. Each of the fields can contain information about an item of content. Content can mean any video, picture, music, or other multimedia that may be available to the user for viewing on the Intelligent TV 100. The fields may describe the content and/or information about the content.

A VOD identifier field 1408 can include an identifier that uniquely identifies the content associated with data structure 1404. The identifier can be any alphanumeric identifier, symbolic identifier, globally unique identifier (GUID), or other types of identifiers. The identifier in the VOD identifier field 1408 can uniquely identify the content in comparison to all other content, thus, the VOD identifier 1408 is the only identifier of its type used within the database 1400.

The date field 1412 may include a date at which the content was created and/or downloaded into the database 1400. The date 1412 can include any type of date format, and may be a day, a year, and/or a month. The time field 1416, similar to the date field 1412, can include a time at which the VOD was downloaded and/or created. The time 1416, with the date 1412, gives an indication to the Intelligent Television 100 about when this item of VOD content was available to the user.

Metadata field 1420 can include information about the VOD content. This information can include the genre of the VOD content, the actors within the content, the director for the VOD, the location in which the content was created, for instance, whether the content is movie made in the United States, an Indian movie, a European movie, etc., the year at which the movie was created, or other such information about the VOD content. This information may be used for collection sorting as described hereinafter. Field 1424 includes the data for the content. In one non-limiting example, the data can include an mpeg or other type of video format data, which can be stored within field 1424.

The view time and view date fields, 1428, 1432, can include the last time and date at which the user viewed the VOD content. Thus, the view time 1428 can include a time at which the user either began watching the last session with the content, or the time at which the user stopped watching the content during the last session. The view date 1432 also includes the month, day, and/or year in which the user decided to last watch the content.

The view number field 1436 may include a counter for the number of times the user has accessed and viewed the content in data structure 1404. The view count 1436 may be triggered by the viewing session that has lasted a predetermined period of time. For example, if the user watches an item of content for more than five minutes, the view number 1436 can increment. In other circumstances, any time an item of content is played, regardless of how long the user watches the content, the view count 1436 may increment. This view count 1436 persists into the future.

A status 1440 may indicate the status of the content from the last viewing session. For example, if the content was half watched, the status indictor 1440 will indicate that the content was half completed. In other examples, the status 1440 indicates only the first time status of the content. For example, during the first time the content is viewed, the status 1440 increments over some predetermined level, for example, a quarter watched, half watched, three-quarters watched, completely watched, etc. This status 1440 is maintained regardless of the number of times the content is viewed. Therefore, if a content is viewed a second time, the status 1404 may only show the content has been viewed. In other embodiments, the status 1440 may determine whether the content is new, recently viewed, a favorite, or other information.

User-defined field 1444 includes any kind of user-defined information about the content. For example, the user may set the content as a favorite, which may be stored in user-defined category 1444. There may be other user-defined 1444 information, such as, whether the content is for adults only, whether the content is to be maintained for a certain person, etc.

Figure 15:
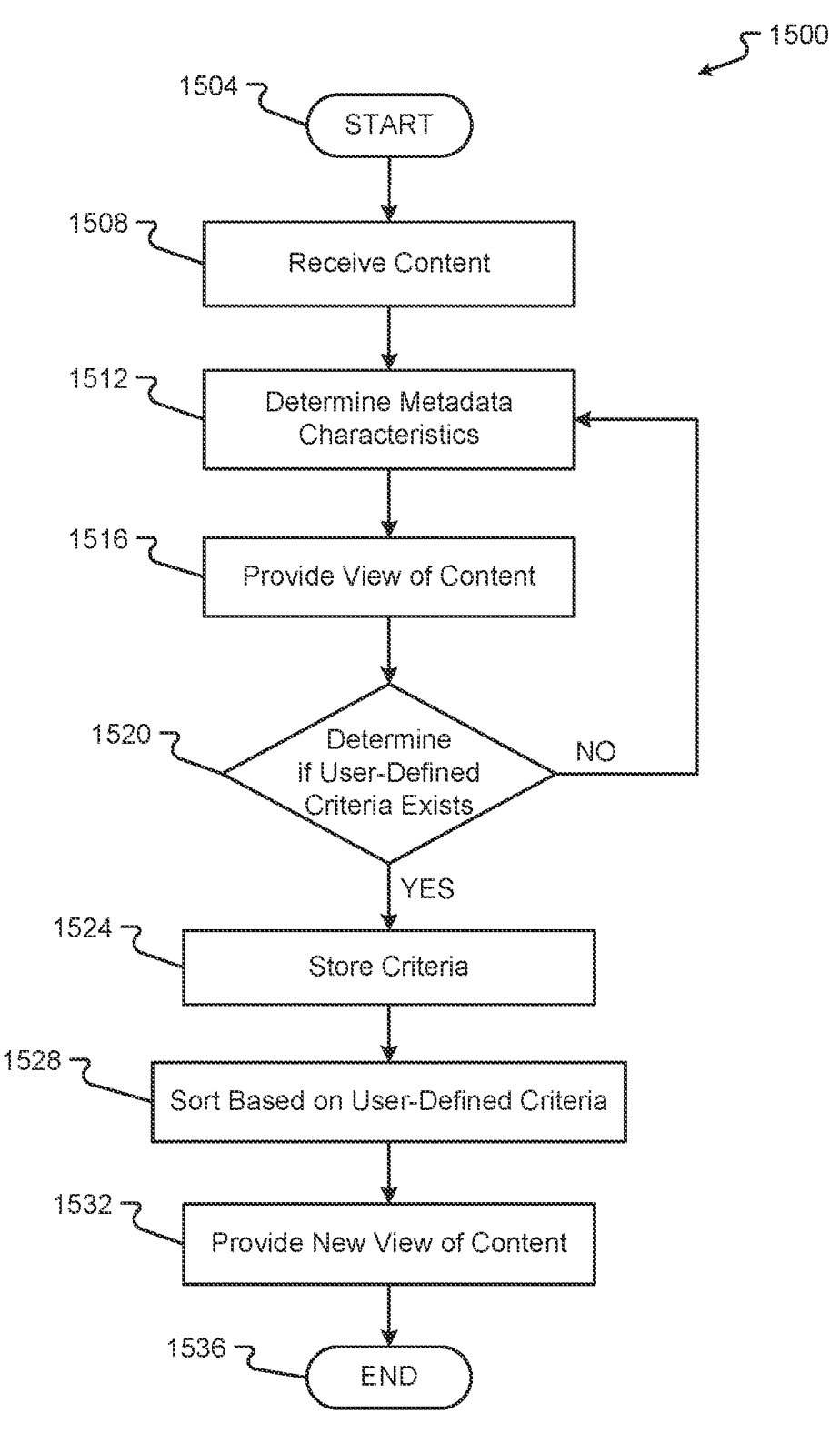
FIG. 15 is a flowchart view of an embodiment of a method for providing VOD in an Intelligent TV.

An embodiment of a method 1500 for sorting VOD collections is shown in FIG. 15. While a general order for the steps of the method 1500 is shown in FIG. 15, the steps may be arranged in any order. Generally, the method 1500 starts with a start operation 1504 and ends with an end operation 1536. The method 1500 can include more or fewer steps or can arrange the order of the steps differently than those shown in FIG. 15. The method 1500 can be executed as a set of computer-executable instructions, executed by a computer system, and encoded or stored on a computer readable medium. Further, the method 1500 can be executed by a gate or other hardware device or component in an Application Specific Integrated Circuit, a Field Programmable Gate Array, or other type of hardware device. Hereinafter, the method 1500 shall be explained with reference to the systems, components, modules, software, data structures, user interfaces, etc. described herein.

The Intelligent TV 100 can receive content, in step 1508. In one non-limiting example, the Intelligent TV 100 may connect through a network 132 to media application 150, or another source, such as digital media library 148 for information about VOD content. This VOD content may be retrieved or pushed to the Intelligent TV 100. Regardless, the VOD content can be received through the port interface 352 and provided to the processor 364. In one non-limiting example, the processor 364 can execute a VOD subservice 620, which can receive the content through an instance of the VOD source plug-in 644. The VOD source plug-in 644 can retrieve or receive the VOD content and provide the VOD content to the VOD subservice 620 to be stored in database 632. Database 632 may be the same or similar to database 1400 as described in conjunction with FIG. 14. Thus, the information about the VOD content and the VOD content itself may be sorted and stored in fields 1408 through 1424.

Thereinafter, the user may select a button on the remote control 700, such as button 740, to preview or look at available VOD content. The VOD subservice 620 may read the metadata field 1420 to determine information about the VOD content. The metadata characteristics 1420 may then be used to sort the VOD content into collections, in step 1516. For example, the video subservice 620 can sort the VOD content into a collection based on geographical area or date of issue of the VOD. The VOD subservice 620 may then provide this information to the panel manager 536 of the user interface application 468. The panel manager 536 may then provide a view of the content, in step 1518. This view may be a sorted selection of content, such as a collection view 1704, shown in FIG. 17.

Thereinafter, the user may provide user-defined criteria. The user-defined criteria may be entered through a remote control 700, or some other user interface, and can be provided to the VOD subservice 620. The user-defined criteria may be stored in the user-defined field 1444 of database 1400. Thereinafter, the VOD subservice 620 may determine if there are user-defined criteria that exist, in step 1520. In one non-limiting example, the user may enter a button on remote control 700 to sort the content based on the user-defined criteria. The VOD subservice 620 may then read any information from the user-defined field 1444 to determine if criteria exist. If no criteria exist, the method 1500 moves through the NO branch back to step 1516 to sort the collections based on metadata. However, if user-defined criteria does exist, the method 1500 proceeds YES to step 1524.

In step 1524, the VOD subservice 620 may receive the criteria and store that criteria in field 1444, in step 1525. Thus, if the data or criteria is being received by the user, the VOD subservice 620 can store any user-defined criteria in field 1444.

Thereinafter, the VOD subservice 620 may access the user-defined criteria 1444 to sort the collection or VOD content, in step 1528. The VOD subservice 620 may determine the sort that is desired by the user based on inputs into user interface and use that information to sort the content view. The sort may be based on such things as whether or not the content is a favorite, whether the content is appropriate for children, or some other type of criteria. Once sorted, the VOD subservice 620 provides the sort information to the panel manager 536 to provide a view of the sorted content, in step 1532. The content may have a similar view 1704, shown in FIG. 17, but have a different arrangement of the content thumbnails based on the sort criteria.

Figure 16:
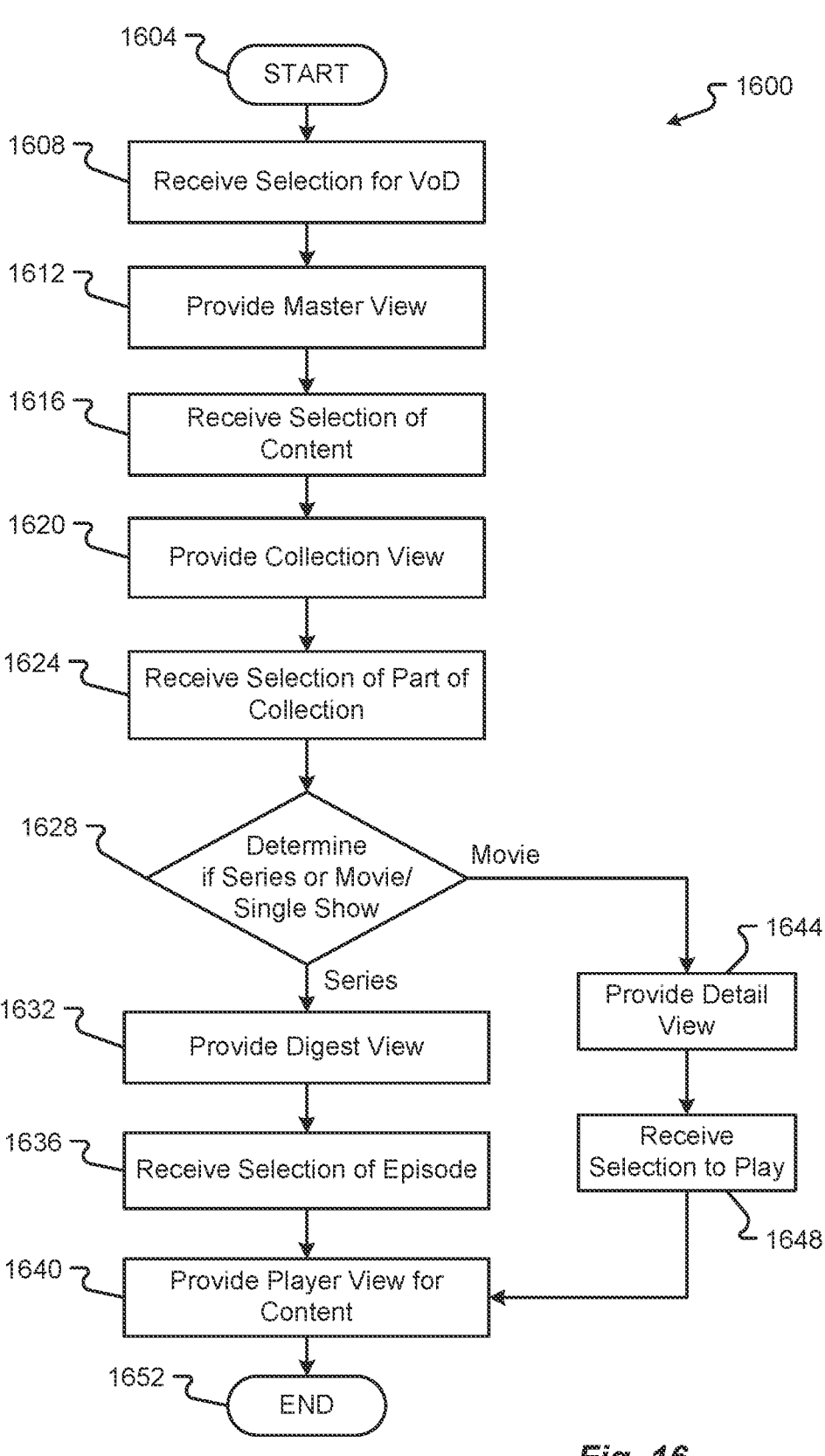
FIG. 16 is a flowchart view of an embodiment of a method for providing VOD in an Intelligent TV.

An embodiment of a method 1600 to provide a series of contextual and easily understood panels to navigate through VOD content is shown in FIG. 16. While a general order for the steps of the method 1600 is shown in FIG. 16, the steps may be arranged in any order. Generally, the method 1600 starts with a start operation 1604 and ends with an end operation 1652. The method 1600 can include more or fewer steps or can arrange the order of the steps differently than those shown in FIG. 16. The method 1600 can be executed as a set of computer-executable instructions, executed by a computer system, and encoded or stored on a computer readable medium. Further, the method 1600 can be executed by a gate or other hardware device or component in an Application Specific Integrated Circuit, a Field Programmable Gate Array, or other type of hardware device. Hereinafter, the method 1600 shall be explained with reference to the systems, components, modules, software, data structures, user interfaces, etc. described herein.

The Intelligent TV 100 can receive a selection for VOD content, in step 1608. In one non-limiting example, the user may select a VOD button 740, on a remote control 700, which sends a signal to the IR/RF module 354 of the Intelligent TV 100. The signal may then be sent to the processor 364, which translates the signal with a driver 420, and provides the information to the user interface 468 and the VOD subservice 620. The panel manager 536 and/or the silo manager 532 may then receive the signal through the input event dispatcher 508 from the processor 364 and act upon the signal to provide a master view of the content, in step 1612.

Figure 17:
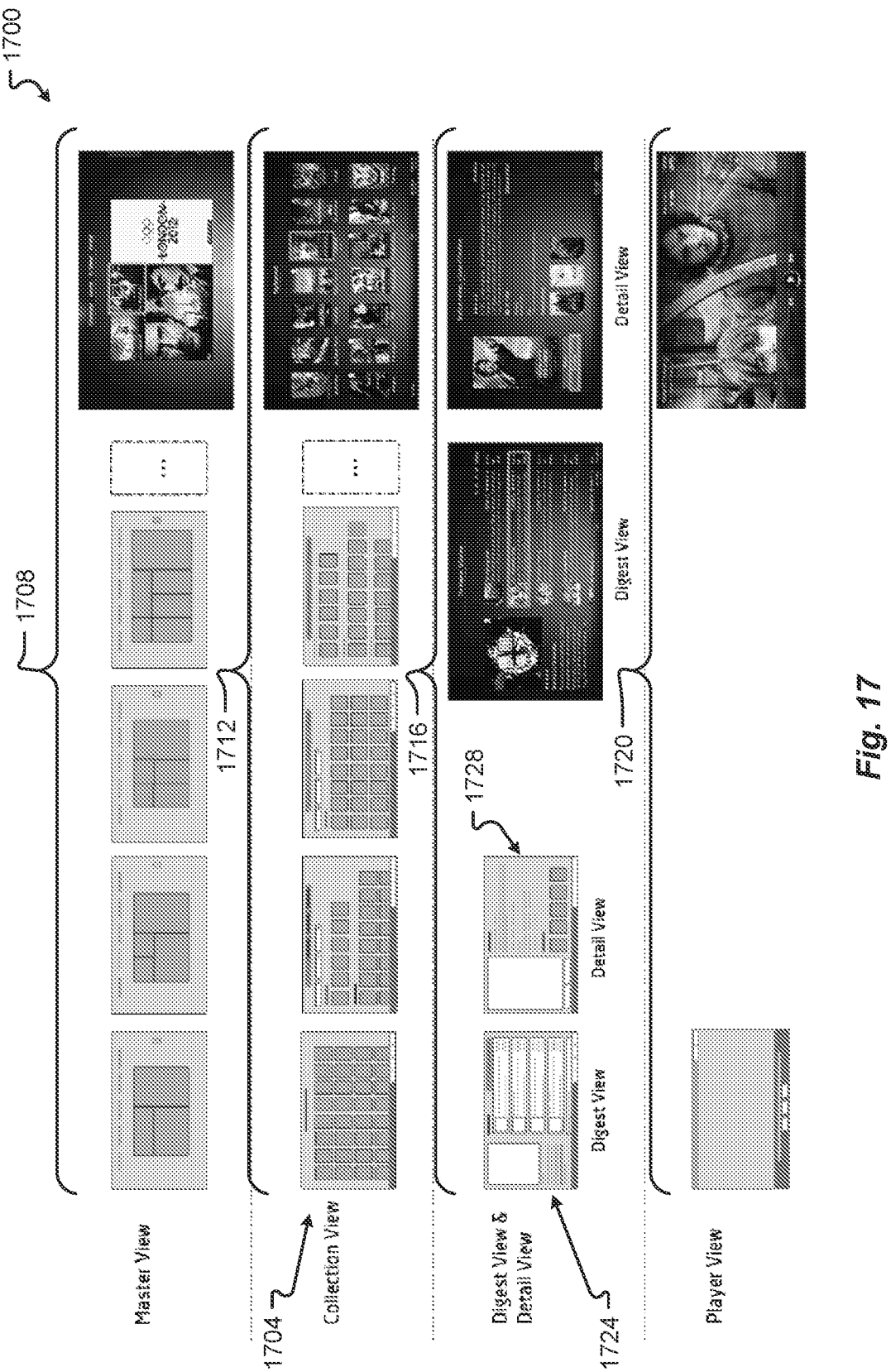
FIG. 17 is a view of an embodiment of a user interface for an Intelligent TV.
Figure 18:
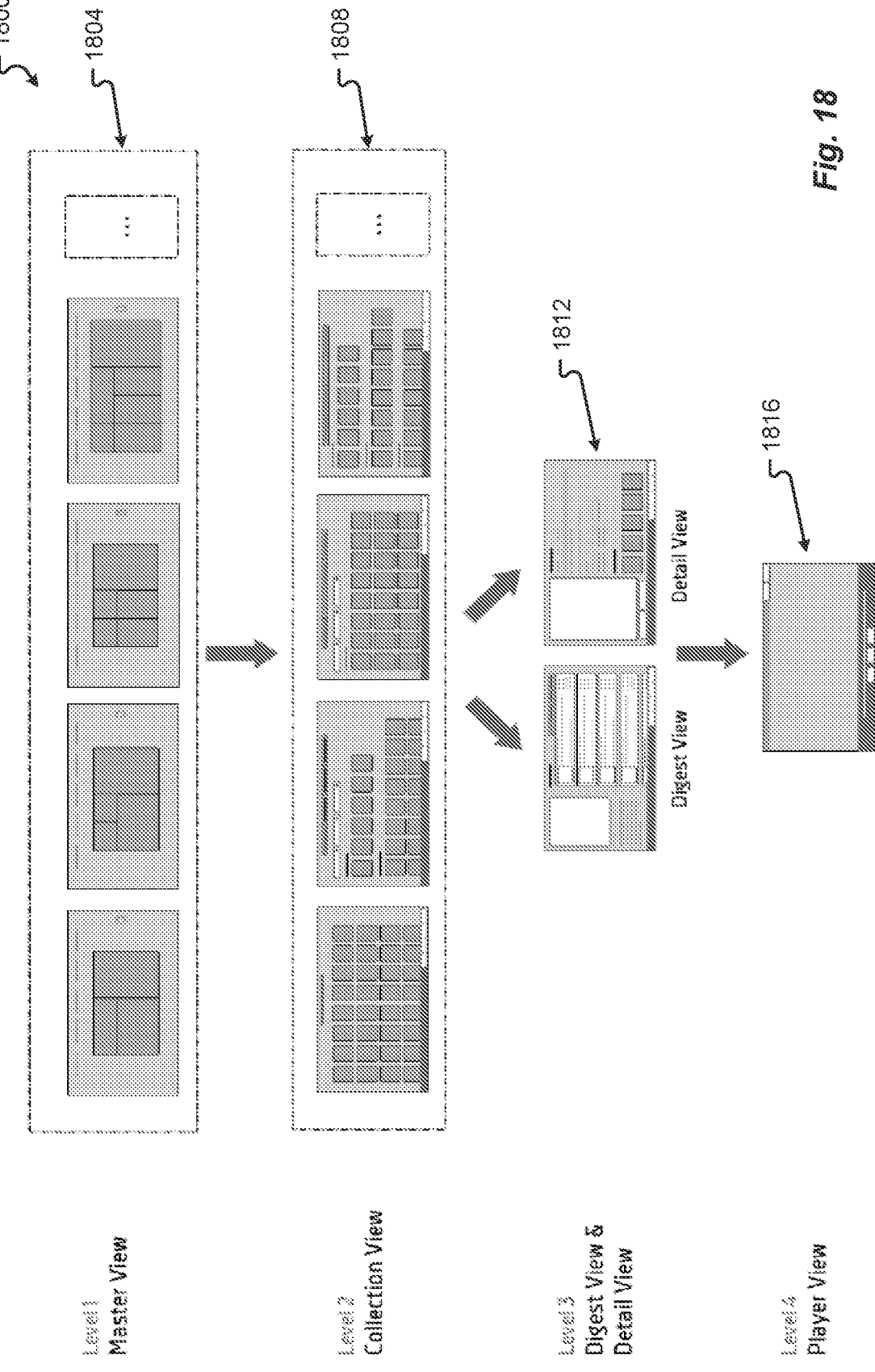
FIG. 18 is a view of an embodiment of a user interface for an Intelligent TV.

The views for the VOD content are broken down into a series of hierarchical steps that allow the user to easily navigate through VOD content. For example, the hierarchical steps may be as shown in FIG. 17 and FIG. 18. In one non-limiting example, a set of user interfaces 1700, 1800 proceed through four categories to play VOD content. A master view selection 1708, 1804 is a top tier user interface that allows the user to select a type of collection shown in tier 1712. A collection view 1704, 1808 uses a list of media based on a target or sort criteria. The user may then select some type of content from the collection view 1808 to be provided in either a digest view 1724 or a detail view 1728 in tier 1716, 1812. A digest view 1724 shows a view of a television series or series of episodes, where a description of the series and a set of episodes is provided. If there is no series with the content selected, the detail view 1728 may be provided, which gives information for the content which was selected. From one of these views, the user may then select a particular content to play or select a play icon, which may then provide a player view 1816 in tier 1720. In the player view 1816, the actual content is provided to the user and played per their selection.

Figure 19:
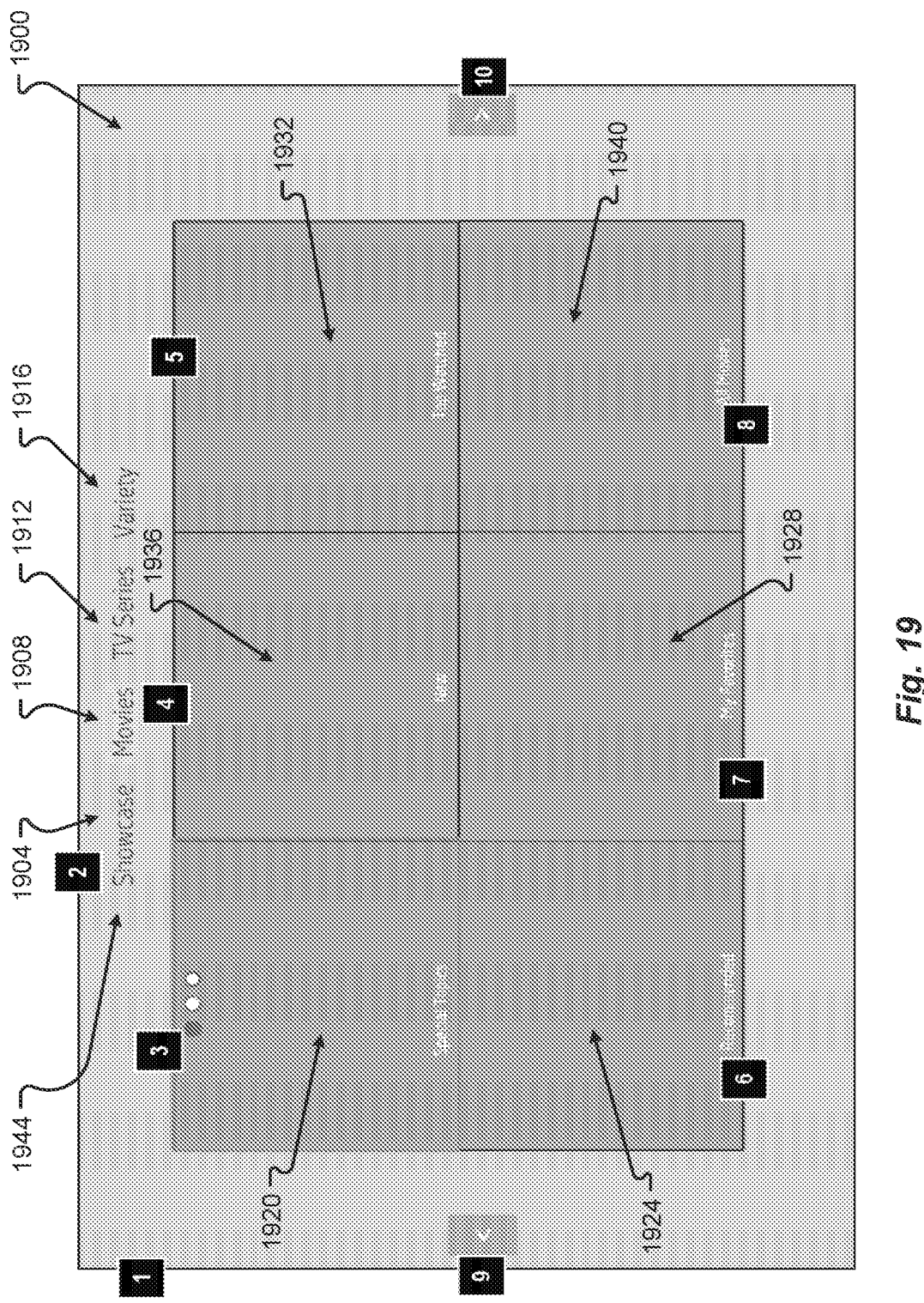
FIG. 19 is a view of an embodiment of a user interface for an Intelligent TV.

Thus, the panel manager 536 upon having a receipt of VOD can provide the master view to the user. The master view 1900 then presents information as shown in FIG. 19. A header navigation bar 1944 provides for selections of types of VOD content. For example, the user can select showcase material 1904, movies 1908, TV series 1912, or variety programs 1916. This first selection may allow the user to navigate to a content or collection view, including that type of material. Further, there are a series of thumbnails to select to navigate to different types of collections. For example, the user can select a special topics icon 1920 to proceed to special content. The user can select a recommended thumbnail 1924 to navigate to a recommenced collection. The user can select favorites thumbnail 1928 to navigate to a favorite's collection. Similarly, the user can select a top watched thumbnail 1932 or a new thumbnail 1936 to navigate to either the top watched content or the new content. Finally, the user can select an all movies thumbnail 1940 to view a collection of all movies currently available as VOD. The user may then make a selection of a collection using the directional pad 760 or some other remote control button.

The selection signal may then be received thorough the IR/RF module 354 and provided to the processor 364 to be translated by a driver 420 and the can be sent to the user interface 468. In one non-limiting example, the user interface 468 may receive collection information from the VOD subservice 620. A selection of content in the collection of content may be received, in step 1616, and can cause the panel manager 536 to provide a collection view 1712, in step 1620. The user may then select the type of content from the collection view, where this signal is received by the processor 364, in step 1624.

The VOD subservice 620 may then determine if the received selection is a movie, a single show, a series, or other types of content. In this way, the VOD subservice 620 can determine if a digest view or a detail view should be provided. If the selection is associated with a series with two or more episodes, a digest view 1724 should be provided. In contrast, if a single show, movie, or a series with only a single episode is selected, a detail view 1728 should be provided. Thus, the VOD subservice 620 or the panel manager 536 can determine if the selection is a movie or a series. If the selection is a series, the method 1600 proceeds through the SERIES branch to step 1632. If the selection is a movie or single show, the method 1600 moves through the MOVIE branch to step 1644.

In step 1632, a digest view 1724 may be provided to the user. A digest view, similar to that shown in view 1724, FIG. 17, provides a description or view of the series and then the ability to select one or more episodes in that series. The user may then move the focus onto a single episode using the directional pad 760, or some other user interface device, and select the episode to be viewed. This selection may then be received by the processor 364 and provided to user interface application 468. The selection of the episode 1636 causes the user interface to request content information 1424 from the VOD subservice 620, which can provide that content information 1424 from database 1400 to the user interface application 468. The user interface application 468 may then provide a view of the content, in step 1640. For example, the user interface application 468 can provide a player view 1720, which shows the content being viewed.

In the detail view provided by the user interface application 468, in step 1644, the user interface application 468 provides information specific about a single show, movie, or episode. This detail view may be the same or similar to view 1728, shown in FIG. 17. The user may select to play the episode from the detail view 1728. This selection to play may be received by the processor 364, in step 1648, through similar procedures as provided above. The selection can cause the user interface application 468 to provide a player view 1720 and provide a view of the content, in step 1640, similar to the processes as that described above.

The series of views that are performed by executing process 1600 can be as shown in FIG. 18. In one non-limiting example, the series 1800 includes a master view selection 1804. By selecting something in the master view, a collection view from the set 1808 is provided. By selecting a type of content within the collection view, the Intelligent TV 100 provides either a digest view or a detailed view, such as in set 1812. By selecting to play an episode in set 1812, the Intelligent TV 100 provides a player view 1816. FIG. 18 shows the hierarchical order of the menus, which is intuitive to a user.

Figure 20:
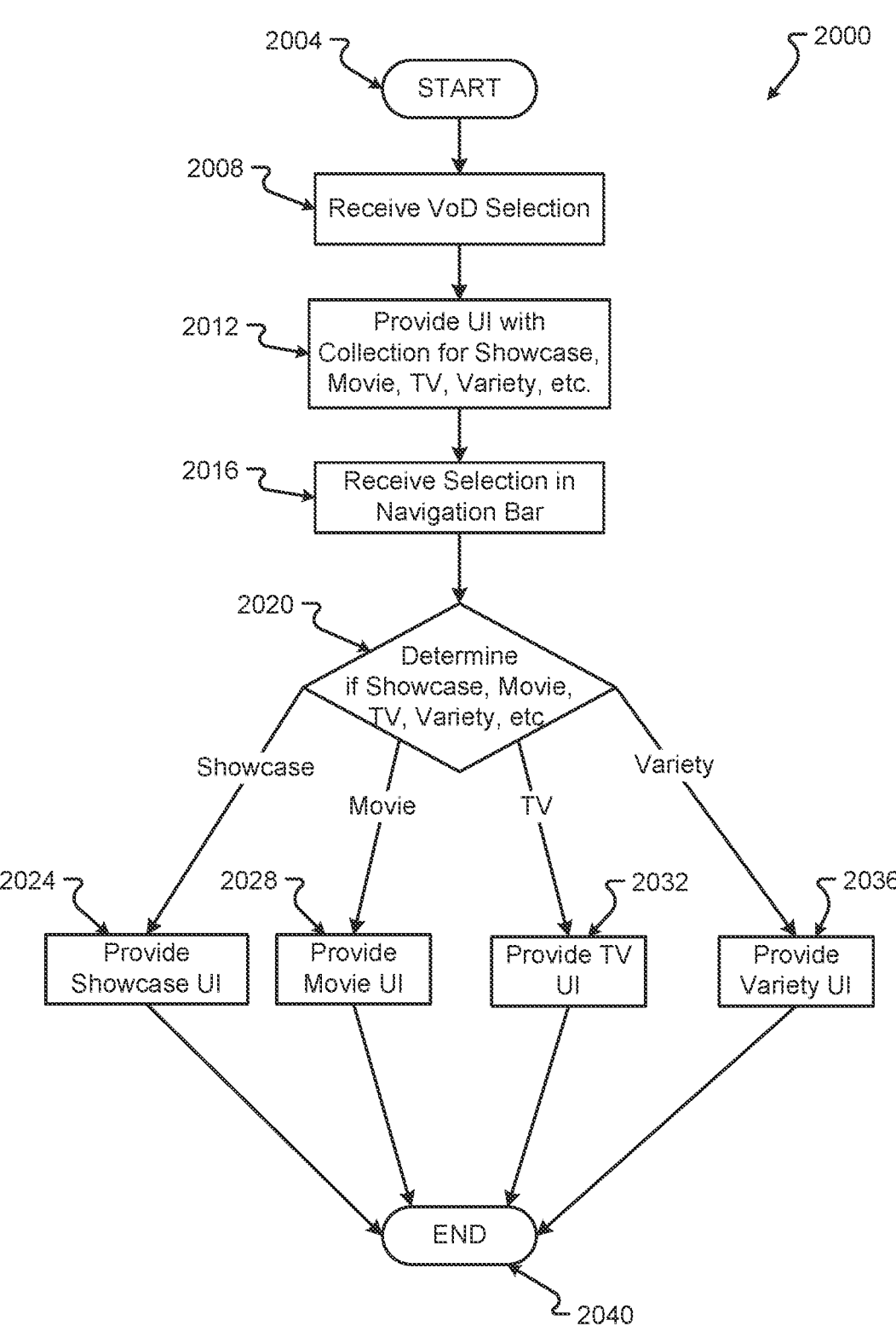
FIG. 20 is a flowchart view of an embodiment of a method for providing VOD in an Intelligent TV.

A method for providing several views of programming is shown in FIG. 20. While a general order for the steps of the method 2000 is shown in FIG. 20, the steps may be arranged in any order. Generally, the method 2000 starts with a start operation 2004 and ends with an end operation 2040. The method 2000 can include more or fewer steps or can arrange the order of the steps differently than those shown in FIG. 20. The method 2000 can be executed as a set of computer-executable instructions, executed by a computer system, and encoded or stored on a computer readable medium. Further, the method 2000 can be executed by a gate or other hardware device or component in an Application Specific Integrated Circuit, a Field Programmable Gate Array, or other type of hardware device. Hereinafter, the method 2000 shall be explained with reference to the systems, components, modules, software, data structures, user interfaces, etc. described herein.

The user may select a VOD request through the remote control 700, by selecting button 740, in step 2008. The VOD selection may be received through the IR/RF module 354 at the processor 364. The signal may be translated by a driver 420 and provided to the VOD subservice 620 and/or the user interface application 468.

Figure 21:
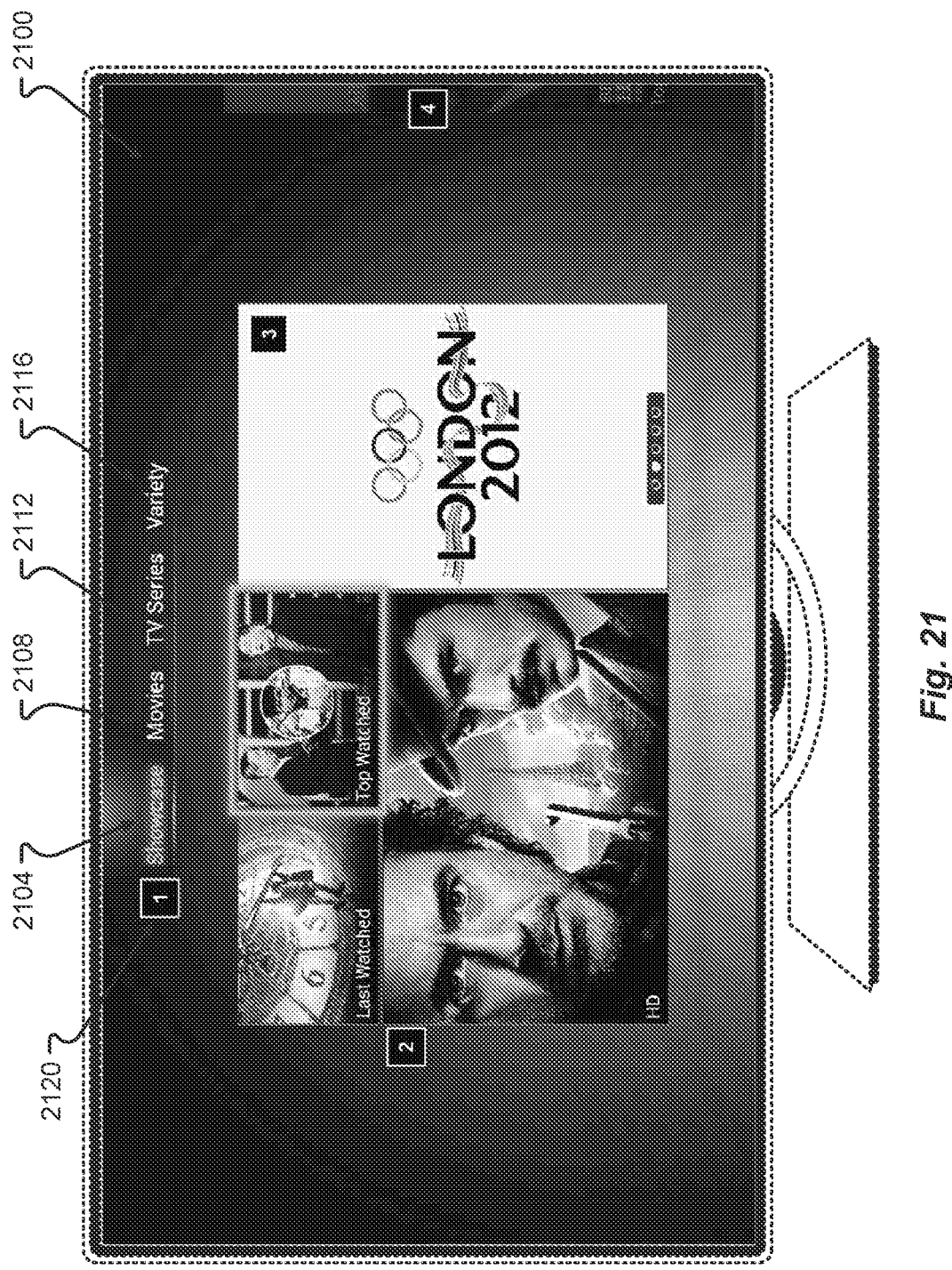
FIG. 21 is a view of an embodiment of a user interface for an Intelligent TV.

The user interface application 468 may execute a panel manager 536 or silo manager 532 through the input event dispatcher 508 to switch to the VOD silo through the silo transition control 504. The silo manager 532 may then provide a master layout view with collections for showcase, movie, TV, and variety programs, in step 2012. For example, the panel manage 536 may provide the panel shown in FIG. 21. In one non-limiting example, the user interface 2100 provides a navigation bar 2120 having selectable devices 2104 through 2116. The device 2104 allows the user to select a master layout view for showcase material. The user interface device 2108 allows the user to select a master layout view for movies. The user interface device 2112 allows the user to select a master layout for TV series, while selecting device 2116 provides a master layout for variety programs.

The user may then use the directional pad 760, or some other remote control button on remote control 700, to select one of the four user interface devices, 2104 through 2116, on the navigation bar 2120. For example, the user may put the focus (e.g., the focus is currently on the "Showcase" selection 2104 in FIG. 21) on one of the text displays in navigation bar 2120 in user interface 2100, and then select an OK button 764 to select the material for that user interface device 2104-2116.

The selection is received, again, through the processor 364 and provided to the panel manager 536, in step 2016. The panel manager 536 must then determine which of the four categories was selected, in step 2020. In one non-limiting example, the panel manager 536 determines which of the devices 2104 through 2116 had focus when selected by the user. If the selection was for the "Showcase" 2104, the method 2000 proceeds to the SHOWCASE branch to step 2024. If the selection was for a "movie" 2108, the method 2000 proceeds to the MOVIE branch to step 2028. If the user selected the "TV series" device 2112, method 2000 proceeds to the TV branch to step 2032. Finally, if the user selected device 2116, the method 2000 proceeds to the VARIETY branch to step 2036.

Figure 22:
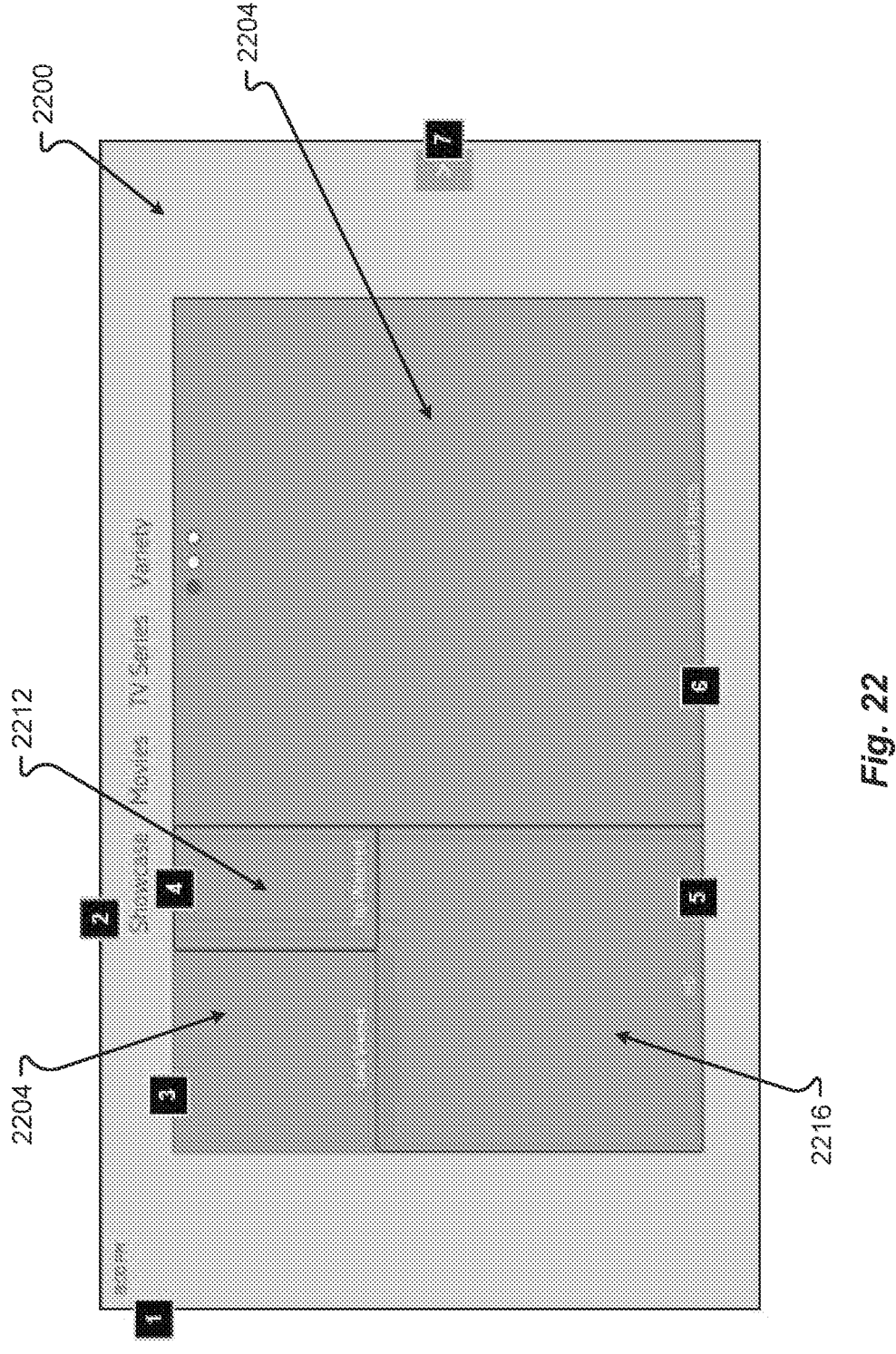
FIG. 22 is a view of an embodiment of a user interface for an Intelligent TV.

In step 2024, the panel manager 526 provides a showcase user interface, in step 2024. For example, the panel manager 536 may provide the showcase user interface 2200 shown in FIG. 22. In one non-limiting example, the showcase view provides thumbnails 2204 through 2216. Each of these thumbnails represents a different topic or collection of showcase material. Showcase material can be any type of material from the other categories that is pertinent to the user and in which the user may have a desire to watch. Thus, the showcase view 2200 has selection of content from all categories and may be organized by last viewed, represented by thumbnail 2204, special topics content, represented by thumbnail 2208, top watched content, represented by thumbnail 2212, and/or high definition content, represented by thumbnail 2216. Thus, the showcase user interface can organize all content based on criteria that are either user-defined criteria or are predetermined criteria based on statistics associated with the underlying content.

Figure 23:
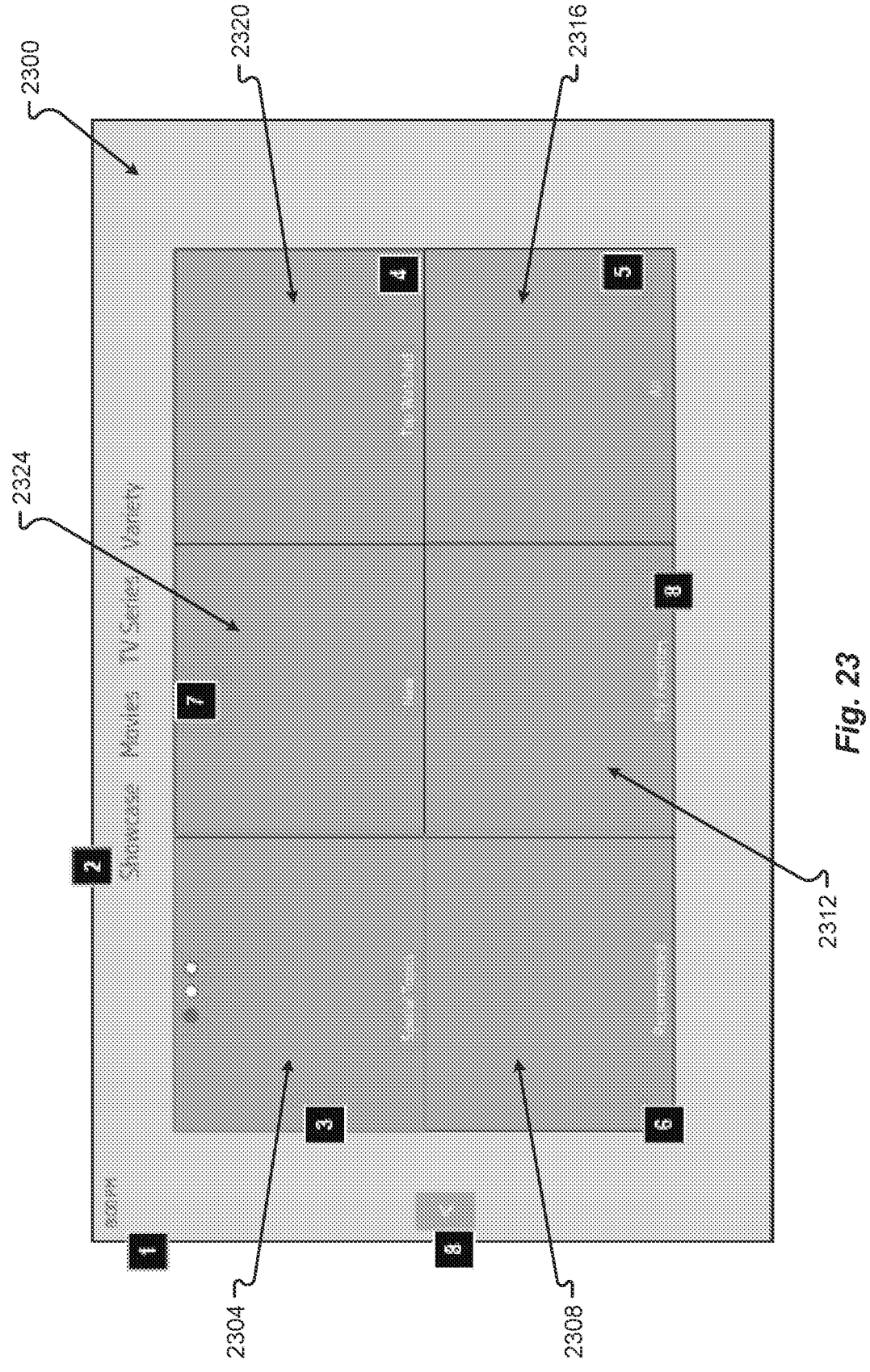
FIG. 23 is a view of an embodiment of a user interface for an Intelligent TV.

If the user selects the variety user interface device 2212, the panel manager 536 can provide a panel manager user interface 2300 as shown in FIG. 23. Variety programming can be any programming not necessarily associated with a movie or TV series. For example, variety programming can include documentaries, special interest shows, or other types of content. The variety programs can have one or more thumbnails, which organize the content and allow the user to select a collection to define content. These thumbnails may represent certain topics, for example, thumbnail 2304 represents specials topics contents, thumbnail 2308 represents recommended content, thumbnail 2312 represents user selected favorites content, thumbnail 2304 represents new content, thumbnail 2320 represents top watched or most viewed content, and thumbnail 2316 can represent all types of variety content. These thumbnails 2304-2324 may be selected by the user to be provided with a collection view that is organized based on the associated category that was chosen by the user. Thumbnails may be provided from the thumbnail database 632.

Figure 24:
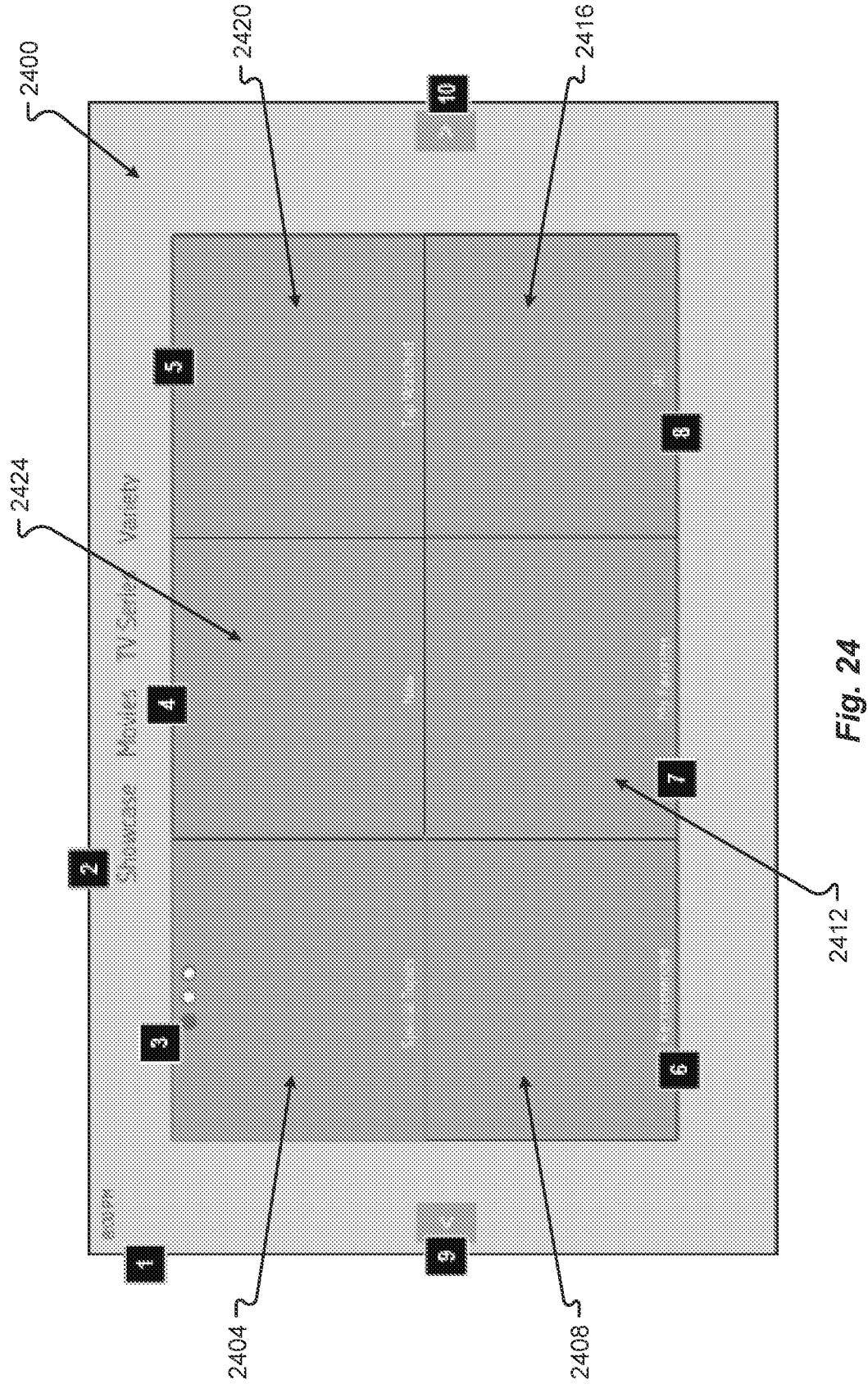
FIG. 24 is a view of an embodiment of a user interface for an Intelligent TV.

If the user selects the movie device 2108, the panel manager 536 can provide user interface 2400 shown in FIG. 24. The panel manager, in step 2028, provides this user interface 2400 with thumbnails 2404-2424, similar to those described in conjunction with the variety user interface in FIG. 23. Thus, the user may, again, select one or more movies, or collections of movies, based on the top categories or the categories listed by the thumbnails in user interface 2400.

Figure 25:
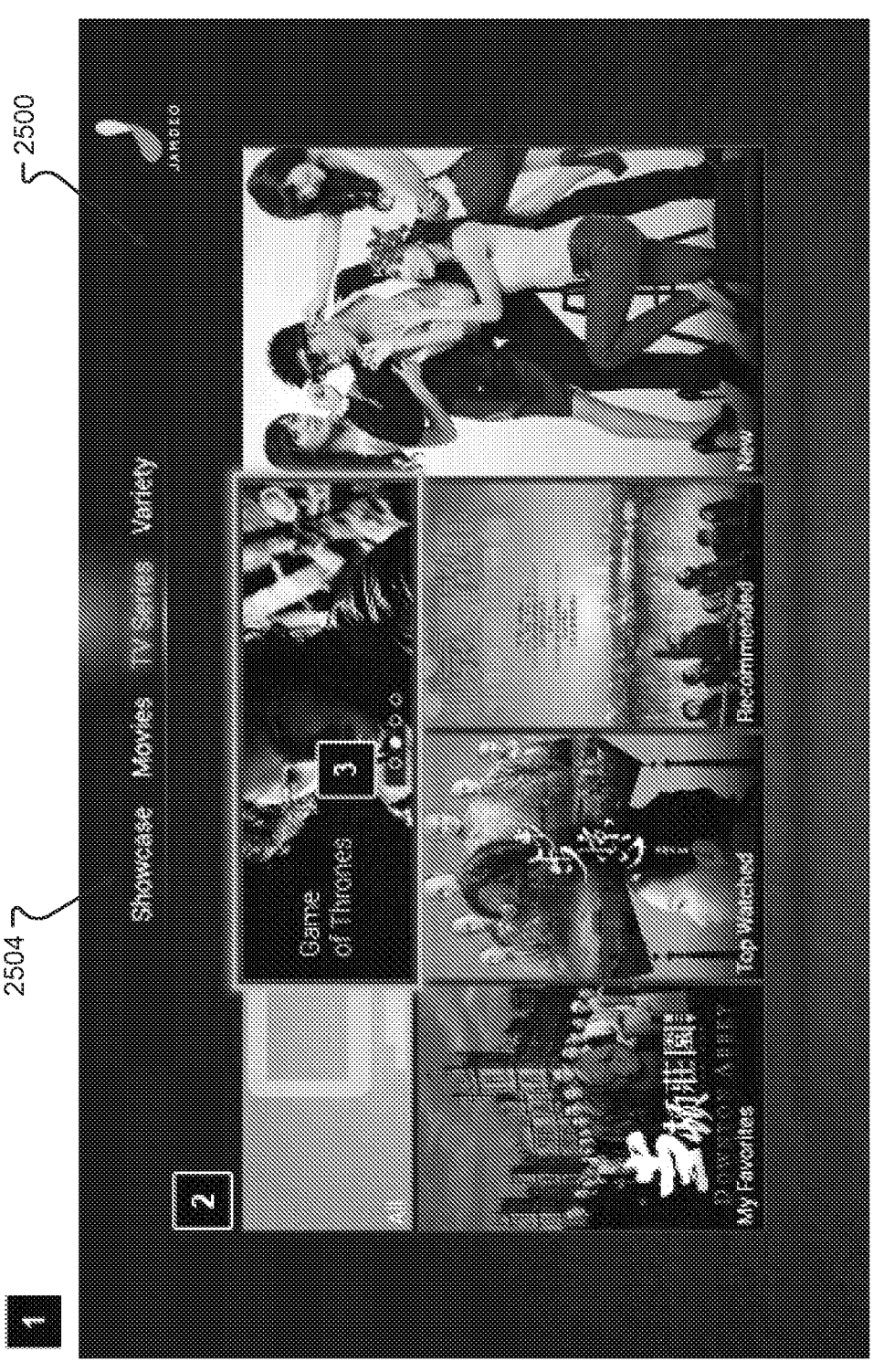
FIG. 25 is a view of an embodiment of a user interface for an Intelligent TV.

If the user selects the TV series device 2112, the panel manager 536 can provide a TV user interface 2500 shown in FIG. 25, in step 2032. In one non-limiting example, the panel manager 536, again, provides a series of thumbnails 2504-2524, which may be the same or similar to those described in conjunction with the variety user interface in FIG. 23. Further, one or more of the thumbnails may provide several views of different content. For example, user interface device 2504 may sequence through a series of thumbnails representing different types of series. For example, the user interface device 2504 shows a "Game of Thrones" thumbnail. However, the next sequenced thumbnail may apply to the TV series "Homeland." Thus, the user may view more types of content within one area of user interface 2500 than that shown in any instant of time. These types of sequenced or moving thumbnails may be used in any of the user interfaces described hereinabove.

Figure 26:
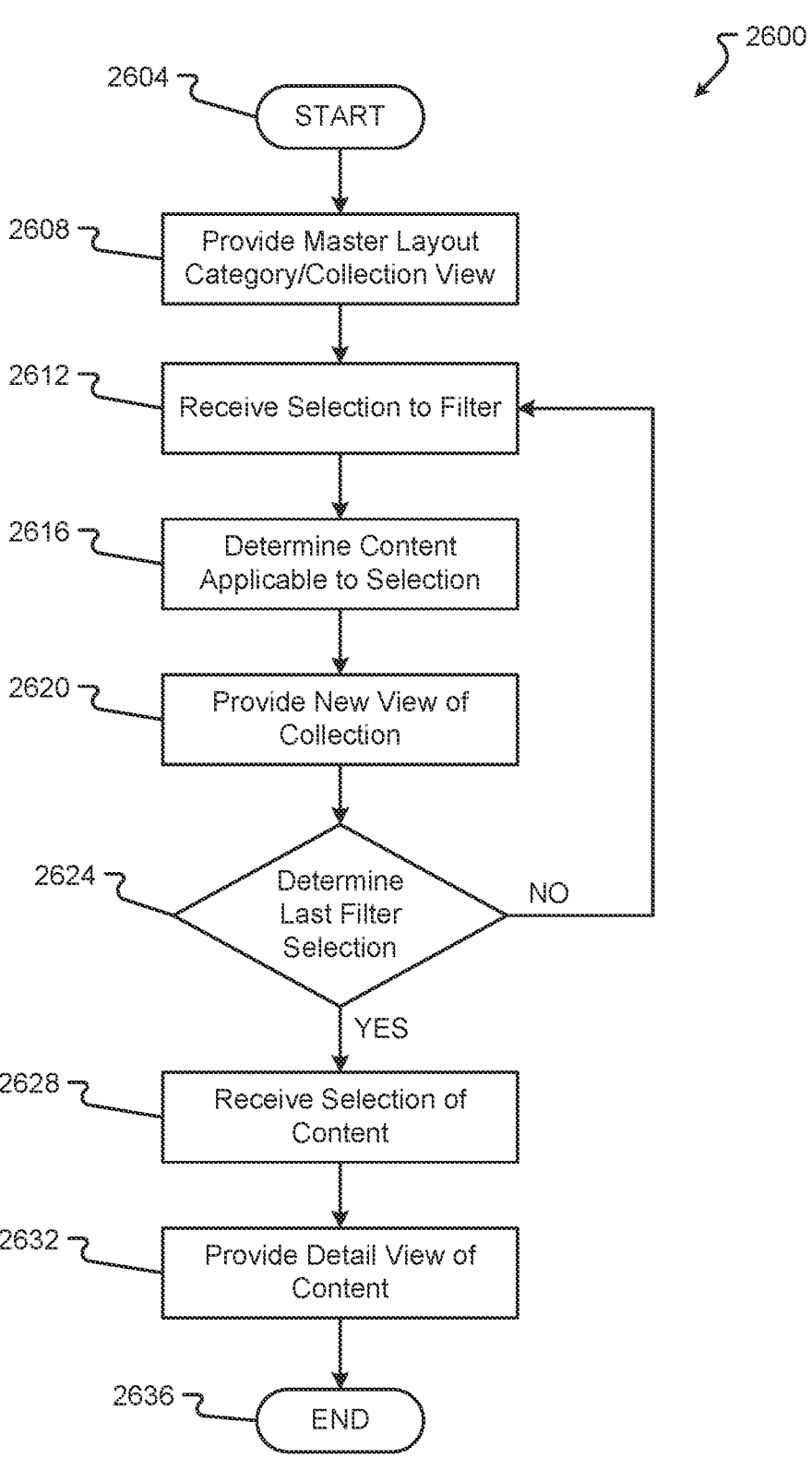
FIG. 26 is a flowchart view of an embodiment of a method for providing VOD in an Intelligent TV.

An embodiment of the method 2600 for providing a collection view of content is shown in FIG. 26. While a general order for the steps of the method 2600 is shown in FIG. 26, the steps may be arranged in any order. Generally, the method 2600 starts with a start operation 2604 and ends with an end operation 2636. The method 2600 can include more or fewer steps or can arrange the order of the steps differently than those shown in FIG. 26. The method 2600 can be executed as a set of computer-executable instructions, executed by a computer system, and encoded or stored on a computer readable medium. Further, the method 2600 can be executed by a gate or other hardware device or component in an Application Specific Integrated Circuit, a Field Programmable Gate Array, or other type of hardware device. Hereinafter, the method 2600 shall be explained with reference to the systems, components, modules, software, data structures, user interfaces, etc. described herein.

The panel manager 536 can provide a master layout view, in step 2608. Thus, as described in conjunction with FIGS.

2000 through 2500, the panel manager 536 using information provided by the VOD subservice 620 can provide a master layout view.

The user may select a thumbnail within one of the user interface devices shown in FIGS. 21 through 25. The selection may be made using a directional pad 760 to change the focus onto one of the thumbnails and, using the OK button 764, select that thumbnail. The remote control signal may then be sent to the Intelligent TV 100 through the IR/RF module 354 to the processor 364. A driver 420 interprets the signal and provides the translation to the user interface application 468. In one non-limiting example, an input event dispatcher 508 may then send that information to the panel manager 536 to indicate that a selection has been made. A panel manager 536 thus can receive the selection, in step 2612.

Based on the selection, the panel manager 536 sends the information of the selection to the VOD subservice 620. The VOD subservice 620 may then determine which content is applicable to the selection, in step 2616. In one non-limiting example, the VOD subservice 620 may be provided information from the panel manager 536 as to which of the category was selected. For example, the user can select high definition content, most watched content, top favorites content, most viewed content, or other types of content, as described in conjunction with FIGS. 20 through 25. Once determined, the VOD subservice 620 may then access database 632 that includes the information described in FIG. 14.

In one non-limiting example, the VOD subservice 620 may search metadata 1420 or other information in fields 1428 through 1444 and fields 1412 through 1416. This information may be accessed to determine which content applies to the selected category. For example, most recent or new content may have a date and time 412, 416, that is within a certain timeframe or period of time. Further, the VOD subservice 620 can access the view count 1436 to determine if the information has been viewed or is new. The view time and view date 428 and 432 may also be used to determine whether the content is new. Further, the view count 436 may be used to determine if the content is most watched. The status indicator 1440 can also be used to provide information for different categories; also, the user-defined field 1444 can be used to determine if the item is a favorite. Thus, the VOD subservice 620 can access any of the information in data structure 1404 to determine which content is applicable to the selection. This content may then be provided to the panel manager 536.

Figure 27A:
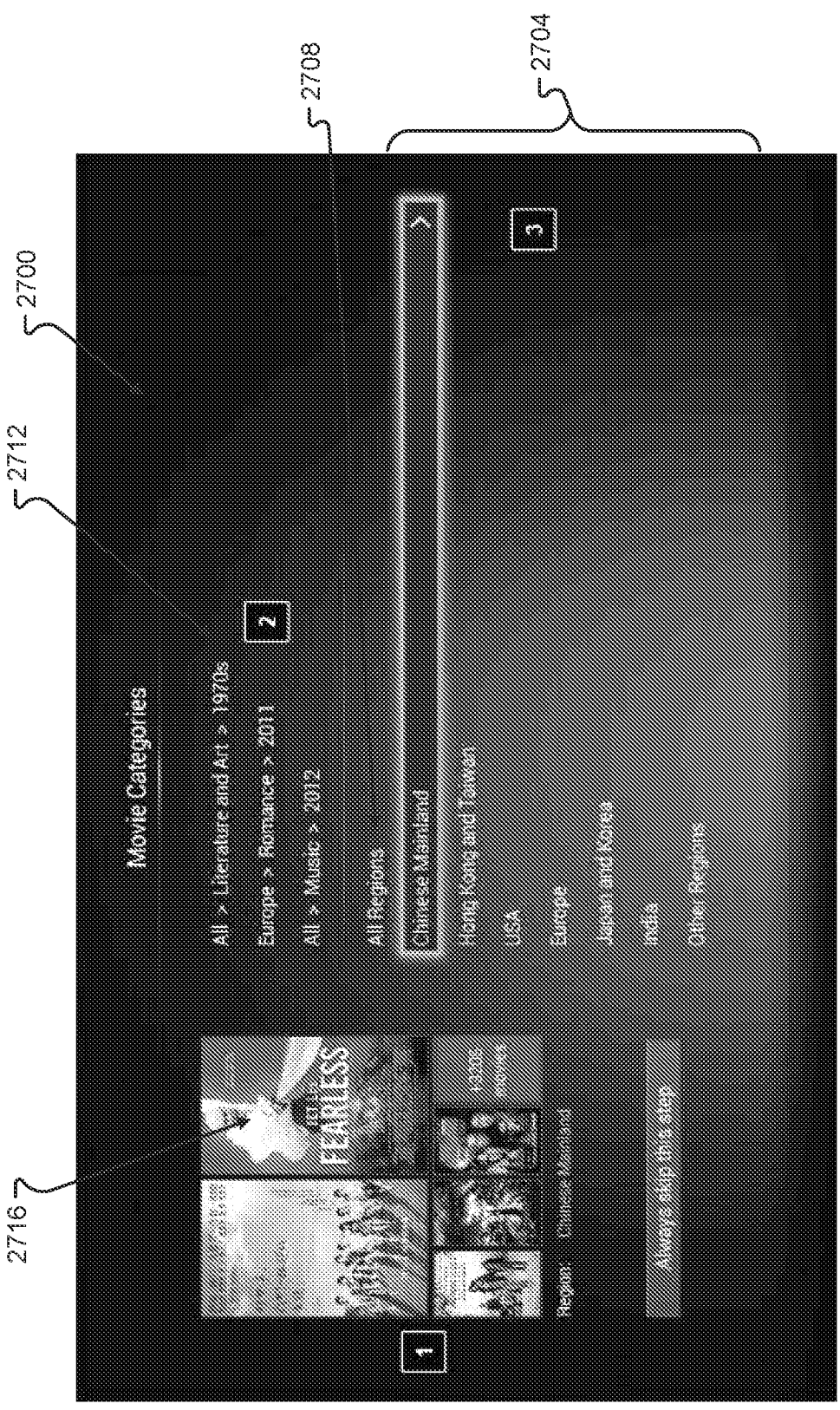
FIG. 27A is a view of an embodiment of a user interface for an Intelligent TV.

The panel manager 536 can then provide a new view of a collection of content, in step 2612. In the content view, the panel manager 536 can now provide a series of filter criteria to allow the user to further filter the collections to better target a particular type or single item of content, in step 2612. The panel manager 536 can provide a first user interface having one or more filter criteria, such as user interface 2700. For example, in FIG. 27A, user interface 2700 provides one or more filter criteria shown in section 2704. In one non-limiting example, the filter criteria 2704 can apply to a region in which the movie was created 2708. Past filter criteria are shown in section 2712. The filter criteria 2704 can include a type of content, a year in which content was made, or other such types of filtering selections.

Figure 27B:
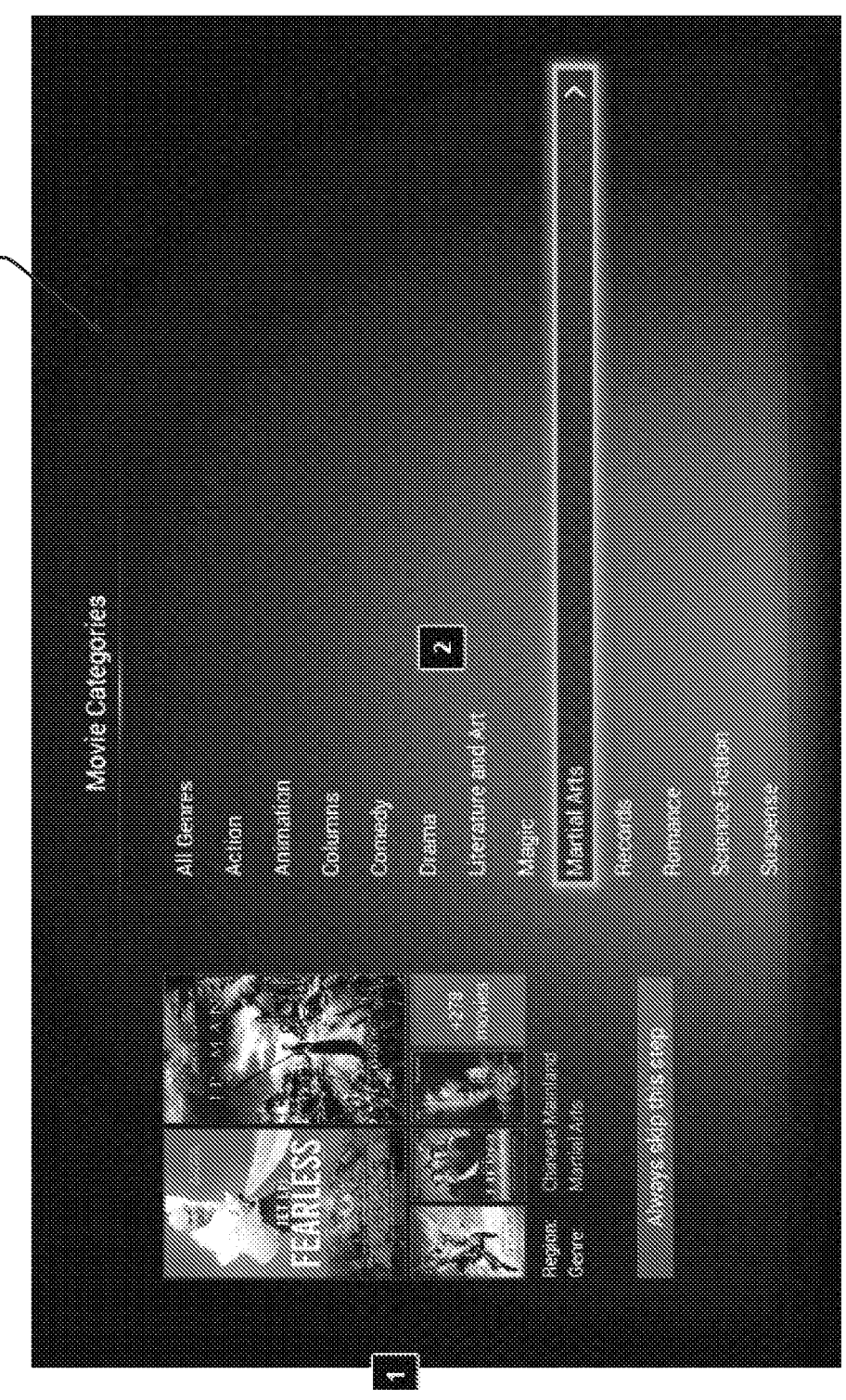
FIG. 27B is a view of an embodiment of a user interface for an Intelligent TV.
Figure 27C:
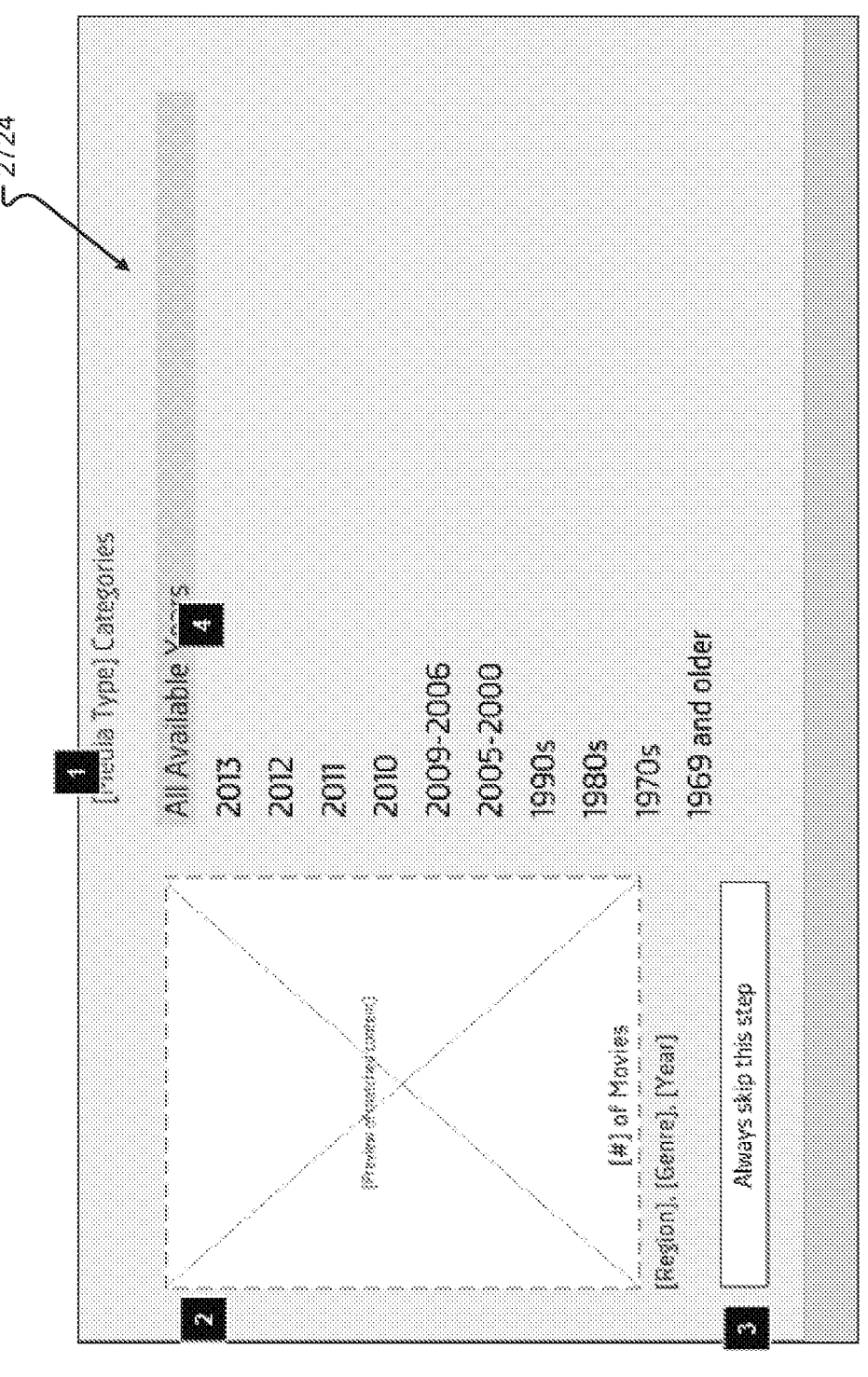
FIG. 27C is a view of an embodiment of a user interface for an Intelligent TV.

The user may then move the focus, with the directional pad 760, to highlight one of the filter selections. The selection may be selected, by using button 764, to send a signal to the Intelligent Television 100. The signal is received as described hereinbefore and provided to the panel manager 536. The panel manager 536 determines the selection made and provides that to the video subservice 620, which further refines the search for content provided to the panel manager 536. The panel manager 536 may then provide a next user interface with the content filtered, in step 2620. Thus, the user can navigate through one or more different types of filters to better categorize or reduce the amount of content available for selection, such as user interfaces 2720 and 2724 in FIGS. 27B and 27C.

The panel manager 536 can then determine if the current selection is the last filter selection made, in step 2624. For example, the user may be able to select a content viewed in section 2716, in which case no further filter criteria is needed. In other embodiments, it may be the last of the type of filter criteria available or there may be only a single item of content or a small set of content to be provided in a last screen. If it is the last filter criteria selected, the method 2600 proceeds YES to step 2628. If it is not the last filter criteria selected, the method 2624 can proceed through the NO branch back to step 2612 to receive another filter selection. In step 2628, the VOD subservice 620 provides the last selection of content to the panel manager 536. The panel manager 536 may then present this content to the user. The user may then select a content, in which case the panel manager 536 receives that selection, in step 2628. Based on that type of selection, the panel manager 536 may provide a detailed view, described hereinbefore, to view the content for the user, in step 2632.

Figure 28:
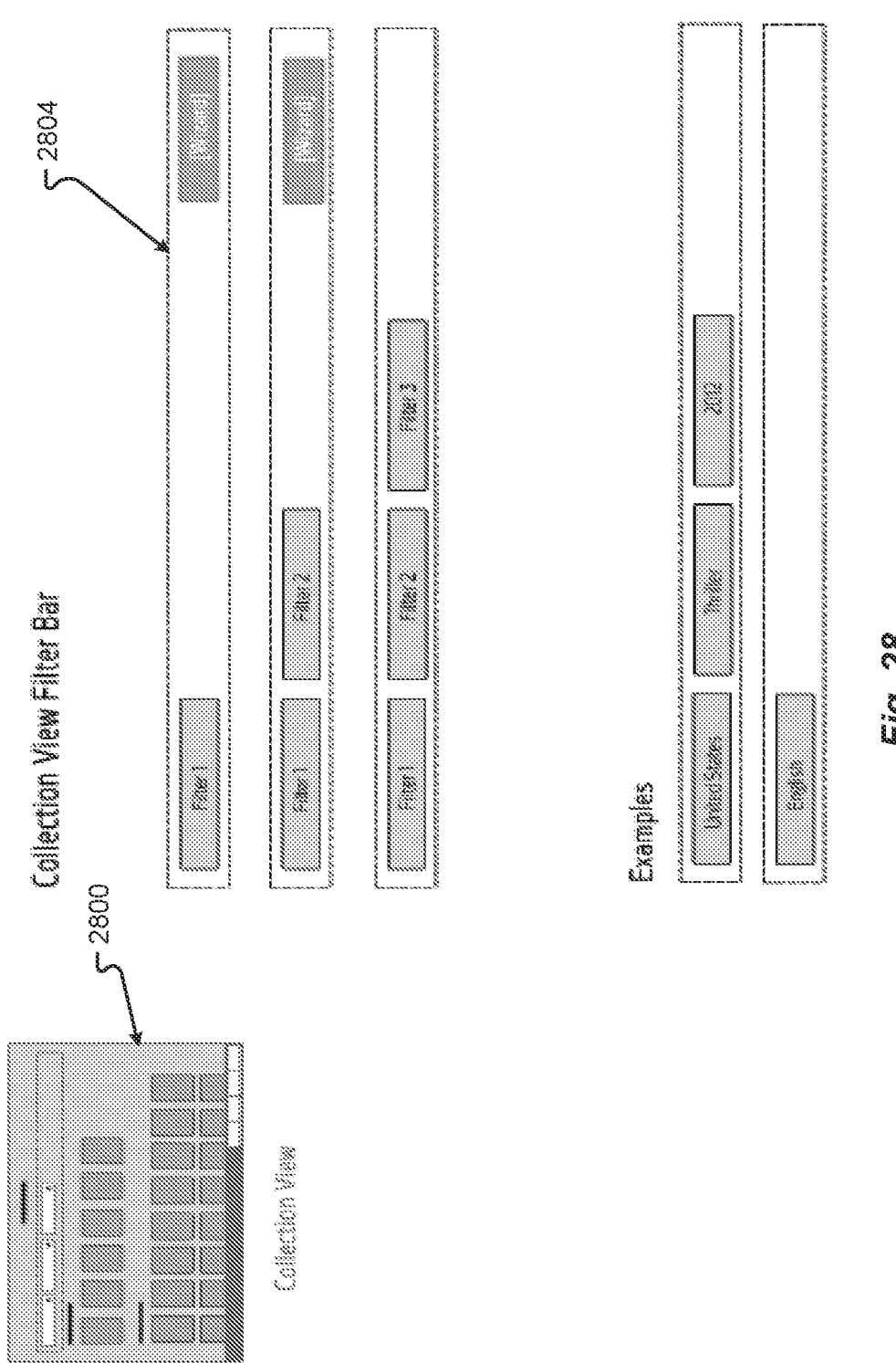
FIG. 28 is a view of an embodiment of a user interface for an Intelligent TV.
Figure 29:
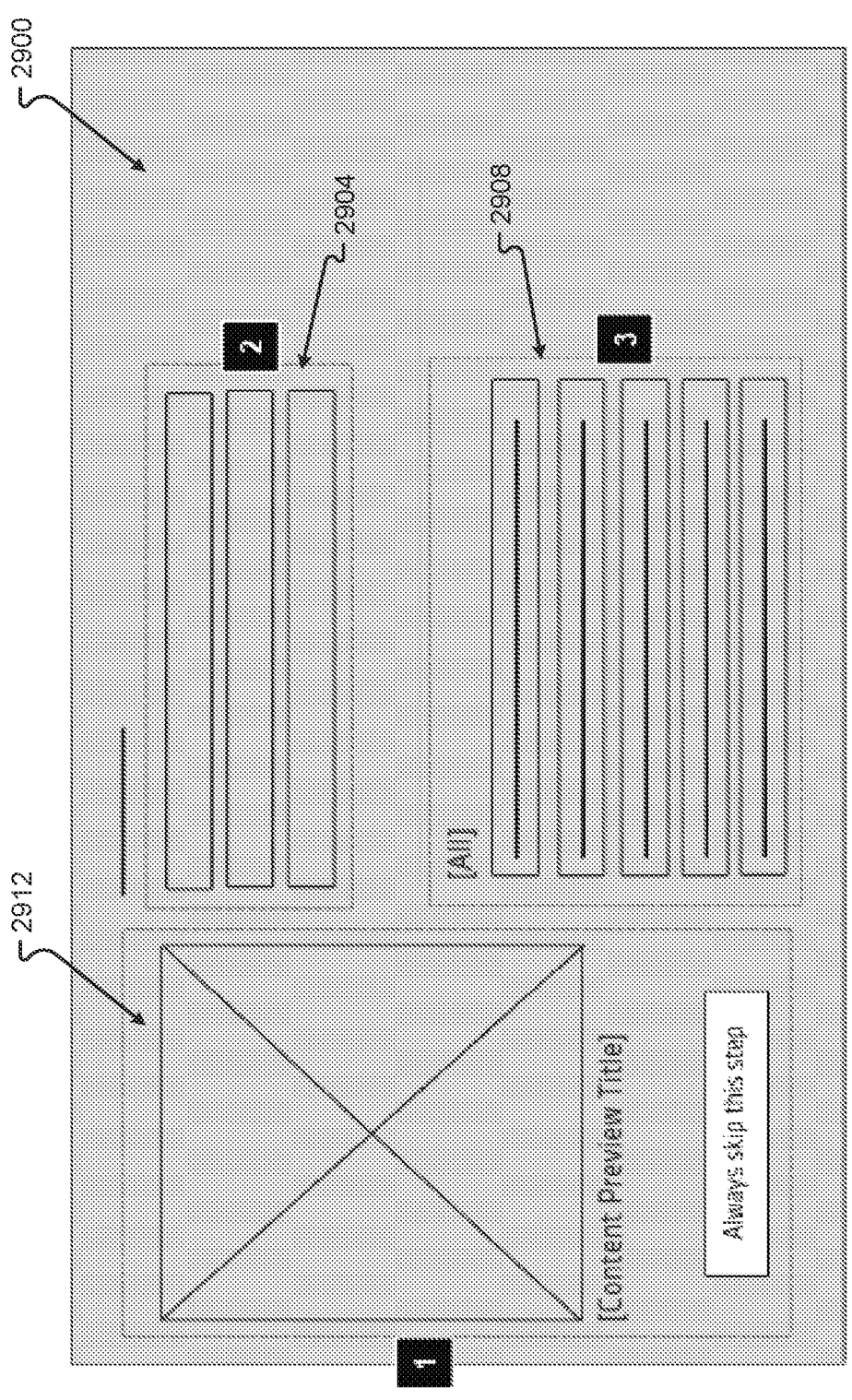
FIG. 29 is a view of an embodiment of a user interface for an Intelligent TV.

The filter views can be presented in two types of user interfaces shown in FIGS. 28 and 29. The user interface 2800 provides a filter bar or filter categories in the navigation bar as shown in user interface 2800. The filter bar can include one or more filter criteria as shown in section or view 2804. Thus, depending on the types of filter category, including genres, dates, regions, etc., the navigation bar can contain different filter criteria.

In FIG. 29, the filter criteria may be provided in one or more areas inside a user interface 2900. For example, a last used filter criteria may be shown in section 2904, while selectable filter criteria may be shown in section 2908. A view of possible content associated or that may be provided with such a search is shown in section 2912. The user interface 2900, shown in FIG. 29, may be the same or similar as that shown in FIG. 27A.

Figure 30:
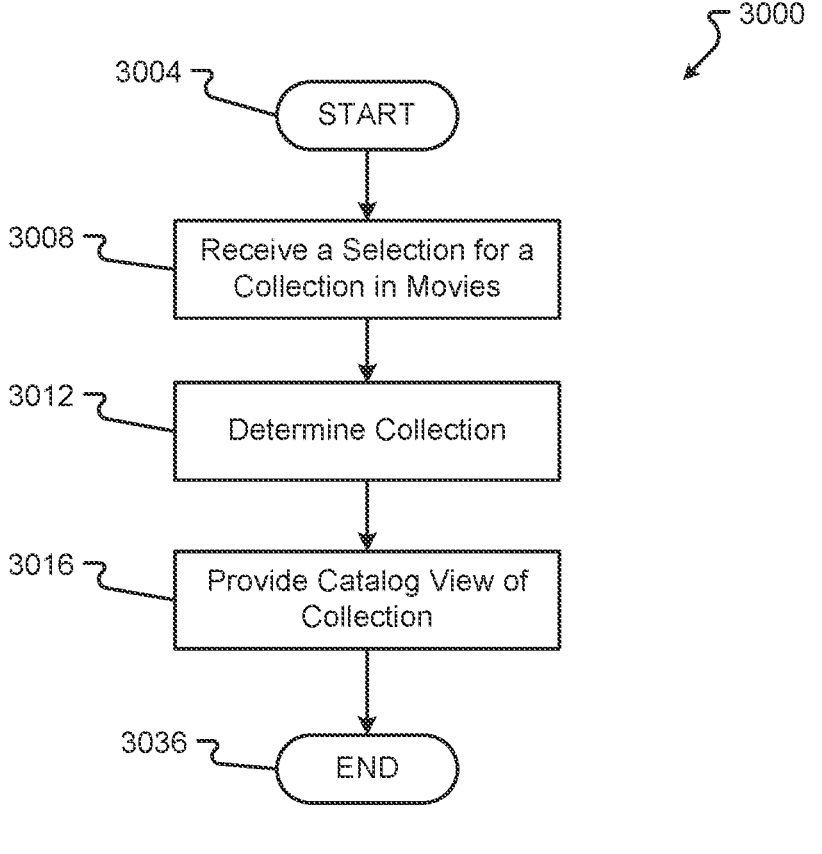
FIG. 30 is a flowchart view of an embodiment of a method for providing VOD in an Intelligent TV.

An embodiment of a method 3000 for providing a collection view after filtering category is shown in FIG. 30. While a general order for the steps of the method 3000 is shown in FIG. 30, the steps may be arranged in any order. Generally, the method 3000 starts with a start operation 3004 and ends with an end operation 3036. The method 3000 can include more or fewer steps or can arrange the order of the steps differently than those shown in FIG. 30. The method 3000 can be executed as a set of computer-executable instructions, executed by a computer system, and encoded or stored on a computer readable medium. Further, the method 3000 can be executed by a gate or other hardware device or component in an Application Specific Integrated Circuit, a Field Programmable Gate Array, or other type of hardware device. Hereinafter, the method 3000 shall be explained with reference to the systems, components, modules, software, data structures, user interfaces, etc. described herein.

The panel manager 536 can receive a selection for a collection of movies from a master view or collection view after a filtered category selection, in step 3008. For example, after proceeding through the process described in conjunction with FIG. 26, the panel manager 536 may determine a collection of movies that applies to the filter categories provided by the user. This final selection received through the remote control 700 at the panel manager 536 can be provided to the VOD subservice 620.

The VOD subservice 620 can determine the collection of movies that apply to the filter category, in step 3012. The panel manager 536 thus provides the VOD subservice 620 with the filtering categories or information in which the VOD subservice 620 searches the database 1400 for content applicable to that filter selection or selections. This collection of content may be provided back to the panel manager 536 with the thumbnail information or other content information. The thumbnails may be retrieved by the thumbnail cache manager 660 from the thumbnails database 668. This collection information is then given to the panel manager 536.

Figure 31:
FIG. 31 is a view of an embodiment of a user interface for an Intelligent TV.

The panel manager 536 may then provide the catalog view of the collection, in step 3016. For example, the panel manager 536 can provide a user interface similar to that shown in FIG. 31. In one non-limiting example, the user interface 3100 is directed towards movie content as indicated by the title 3104. At least three filter criteria have been received, as shown in navigation bar 3108. The collection view includes a content area 3112 that provides one or more thumbnails that are associated with content that are available based on the filter criteria in 3108. For example, thumbnail 3116 can be for a movie that is returned by the VOD subservice 620 based on the filter criteria 3108. The thumbnails, such as thumbnail 3116, are selectable and, if selected, instruct the Intelligent TC 100 to provide content.

Figure 32:
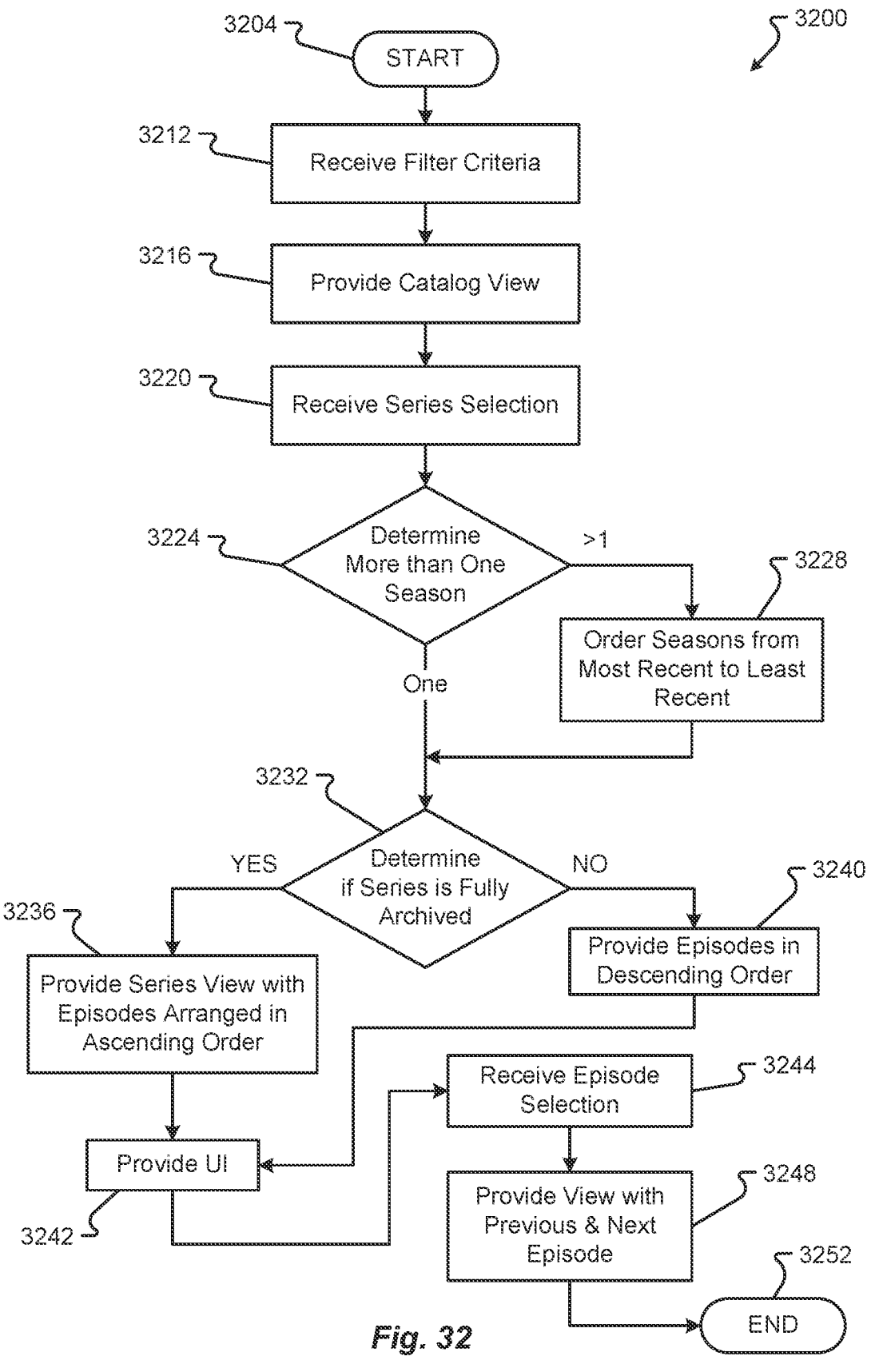
FIG. 32 is a flowchart view of an embodiment of a method for providing VOD in an Intelligent TV.

An embodiment of a method 3200 for providing a catalog view and subsequent detail and series use for TV series and/or variety series is shown in FIG. 32. While a general order for the steps of the method 3200 is shown in FIG. 32, the steps may be arranged in any order. Generally, the method 3200 starts with a start operation 3204 and ends with an end operation 3252. The method 3200 can include more or fewer steps or can arrange the order of the steps differently than those shown in FIG. 32. The method 3200 can be executed as a set of computer-executable instructions, executed by a computer system, and encoded or stored on a computer readable medium. Further, the method 3200 can be executed by a gate or other hardware device or component in an Application Specific Integrated Circuit, a Field Programmable Gate Array, or other type of hardware device. Hereinafter, the method 3200 shall be explained with reference to the systems, components, modules, software, data structures, user interfaces, etc. described herein.

On receiving filter criteria, in step 3212, the panel manager 536 and VOD subservice 620 can provide a catalog view, in step 3216. Receiving a filter criteria and providing a catalog view may be as described in conjunction with FIGS. 26 and 30 described hereinbefore.

Figure 33:
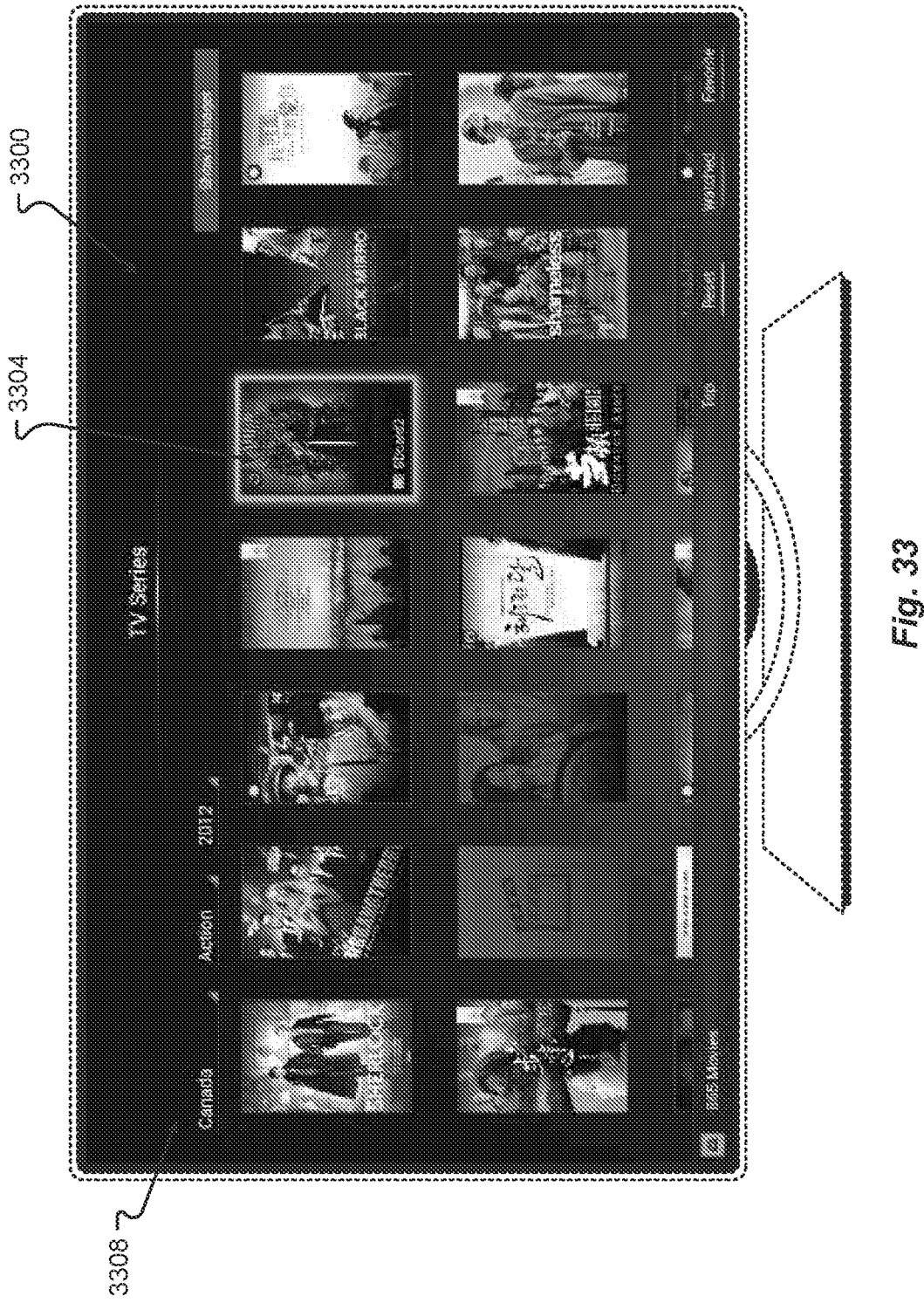
FIG. 33 is a view of an embodiment of a user interface for an Intelligent TV.

The panel manager 536 may receive a series selection, in step 3220. In one non-limiting example, the user may use the remote control 700 to move a focus with the directional pad 760 and select the focused thumbnail with button 764. For example, as shown in FIG. 33, the focus, in user interface 3300, is placed on the series "Game of Thrones," represented by thumbnail 3304. The thumbnails, shown in user interface 3300, were provided in reaction to providing filter criteria 3308. The user may select the Game of Thrones thumbnail by selecting the OK button 764. The selection for this series is received by the panel manager 536, in step 3220.

The selection may then be provided to the VOD subservice 620. The VOD subservice 620 may then determine if there is more than one season available for the series selected, e.g., "Game of Thrones," in step 3224. If there is only a single season, the method proceeds through the ONE branch to step 3232. However, if there is more than one season, the method proceeds through the GREATER THAN ONE branch to step 3228.

In step 3228, the VOD subservice 620 may determine if all the seasons, or episodes within the seasons, have been aired. For example, if there are four seasons and the fourth season is completely aired, then the sort criteria can be different. However, if the fourth season has not been completely aired, there may be different sort criteria for that situation. If all seasons have been aired, the seasons can be ordered and provided to the panel manager 536 in order from the first season to the last season. However, if the last season has not been fully aired, these seasons are provided to the panel manager 536 from the most recent season to the oldest season.

The VOD subservice 620 can also determine, in step 3232, if the series is fully archived. In this case, for example, if all the episodes within a season have been received and archived in the VOD database 632. If the series is fully archived, the method 3200 proceeds YES to step 3236. If the season is not fully archived, then the method proceeds NO to step 3240.

The VOD subservice 620 can provide the series with the episodes arranged in ascending order if all the series have been archived, in step 3236. For example, if the fourth season is fully archived, the episodes within that season may be listed from episode one to the last episode. In contrast, in step 3240, if the series is not fully archived, the VOD subservice 620 can arrange the episodes in descending order. For example, if season four is not fully archived, the episodes may be arranged from the last latest episode to the first episode.

Figure 34:
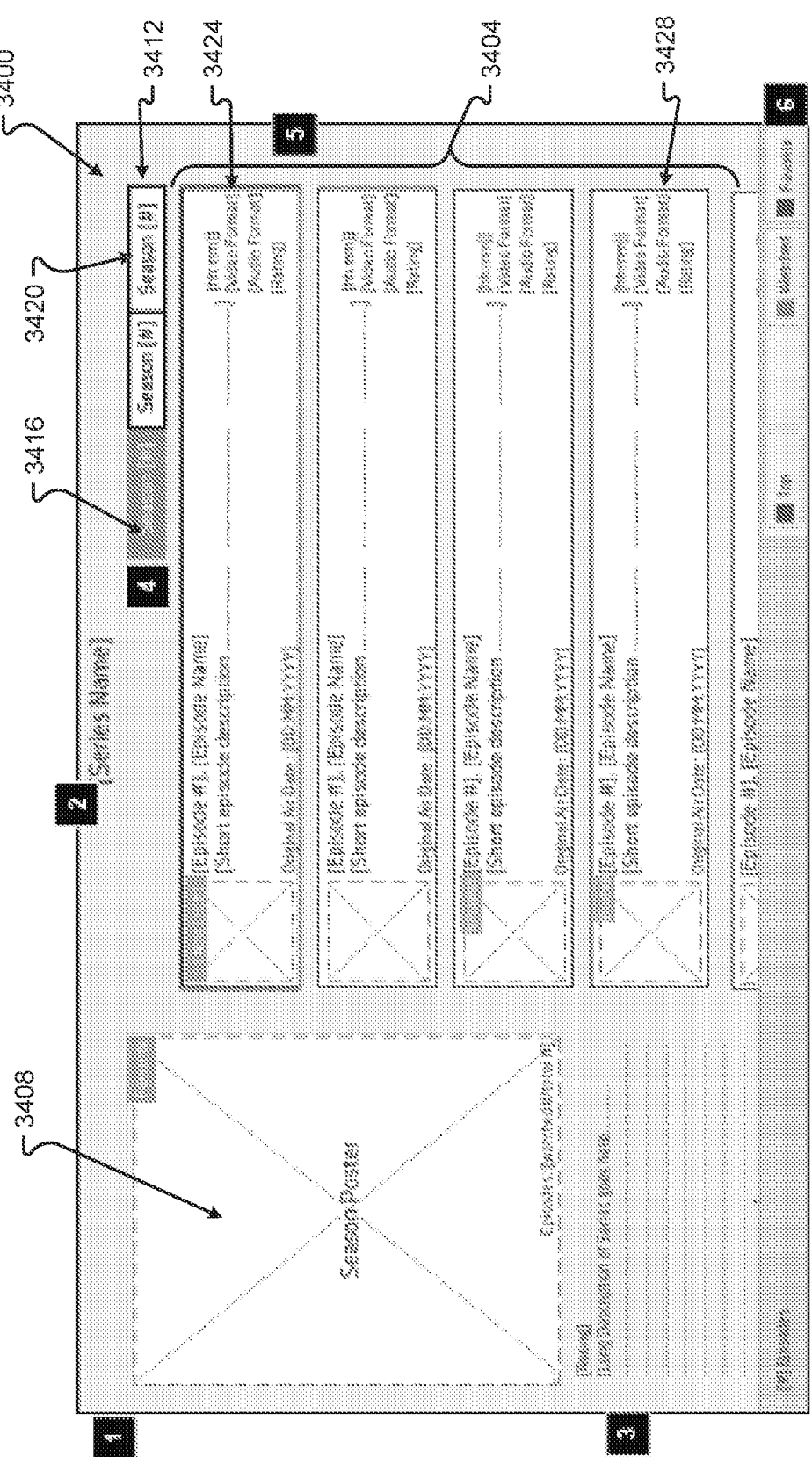
FIG. 34 is a view of an embodiment of a user interface for an Intelligent TV.

The panel manager 536 may receive this information and then provide a user interface having this type of arranged seasons and episodes, in step 3242. For example, the panel manager 536 can provide a user interface 3400 similar to that shown in FIG. 34. In one non-limiting example, the user interface 3400 includes a section for the season listings 3412. As explained previously, if the seasons are fully aired, the user interface device 3416 will contain the first season, while the user interface device 3420 can include the last season. In contrast, if the seasons are not fully aired, user interface device 3416 will include the last season, while device 3350 will include the first season or earlier seasons.

The episodes may be arranged in section 3404. Again, as explained previously, if the seasons are fully archived, the episodes are arranged in ascending order with display 3424 including the first episode of the season and with user interface section 3428 including a later aired episode. In contrast, if the episode or season is not fully archived, user interface portion 3424 can provide information about the last aired episode, while a portion 3428 will include information about an episode aired previously or in the past. The section 3408 may include information about the series, including a poster or thumbnail that gives a visual representation of the season, and a description of the series.

Figure 35:
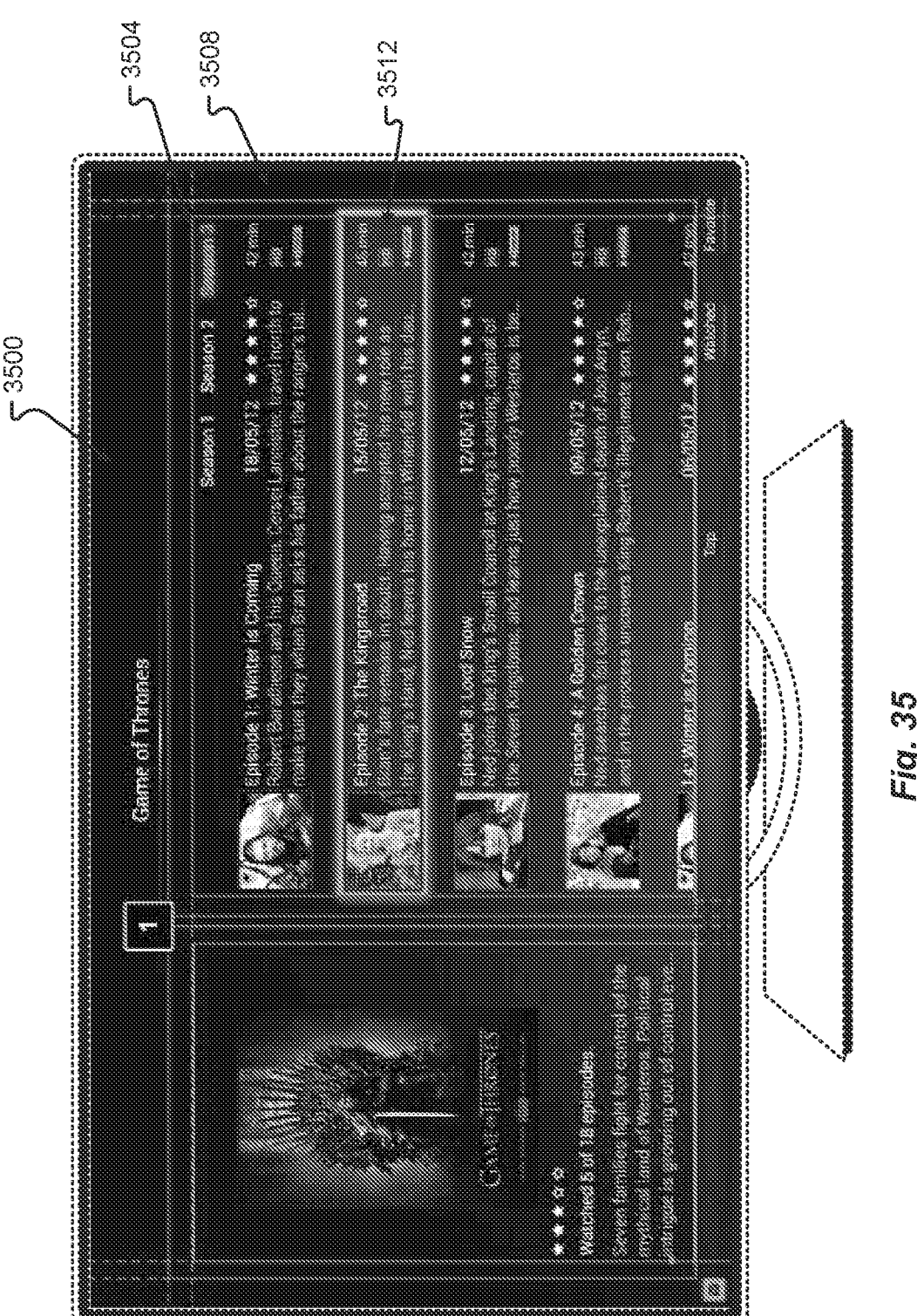
FIG. 35 is a view of an embodiment of a user interface for an Intelligent TV.

Another example of the digest view for a series of television shows or variety shows is shown in FIG. 35. The user interface 3500 can display a series, e.g., Game of Thrones. The season listing is shown in section 3504, while the episode listings for season three is shown in section 3508. One episode 3512 is shown in focus. These displays are governed by the same rules that were explained previously.

The user may then select an episode using the directional pads 760 and the selection button 764 as described herein, in step 3244. The selection may be for an episode. For example, the episode with the focus 3512 shown in FIG. 35 may be selected. On receiving a selection, the VOD subservice 620 can provide the content information 354 to the panel manager 536. The panel manager 536 may then provide a view for playback 3600 shown in FIG. 36, in step 3248. In one non-limiting example, the user interface 3600 can provide the content in portion 3616. The user may control the playback using playback controls 3612. Uniquely, the playback user interface 3600 can also show tiles of thumbnails that are selectable by the user to move to a next episode 3604 or previous episode 3608 in the series. In this way, for TV series or variety series, the user may easily navigate between episodes in a season with these controls in the playback view.

Figure 37:
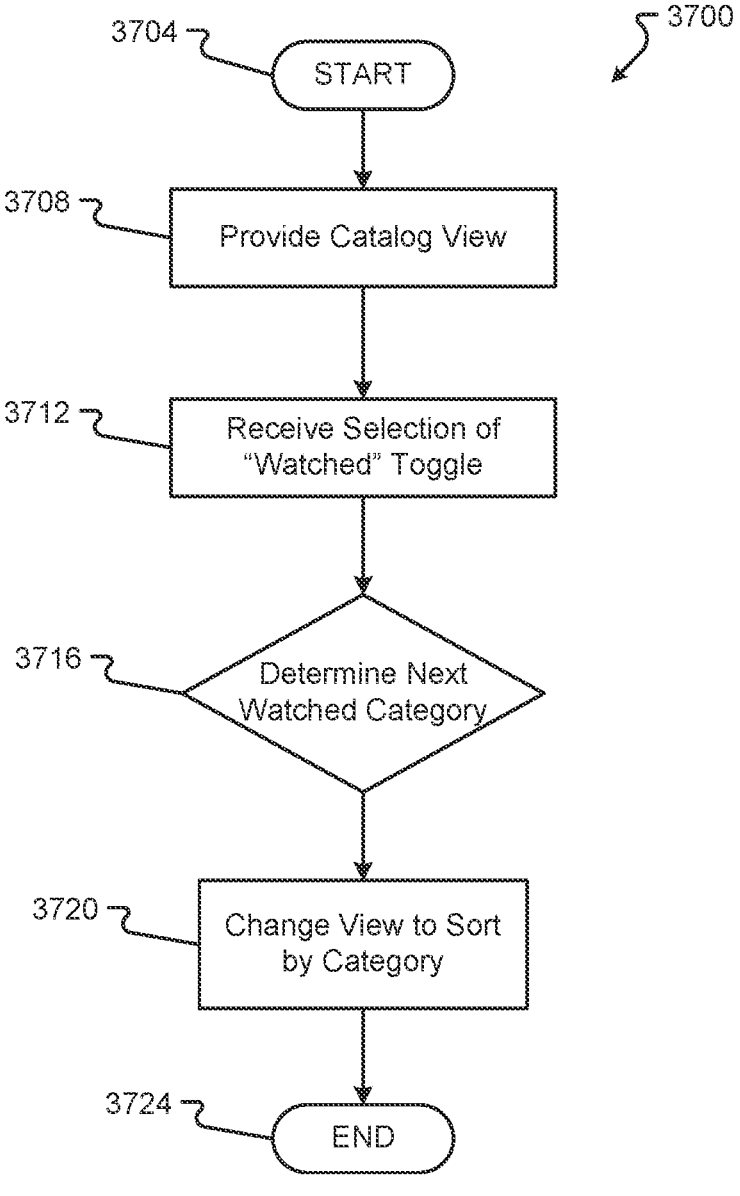
FIG. 37 is a flowchart view of an embodiment of a method for providing VOD in an Intelligent TV.

A method 3700 for toggling between the status of programs is shown in FIG. 37. While a general order for the steps of the method 3700 is shown in FIG. 37, the steps may be arranged in any order. Generally, the method 3700 starts with a start operation 3704 and ends with an end operation 3724. The method 3700 can include more or fewer steps or can arrange the order of the steps differently than those shown in FIG. 37. The method 3700 can be executed as a set of computer-executable instructions, executed by a computer system, and encoded or stored on a computer readable medium. Further, the method 3700 can be executed by a gate or other hardware device or component in an Application Specific Integrated Circuit, a Field Programmable Gate Array, or other type of hardware device. Hereinafter, the method 3700 shall be explained with reference to the systems, components, modules, software, data structures, user interfaces, etc. described herein.

Figure 38:
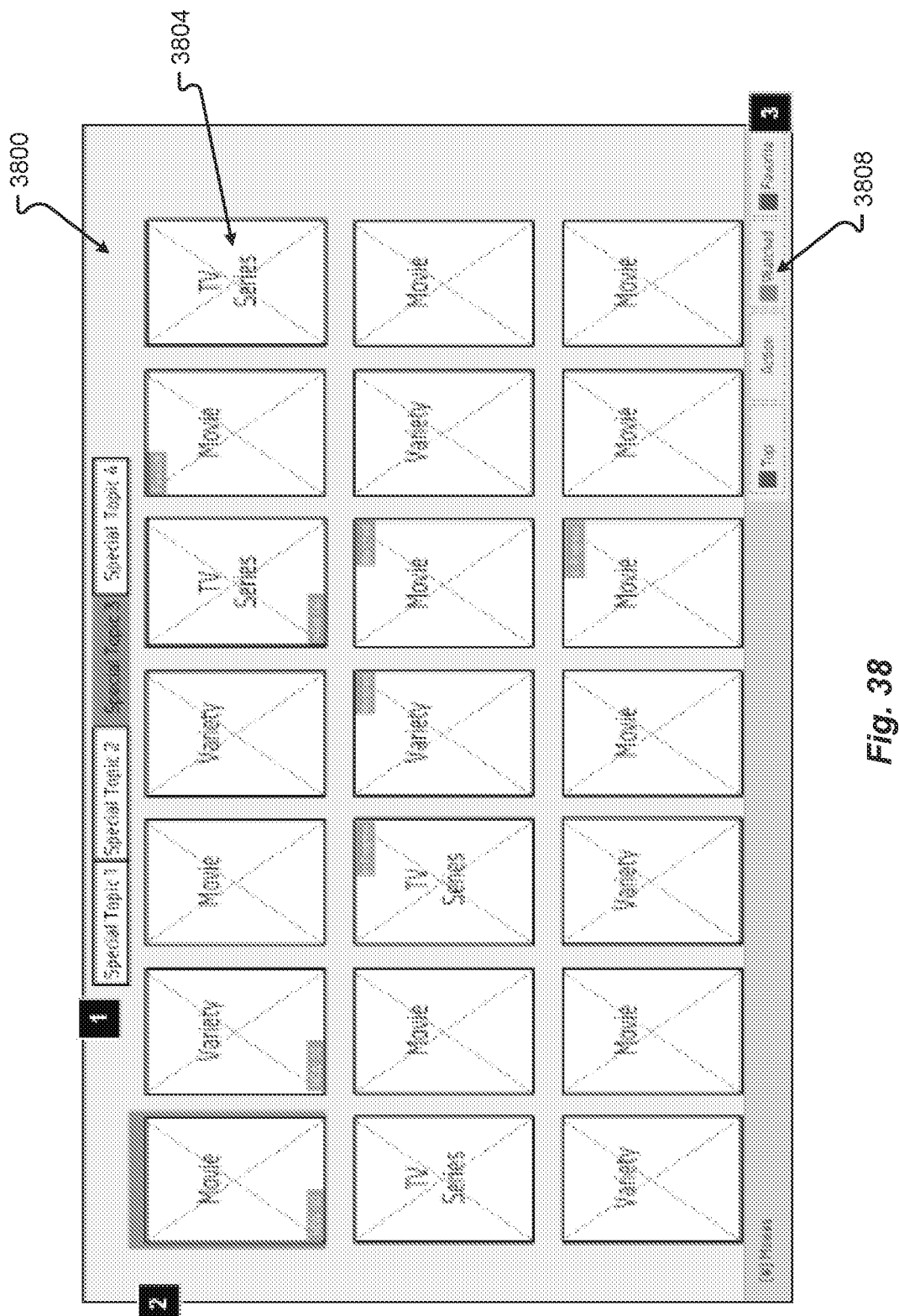
FIG. 38 is a view of an embodiment of a user interface for an Intelligent TV.

In one non-limiting example, the user may be provided a catalog view, in step 3708. The panel manager 536 can provide a catalog view, similar to that shown in FIG. 38. In one non-limiting example, the catalog view 3800 includes a bunch of thumbnails for example, thumbnail 3804, that are associated with a type of content. These content thumbnails may be arranged in any type of order based on filter criteria. The user may then select an icon 3808 to watch the content provided in the catalog view 3800. This selection may be completed, for example, by the user placing focus on device 3808 with the directional pad 716 and selecting device 3808 with the button 764. In other embodiments, the device 3808 may be associated with button 794, and when selected, automatically selects device 3808. This selection is received by the processor 364 and provided to the panel manager 536 in step 3712.

Based on the selection, the content in user interface 3800 may be arranged based on whether the program has been watched or not. For example, the user may select to watch only programs that have been previously watched, which may be displayed in user interface 3800. However, the watch status may be different, and the user may desire to watch programs that are in progress. Further, the user may desire to watch only programs or view programs that have not been watched previously. Thus, the panel manager 536 can determine which category or watched category is requested, in step 3716.

In step 3716, the panel manager 536 may determine the context of the interface 3800. The context means what type of watched status is currently being displayed. If the user interface device 3808 is selected, the panel manager 536 can determine what is the next category for watched status. The next category may then be provided to the VOD subservice 620 to search the database 1400 for status information 1370, which is associated with that watched category. The content having that watched status is provided back to the panel manager 536 to render in the user interface 3800. Thus, the content thumbnails shown in user interface 3800 will change based on the watched status being provided. Thus, the panel manager 536 can change the view of user interface 3800 to sort by the watched category, in step 3720. The view may thus be toggled between watched status, in progress status, or not watched status.

Figure 39:
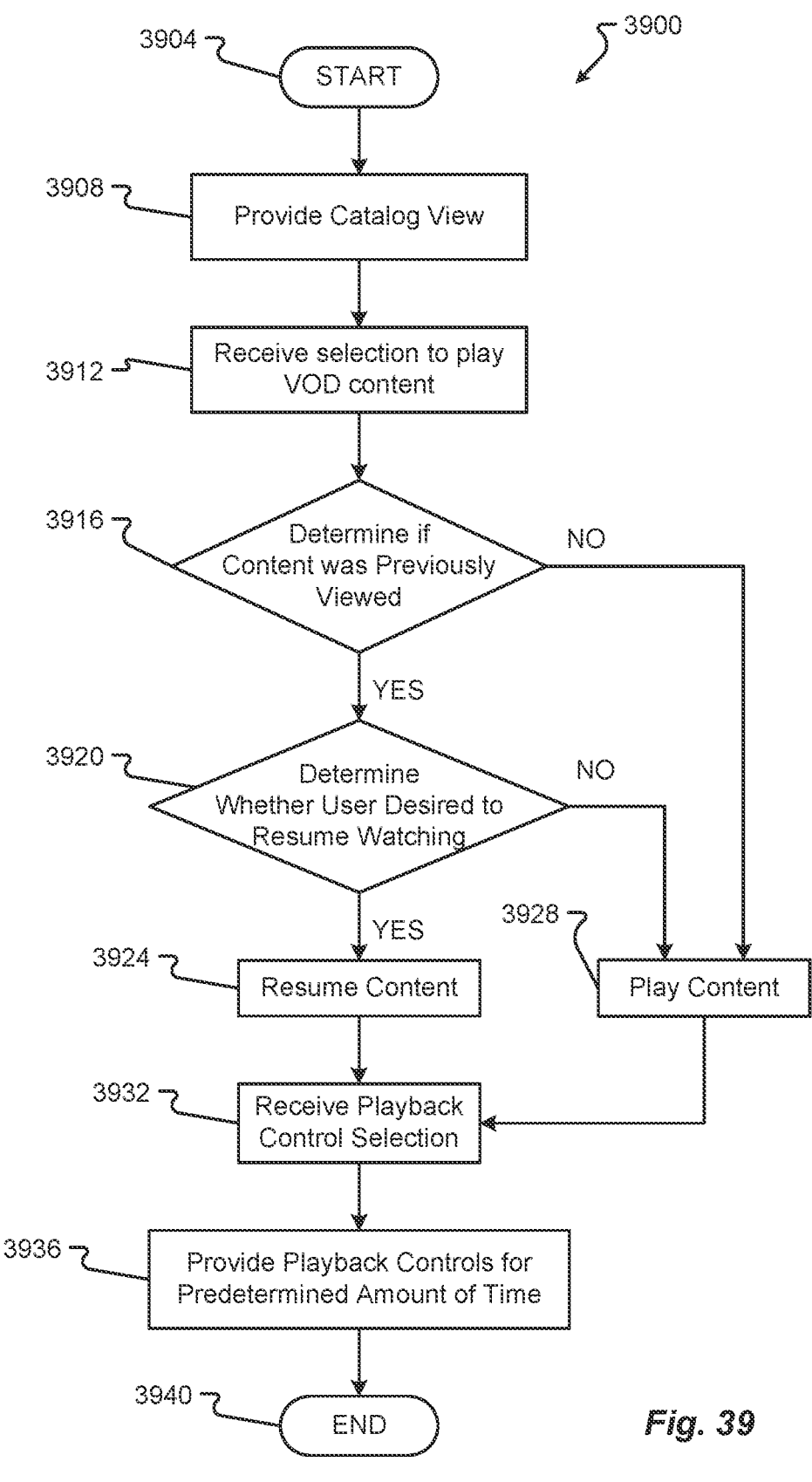
FIG. 39 is a flowchart view of an embodiment of a method for providing VOD in an Intelligent TV.

A method 3900 for providing playback of VOD is shown in FIG. 39. While a general order for the steps of the method 3900 is shown in FIG. 39, the steps may be arranged in any order. Generally, the method 3900 starts with a start operation 3904 and ends with an end operation 3940. The method 3900 can include more or fewer steps or can arrange the order of the steps differently than those shown in FIG. 39. The method 3900 can be executed as a set of computer-executable instructions, executed by a computer system, and encoded or stored on a computer readable medium. Further, the method 3900 can be executed by a gate or other hardware device or component in an Application Specific Integrated Circuit, a Field Programmable Gate Array, or other type of hardware device. Hereinafter, the method 3900 shall be explained with reference to the systems, components, modules, software, data structures, user interfaces, etc. described herein.

A user interface application 468 provides a catalog view for an item of content, in step 3908. A catalog view may be as described in conjunction with FIG. 38. The intelligent television 100 can receive a selection to play VOD content, in step 3912. The user may place focus on a selection 3804 in the catalog view 3800 and press a select button using a remote control 700, as has been described previously herein.

The selection signal may be sent to the user interface application 468 and/or the VOD subservice 620. The user interface application 468 and/or the VOD subservice 620 may then determine if a user has previously watched the selected content, in step 3916. The VOD subservice 620 stores the watch status 1440 in database 1400, as described in conjunction with FIG. 14. The status 1440 is associated with the content 1424 in data structure 1404. This status information 1440 may be retrieved from the data base 1400 by the VOD subservice 620 and provided to the user interface application 468.

If the user has previously watched the content, the method 3900 proceeds YES to step 3920. In step 3920, the user interface application 468 may then, based on if the status 1440 shows that the user previously viewed the content, prompt the user if the user desires to resume watching the content. The user interface application 468 can provide a notification or other user interface device alerting the user that the user had previously watched the content. The user interface device may have a selectable button or other device to resume watching the content. The user interface application can determine if the user desires to resume watching the content based on the selection of the button, in step 3920. If the user selects the button, the method 3900 proceeds YES to step 3924 where the content is resumed from the point at which the user had stopped watching. If the user does not select the button, the method 3900 proceeds NO to step 3928 where the user interface application 468 begins the playback of the content from a beginning of the content. If the user has not previously watched the content, the method 3900 proceeds NO to step 3928 where the user interface application 468 also plays the content from a beginning of the content.

During playback, the user may select a button on a remote control 700 to view playback controls, in step 3932. The playback controls may be the same or similar to those described in conjunction with FIG. 36. In response to receiving the playback controls selection, the user interface application 468 can provide the playback controls for a predetermined amount of time, in step 3936. The predetermined amount of time can be any time period, for example, 10 seconds, a minute, five minutes, etc.

Figure 36:
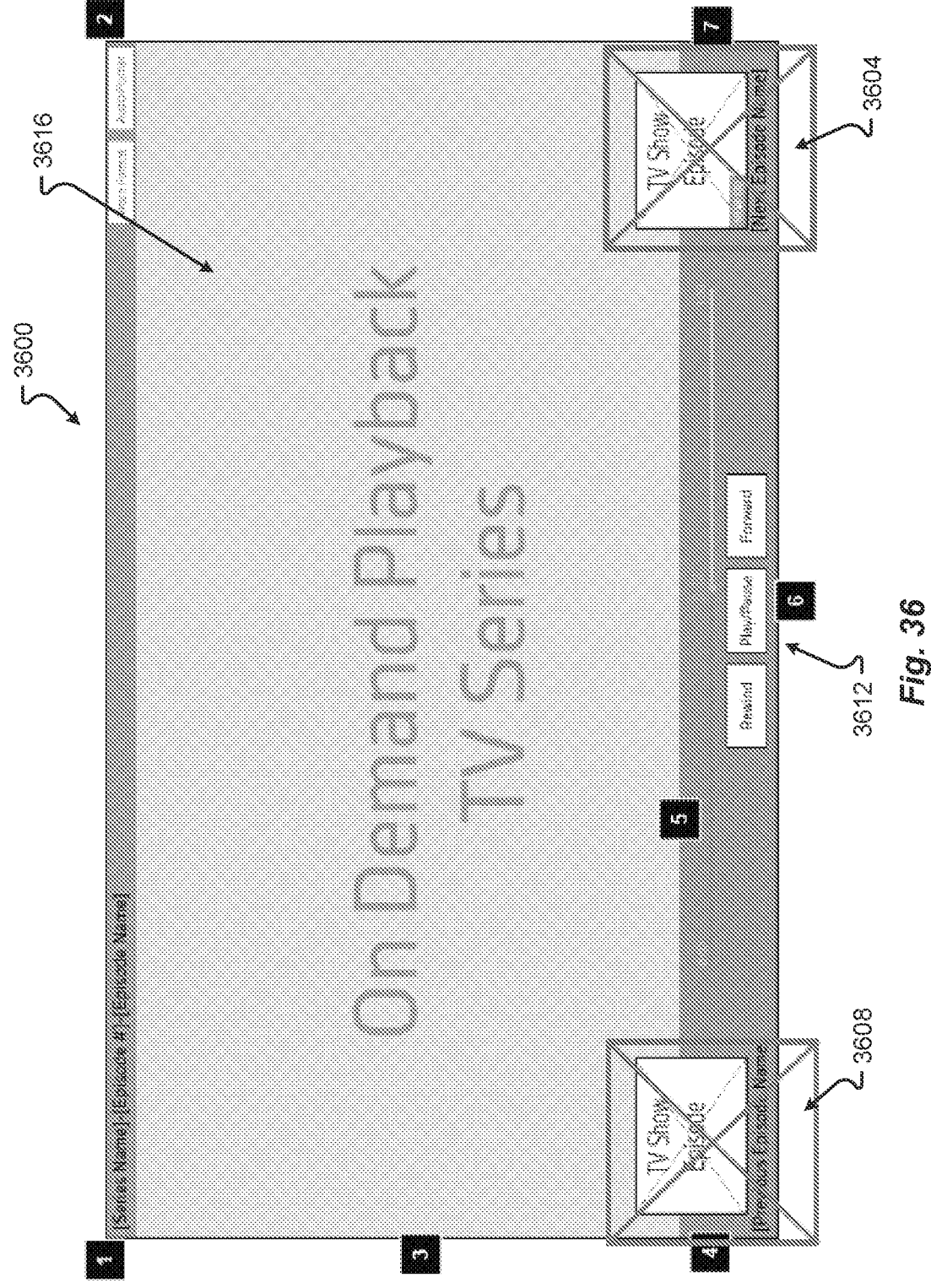
FIG. 36 is a view of an embodiment of a user interface for an Intelligent TV.

The playback controls 3612 may be in a footer, as shown in FIG. 36. A first user-selectable device 3608 for navigating to a previous episode may be provided to the left of the playback controls 3612 in the footer. A second user-selectable device 3604, for navigating to a next episode, may be provided to a right of the playback controls 3612 in the footer. The playback controls 3612 can include selections to rewind the content, forward the content, play the content, and pause the content. Other controls are possible and envisioned.

The exemplary systems and methods of this disclosure have been described in relation to an Intelligent Television. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital tele-communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for managing data associated with an intelligent television, the method comprising:

receiving, by the intelligent television, an indication to begin a first time experience for a user of the intelligent television, wherein the first time experience is a first interaction between the user and the intelligent television before providing content from a game application source, wherein game mode is automatically activated when a game controller device is connected to the intelligent television; and in response to the indication, automatically determining, by the intelligent television, one or more game sources from a plurality of game sources, each game source providing game content for user selection;

on user selection of game content, automatically accessing the intelligent television settings to accommodate an associated genre and enable the game mode comprised of adjusting video processing and input response speed for game functions within video and presentation settings and discovering and initializing the controller for the selected game from one or more connected game controllers; and on user selection of non-game content, automatically accessing the intelligent television settings to accommodate an associated genre and disable the game mode comprised of adjusting video processing and input response speed for game functions within video and presentation settings.

2. The method as defined in claim 1, wherein the game mode includes adjustment of the audio settings of the intelligent television.

3. The method as defined in claim 1, wherein the game mode includes adjustment of the picture settings of the intelligent television.

4. The method as defined in claim 1, wherein indication and selection user interactions with the intelligent television are input at a handheld remote control.

5. The method as defined in claim 1, wherein game mode is automatically activated when an active HDMI input source is connected to a game controller device.

6. An intelligent television system comprising:

a memory operable to store application data;

a processor in communication with the memory, the processor operable to:

receive an indication to begin a first time experience for a user of the intelligent television system, wherein the first time experience is a first interaction between the user and the intelligent television system before providing content from a game application source;

wherein game mode is automatically activated when a game controller device is connected to the intelligent television;

in response to the indication, automatically determining, by the intelligent television, one or more game sources from a plurality of game sources, each game source providing game content for user selection;

on user selection of game content, automatically accessing the intelligent television system settings to accommodate an associated genre and enable the game mode comprised of adjusting video processing and speed for input response for game functions within video and presentation settings and discovering and initializing the controller for the selected game from one or more connected game controllers; and on user selection of non-game content, automatically accessing the intelligent television settings to accommodate an associated genre and disable the game mode comprised of adjusting video processing and input response speed for game functions within video and presentation settings.

7. An intelligent television system as defined in claim 6, wherein the game mode includes adjustment of the audio settings.

8. An intelligent television system as defined in claim 6, wherein the game mode includes adjustment of the picture settings.

9. An intelligent television system as defined in claim 6, wherein the indication and selection user interactions with the intelligent television are input at a handheld remote control.

10. An intelligent television system as defined in claim 6, wherein game mode is automatically activated when an active HDMI input source is connected to a game controller device.

* * * * *